(12) United States Patent
Ota et al.

(10) Patent No.: US 11,831,026 B2
(45) Date of Patent: Nov. 28, 2023

(54) SINGLE POUCH BATTERY CELLS AND METHODS OF MANUFACTURE

(71) Applicants: 24M Technologies, Inc., Cambridge, MA (US); Kyocera Corporation, Kyoto (JP)

(72) Inventors: Naoki Ota, Lexington, MA (US); Takaaki Fukushima, Okayama (JP); Ricardo Bazzarella, Woburn, MA (US); Taison Tan, Pasadena, CA (US)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 141 days.

(21) Appl. No.: 17/242,483

(22) Filed: Apr. 28, 2021

(65) Prior Publication Data

US 2022/0085440 A1  Mar. 17, 2022

Related U.S. Application Data

(63) Continuation of application No. 16/201,283, filed on Nov. 27, 2018, now Pat. No. 11,024,903, which is a
(Continued)

(51) Int. Cl.
*H01M 50/103* (2021.01)
*H01M 50/10* (2021.01)
(Continued)

(52) U.S. Cl.
CPC ....... *H01M 50/103* (2021.01); *H01M 10/049* (2013.01); *H01M 10/0413* (2013.01);
(Continued)

(58) Field of Classification Search
None
See application file for complete search history.

(56) References Cited

U.S. PATENT DOCUMENTS

| 2,208,028 A | 7/1940 | Harrington |
| 3,624,628 A | 11/1971 | Schmidt |

(Continued)

FOREIGN PATENT DOCUMENTS

| CN | 1333929 A | 1/2002 |
| CN | 1354529 | 6/2002 |

(Continued)

OTHER PUBLICATIONS

Office Action for U.S. Appl. No. 13/607,021, dated Apr. 20, 2015, 8 pages.
(Continued)

*Primary Examiner* — Carlos Barcena
(74) *Attorney, Agent, or Firm* — Cooley LLP

(57) ABSTRACT

Apparatus, systems, and methods described herein relate to the manufacture and use of single pouch battery cells. In some embodiments, an electrochemical cell includes a first current collector coupled to a first portion of a pouch, the first current collector having a first electrode material disposed thereon, a second current collector coupled to a second portion of the pouch, the second current collector having a second electrode material disposed thereon, and a separator disposed between the first electrode material and the second electrode material. The first portion of the pouch is coupled to the second portion of the pouch to enclose the electrochemical cell.

18 Claims, 43 Drawing Sheets

Related U.S. Application Data continuation of application No. 15/185,625, filed on Jun. 17, 2016, now Pat. No. 10,181,587.

(60) Provisional application No. 62/181,385, filed on Jun. 18, 2015.

(51) Int. Cl.

| | | |
|---|---|---|
| *H01M 50/20* | (2021.01) | |
| *H01M 50/209* | (2021.01) | |
| *H01M 50/502* | (2021.01) | |
| *H01M 50/528* | (2021.01) | |
| *H01M 10/04* | (2006.01) | |
| *H01M 10/0585* | (2010.01) | |
| *H01M 10/0525* | (2010.01) | |
| *H01M 50/105* | (2021.01) | |
| *H01M 10/0587* | (2010.01) | |
| *H01M 50/227* | (2021.01) | |
| *H01M 50/143* | (2021.01) | |
| *H01M 50/505* | (2021.01) | |
| *H01M 50/211* | (2021.01) | |

(52) U.S. Cl.
CPC ... *H01M 10/0525* (2013.01); *H01M 10/0585* (2013.01); *H01M 50/105* (2021.01); *H01M 50/528* (2021.01); *H01M 10/0587* (2013.01); *H01M 50/143* (2021.01); *H01M 50/211* (2021.01); *H01M 50/227* (2021.01); *H01M 50/505* (2021.01); *H01M 2220/10* (2013.01)

(56) References Cited

U.S. PATENT DOCUMENTS

| | | |
|---|---|---|
| 3,982,966 A | 9/1976 | Beatty et al. |
| 4,080,728 A | 3/1978 | Buckler |
| 4,092,464 A * | 5/1978 | Dey .............. H01M 6/16 429/219 |
| 4,105,815 A | 8/1978 | Buckler |
| 4,199,912 A | 4/1980 | James, Jr. et al. |
| 4,386,019 A | 5/1983 | Kann et al. |
| 4,623,598 A | 11/1986 | Waki et al. |
| 4,695,355 A | 9/1987 | Koziol |
| 4,818,643 A | 4/1989 | Cook et al. |
| 4,925,752 A | 5/1990 | Fauteux et al. |
| 5,316,556 A | 5/1994 | Morris |
| 5,582,931 A | 12/1996 | Kawakami |
| 5,603,770 A | 2/1997 | Sato |
| 5,612,152 A | 3/1997 | Bates |
| 5,674,556 A | 10/1997 | Fukumura et al. |
| 5,697,145 A | 12/1997 | Fukumura et al. |
| 5,725,822 A | 3/1998 | Keller et al. |
| 5,749,927 A | 5/1998 | Chern et al. |
| 5,792,576 A | 8/1998 | Xing et al. |
| 5,814,420 A | 9/1998 | Chu |
| 5,834,052 A | 11/1998 | Fukumura et al. |
| 5,837,397 A | 11/1998 | Xing |
| 6,207,322 B1 | 3/2001 | Kelsey et al. |
| 6,264,707 B1 | 7/2001 | Ishikawa et al. |
| 6,284,192 B1 | 9/2001 | Coonan et al. |
| 6,287,722 B1 | 9/2001 | Barton et al. |
| 6,291,091 B1 | 9/2001 | Preischl et al. |
| 6,296,967 B1 | 10/2001 | Jacobs et al. |
| 6,296,971 B1 | 10/2001 | Hara |
| 6,306,215 B1 | 10/2001 | Larkin |
| 6,368,365 B1 | 4/2002 | Chi et al. |
| 6,403,262 B1 | 6/2002 | Xing et al. |
| 6,461,757 B1 | 10/2002 | Sasayama et al. |
| 6,503,432 B1 | 1/2003 | Barton et al. |
| 6,503,657 B1 | 1/2003 | Takami et al. |
| 6,576,365 B1 | 6/2003 | Meitav et al. |
| 6,589,299 B2 | 7/2003 | Missling et al. |
| 6,803,145 B1 | 10/2004 | von During |
| 6,939,383 B2 | 9/2005 | Eastin et al. |
| 6,986,967 B2 | 1/2006 | Barton et al. |
| 7,022,391 B2 | 4/2006 | Kawai et al. |
| 7,041,380 B2 | 5/2006 | Yamashita et al. |
| 7,338,734 B2 | 3/2008 | Chiang et al. |
| 7,524,577 B2 | 4/2009 | Bates |
| 7,700,019 B2 | 4/2010 | Lavoie et al. |
| 7,846,575 B2 | 12/2010 | Heller, Jr. et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,790,801 B2 | 7/2014 | Reynolds |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,108,107 B2 | 8/2021 | Kim et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Matthew et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 2001/0012588 A1 | 8/2001 | Kaido et al. |
| 2001/0021471 A1 | 9/2001 | Xing et al. |

(56) References Cited

U.S. PATENT DOCUMENTS

| | | |
|---|---|---|
| 2002/0106561 A1 | 8/2002 | Lee et al. |
| 2003/0071337 A1 | 4/2003 | Mitani et al. |
| 2003/0116881 A1 | 6/2003 | Nelson et al. |
| 2004/0029001 A1 | 2/2004 | Yamazaki et al. |
| 2004/0029008 A1 | 2/2004 | Winterberg et al. |
| 2004/0029311 A1 | 2/2004 | Snyder et al. |
| 2004/0131934 A1 | 7/2004 | Sugnaux et al. |
| 2004/0264110 A1 | 12/2004 | Michel et al. |
| 2005/0064270 A1 | 3/2005 | Marionowski |
| 2005/0123815 A1 | 6/2005 | Tsai et al. |
| 2005/0214648 A1 | 9/2005 | Boulton et al. |
| 2006/0046137 A1 | 3/2006 | Kodama |
| 2006/0057433 A1 | 3/2006 | Ando et al. |
| 2007/0034251 A1 | 2/2007 | Jonczyk et al. |
| 2008/0096110 A1 | 4/2008 | Bito et al. |
| 2008/0289676 A1 | 11/2008 | Guidotti et al. |
| 2009/0023041 A1 | 1/2009 | Cooper |
| 2009/0029259 A1 | 1/2009 | Okazaki et al. |
| 2009/0186270 A1 | 7/2009 | Harada et al. |
| 2010/0040942 A1 | 2/2010 | Hatta et al. |
| 2010/0047671 A1 | 2/2010 | Chiang et al. |
| 2010/0112454 A1 | 5/2010 | Visco et al. |
| 2010/0190081 A1 | 7/2010 | Park et al. |
| 2010/0196800 A1 | 8/2010 | Markoski et al. |
| 2010/0323264 A1 | 12/2010 | Chiang et al. |
| 2011/0086258 A1 | 4/2011 | Yaginuma et al. |
| 2011/0104527 A1 | 5/2011 | Choi et al. |
| 2011/0129722 A1 | 6/2011 | Yoneda |
| 2011/0183169 A1 | 7/2011 | Bhardwaj et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2011/0287314 A1 | 11/2011 | Jung |
| 2011/0300440 A1 | 12/2011 | Matsuda et al. |
| 2011/0311857 A1 | 12/2011 | Tucholski |
| 2012/0003547 A1 | 1/2012 | Raj |
| 2012/0058378 A1 | 3/2012 | Lee et al. |
| 2012/0070715 A1 | 3/2012 | Obika |
| 2012/0121963 A1 | 5/2012 | Kwon et al. |
| 2012/0164499 A1 | 6/2012 | Chiang et al. |
| 2012/0315537 A1 | 12/2012 | Ravdel et al. |
| 2013/0000110 A1 | 1/2013 | Takeda et al. |
| 2013/0029205 A1 | 1/2013 | Adams et al. |
| 2013/0029206 A1 | 1/2013 | Lev |
| 2013/0055559 A1 | 3/2013 | Slocum et al. |
| 2013/0065122 A1 | 3/2013 | Chiang et al. |
| 2013/0131744 A1 | 5/2013 | Viavattine |
| 2013/0230641 A1 | 9/2013 | Suzuki |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0079992 A1 | 3/2014 | Tanaka |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0272547 A1 | 9/2014 | Ramasubramanian et al. |
| 2014/0315097 A1 | 10/2014 | Tan et al. |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum et al. |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0031791 A1 | 2/2016 | Clark et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Junzheng et al. |
| 2020/0411825 A1 | 12/2020 | Bazzarella et al. |
| 2021/0091366 A1 | 3/2021 | Bazzarella et al. |
| 2021/0167351 A1 | 6/2021 | Zagars et al. |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0359527 A1 | 11/2021 | Taylor et al. |
| 2021/0376380 A1 | 12/2021 | Tan et al. |
| 2021/0384516 A1 | 12/2021 | Michael et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |
| 2023/0018078 A1 | 1/2023 | Slocum et al. |
| 2023/0022329 A1 | 1/2023 | Chen et al. |

(56) References Cited

U.S. PATENT DOCUMENTS

| | | |
|---|---|---|
| 2023/0085181 A1 | 3/2023 | Tan et al. |
| 2023/0090853 A1 | 3/2023 | Tyler et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |

FOREIGN PATENT DOCUMENTS

| | | |
|---|---|---|
| CN | 1791999 A | 6/2006 |
| CN | 1883075 A | 12/2006 |
| CN | 101171703 A | 4/2008 |
| CN | 101212070 | 7/2008 |
| CN | 101669231 A | 3/2010 |
| CN | 101796654 A | 8/2010 |
| CN | 102089921 A | 6/2011 |
| CN | 102549808 A | 7/2012 |
| CN | 102983369 A | 3/2013 |
| CN | 103959515 A | 7/2014 |
| CN | 104009192 A | 8/2014 |
| CN | 104040764 A | 9/2014 |
| CN | 107112444 A | 8/2017 |
| CN | 111384404 A | 7/2020 |
| DE | 102013202367 | 8/2014 |
| EP | 0602976 A1 | 6/1994 |
| EP | 1422769 A1 | 5/2004 |
| JP | S62-008932 B2 | 2/1987 |
| JP | S62117261 A | 5/1987 |
| JP | H02-94619 A | 4/1990 |
| JP | H06-187998 | 7/1994 |
| JP | H10-027602 A | 1/1998 |
| JP | H11-111265 | 4/1999 |
| JP | 2000-260423 A | 9/2000 |
| JP | 2002-359006 | 12/2002 |
| JP | 2003-123832 | 4/2003 |
| JP | 2003-532277 A | 10/2003 |
| JP | 2003-317731 A | 11/2003 |
| JP | 2004158222 A | 6/2004 |
| JP | 2005-056729 A | 3/2005 |
| JP | 2005-071658 | 3/2005 |
| JP | 2006-172766 A | 6/2006 |
| JP | 2006-172773 A | 6/2006 |
| JP | 2006-269288 A | 10/2006 |
| JP | 2006324114 A | 11/2006 |
| JP | 2007-115678 A | 5/2007 |
| JP | 3993223 B2 | 10/2007 |
| JP | 2007-335283 | 12/2007 |
| JP | 2008034556 A | 2/2008 |
| JP | 2008198492 A | 8/2008 |
| JP | 2009-059709 A | 3/2009 |
| JP | 2009-176513 A | 8/2009 |
| JP | 2010-062008 | 3/2010 |
| JP | 2010-073421 A | 4/2010 |
| JP | 2010157510 A | 7/2010 |
| JP | 2010-245000 A | 10/2010 |
| JP | 2011-077269 | 4/2011 |
| JP | 4873703 B2 | 2/2012 |
| JP | 2012-204182 A | 10/2012 |
| JP | 2013-145649 | 7/2013 |
| JP | 2014193111 A | 10/2014 |
| JP | 2015-520490 | 7/2015 |
| KR | 100870355 B1 | 11/2008 |
| KR | 1020100016711 | 2/2010 |
| KR | 20120023491 A | 3/2012 |
| KR | 20140005075 A | 1/2014 |
| KR | 20140039022 A | 3/2014 |
| KR | 20140085589 A | 7/2014 |
| KR | 20140144870 A | 12/2014 |
| WO | WO 85/00248 | 1/1985 |
| WO | WO 2001/041232 | 7/2001 |
| WO | WO-03041211 A2 | 5/2003 |
| WO | WO2004027901 A2 | 4/2004 |
| WO | WO-2006120959 A1 | 11/2006 |
| WO | WO-2009032986 A2 | 3/2009 |
| WO | WO-2009118910 A1 | 10/2009 |
| WO | WO 2010/032362 | 3/2010 |
| WO | WO 2010/118060 | 10/2010 |
| WO | WO 2010/137415 | 12/2010 |
| WO | WO 2010/150077 | 12/2010 |
| WO | WO 2011/052094 | 5/2011 |
| WO | WO 2011/095758 | 8/2011 |
| WO | WO 2011/099793 | 8/2011 |
| WO | WO 2012/024499 | 2/2012 |
| WO | WO 2012/077707 | 6/2012 |
| WO | WO 2012/088442 | 6/2012 |
| WO | WO-2013078027 A2 | 5/2013 |
| WO | WO 2013/124423 | 8/2013 |
| WO | WO 2013/173689 | 11/2013 |
| WO | WO-2014017463 A1 | 1/2014 |
| WO | WO-2014093876 A1 | 6/2014 |
| WO | WO 2014/150210 | 9/2014 |
| WO | WO 2016/073575 | 5/2016 |
| WO | WO2016131141 A1 | 8/2016 |
| WO | WO-2021087465 A1 | 5/2021 |
| WO | WO-2022212404 A1 | 10/2022 |
| WO | WO-2023076513 A1 | 5/2023 |

OTHER PUBLICATIONS

Office Action for U.S. Appl. No. 13/607,021, dated Jul. 10, 2015, 4 pages.
International Search Report and Written Opinion for International Application No. PCT/US2012/054219, dated Feb. 21, 2013, 13 pages.
Office Action for U.S. Appl. No. 14/926,760, dated Jun. 27, 2018, 10 pages.
Office Action for U.S. Appl. No. 14/926,760, dated Feb. 25, 2019, 9 pages.
Notification of the First Office Action for Chinese Application No. 201280051582.5, dated Nov. 4, 2015, 19 pages.
Notification of the Second Office Action for Chinese Application No. 201280051582.5, dated Aug. 26, 2016, 7 pages.
Extended European Search Report for European Application No. 12830248.6, dated Mar. 6, 2015, 6 pages.
Office Action for European Application No. 12830248.6, dated Jan. 19, 2017, 5 pages.
Notice of Reasons for Rejection for Japanese Patent Application No. 2014-529905, dated Jun. 29, 2016, 9 pages.
Office Action for U.S. Appl. No. 13/606,986, dated Jan. 14, 2016, 14 pages.
Office Action for U.S. Appl. No. 13/606,986, dated Jun. 3, 2016, 18 pages.
Office Action for U.S. Appl. No. 13/606,986, dated Jan. 26, 2017, 16 pages.
International Search Report and Written Opinion for International Application No. PCT/US2012/054218, dated Feb. 15, 2013, 10 pages.
Office Action for U.S. Appl. No. 13/832,836, dated Feb. 26, 2015, 9 pages.
Extended European Search Report for European Application No. 13791074.1, dated Mar. 31, 2016, 6 pages.
Office Action for European Application No. 13791074.1, dated Aug. 7, 2018, 5 pages.
Notice of Reasons for Rejection for Japanese Application No. 2015-512878, dated Apr. 19, 2017, 7 pages.
Notice of Reasons for Rejection for Japanese Application No. 2015-512878, dated Mar. 29, 2019, 13 pages.
Notice of Reasons for Rejection for Japanese Application No. 2015-512878, dated Oct. 1, 2019, 6 pages.
Office Action for U.S. Appl. No. 14/543,489, dated Jul. 6, 2015, 9 pages.
Office Action for U.S. Appl. No. 14/543,489, dated Feb. 12, 2016, 7 pages.
International Search Report and Written Opinion for International Application No. PCT/US2013/041537, dated Oct. 10, 2013, 9 pages.
Extended European Search Report for European Application No. 20153431.0, dated Aug. 7, 2020, 12 pages.

(56) References Cited

OTHER PUBLICATIONS

Notice of Reasons for Rejection for Japanese Application No. 2018-088757, dated Apr. 8, 2019, 9 pages.
Notice of Reasons for Rejection for Japanese Application No. 2018-088757, dated Oct. 2, 2019, 6 pages.
Notice of Reasons for Rejection for Japanese Application No. 2018-088757, dated Apr. 2, 2020, 6 pages.
Notice of Reasons for Rejection for Japanese Application No. 2018-088757, dated Oct. 27, 2020, 7 pages.
Office Action for U.S. Appl. No. 15/188,374, dated Apr. 12, 2017, 9 pages.
Office Action for U.S. Appl. No. 15/724,701, dated Apr. 4, 2019, 8 pages.
Office Action for U.S. Appl. No. 16/705,949, dated Dec. 9, 2020, 7 pages.
Office Action for Canadian Application No. 2,895,142, dated Oct. 22, 2021, 6 pages.
First Office Action for Chinese Application No. 201580057914.4, dated Jul. 8, 2019, 17 pages.
Second Office Action for Chinese Application No. 201580057914.4, dated Dec. 12, 2019, 7 pages.
Third Office Action for Chinese Application No. 201580057914.4, dated Apr. 13, 2020, 21 pages.
Fourth Office Action for Chinese Application No. 201580057914.4, dated Jul. 29, 2020, 14 pages.
Office Action for European Application No. 15794037.0, dated Jun. 4, 2019, 9 pages.
Office Action for European Application No. 15794037.0, dated Jan. 3, 2020, 6 pages.
Office Action for European Application No. 15794037.0, dated Aug. 27, 2020, 7 pages.
First Examination Report for Indian Application No. 201717010973, dated Aug. 16, 2020, 6 pages.
Notice of Reasons for Rejection for Japanese Application No. 2017-517309, dated Aug. 26, 2019, 11 pages.
Notice of Reasons for Rejection for Japanese Application No. 2017-517309, dated May 18, 2020, 13 pages.
Substantive Examination Adverse Report (Section 30(1) / 30(2)) and Search Report for Malaysian Application No. PI2017000573, dated May 8, 2020, 4 pages.
Office Action for U.S. Appl. No. 14/932,153, dated Aug. 7, 2018, 6 pages.
Office Action for U.S. Appl. No. 14/932,153, dated Jan. 31, 2019, 7 pages.
International Search Report and Written Opinion for International Application No. PCT/US2015/058992, dated Jan. 14, 2016, 10 pages.
Examination Report No. 1 for Australian Application No. 2016280285, dated Nov. 2, 2020, 6 pages.
Examination Report for Canadian Application No. 2,962,788 dated Oct. 6, 2021, 3 pages.
First Office Action for Chinese Application No. 201680004584.7, dated Feb. 3, 2019, 17 pages.
Second Office Action for Chinese Application No. 201680004584.7, dated Aug. 15, 2019, 27 pages.
Third Office Action for Chinese Application No. 201680004584.7, dated Jan. 3, 2020, 24 pages.
Rejection Decision for Chinese Application No. 201680004584.7, dated May 11, 2020, 17 pages.
Notification of Reexamination for Chinese Application No. 201680004584.7, dated Oct. 28, 2020, 21 pages.
Extended European Search Report for European Application No. 16812533.4, dated Nov. 19, 2018, 7 pages.
Office Action for European Application No. 16812533.4, dated Jul. 31, 2020, 4 pages.
Office Action for Indian Application No. 201717017343, dated Jul. 9, 2020, 6 pages.
Office Action for Japanese Application No. 2017-526929, dated Feb. 18, 2020, 19 pages.
Substantive Examination Adverse Report (Section 30(1) / 30(2)) and Search Report for Malaysian Application No. PI2017000885, dated Jun. 18, 2020, 4 pages.
Substantive Examination Report (Restriction) for Philippines Patent Application No. 1-2017-500970, dated Mar. 14, 2019, 3 pages.
Subsequent Substantive Examination Report for Philippines Patent Application No. 1-2017-500970, dated Sep. 24, 2019, 10 pages.
Subsequent Substantive Examination Report for Philippines Patent Application No. 1-2017-500970, dated Dec. 6, 2019, 4 pages.
Office Action for U.S. Appl. No. 15/185,625, dated Nov. 2, 2017, 11 pages.
Office Action for U.S. Appl. No. 15/185,625, dated May 18, 2018, 9 pages.
International Search Report and Written Opinion for International Application No. PCT/US2016/038098, dated Oct. 31, 2016, 14 pages.
Office Action for U.S. Appl. No. 16/201,283, dated Jun. 15, 2020, 13 pages.
Office Action for U.S. Appl. No. 16/201,283, dated Oct. 23, 2020, 13 pages.
Office Action for U.S. Appl. No. 16/736,460, dated Sep. 28, 2021, 16 pages.
Armand, M. et al., "Conjugated dicarboxylate anodes for Li-ion batteries," Nature Materials, 8:120-125 (2009).
Bervas, M. et al., "Investigation of the Lithiation and Delithiation Conversion Mechanisms in a Bismuth Fluoride Nanocomposites," Journal of The Electrochemical Society, 153(4):A799-A808 (2006).
Chan, C. K. et al., "High-performance lithium battery anodes using silicon nanowires," Nature Nanotechnology, 3:31-35 (2008).
Duduta, M. et al., "Semi-Solid Lithium Rechargeable Flow Battery," Advanced Energy Materials. 1(4):511-516 (2011).
Li, H. et al., "Li-Storage via Heterogeneous Reaction in Selected Binary Metal Fluorides and Oxides," Journal of Electrochemical Society, 151(11):A1878-A1885 (2004).
Nakahara, K. et al. "Rechargeable batteries with organic radical cathodes," Chemical Physics Letters, 359:351-354 (2002).
Nishide, H. et al., "Organic radical battery: nitroxide polymers as a cathode-active material," Electrochimica Acta, 50:827-831 (2004).
Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).
Decision to Grant for Japanese Application No. 2020-184414, dated May 23, 2022, 3 Pages.
Examination Report for Canadian Application No. 2,969,135, dated Mar. 30, 2022, 3 pages.
Extended European Search Report for European Application No. 21196368.1, dated Feb. 16, 2022, 8 pages.
Final Office Action for U.S. Appl. No. 17/109,686, dated Jul. 20, 2022, 14 pages.
International Search Report and Written Opinion for International Application No. PCT/US2022/022382, dated Jul. 18, 2022, 14 pages.
Office Action for Japanese Application No. 2021-092052, dated Mar. 28, 2022, 13 pages.
Office Action for U.S. Appl. No. 17/109,686, dated Feb. 9, 2022, 15 pages.
Office Action for Canadian Application No. 2,962,788, dated Mar. 31, 2022, 4 pages.
International Preliminary on Patentability for International Application No. PCT/US2020/061498, dated Jun. 2, 2022, 13 pages.
First Office Action for Chinese Application No. 202110490592.X dated May 11, 2022, 21 pages.
Invitation to Pay Additional Fees for International Application No. PCT/US2020/061498, dated Feb. 18, 2021, 13 pages.
Office Action for Japanese Application No. 2021-054101, dated Dec. 27, 2021, 7 pages.
Canadian Office Action for Application No. CA20162969135 dated Dec. 1, 2022, 5 pages.
Non Final Office Action for U.S. Appl. No. 17/169,862, dated Nov. 30, 2022, 12 pages.
Notice of Reasons for Rejection for Japanese Application No. 2021-054104, dated Sep. 13, 2022, 4 pages.

(56) References Cited

OTHER PUBLICATIONS

Notice of Allowance for U.S. Appl. No. 17/109,686, dated Nov. 16, 2022, 10 pages.
Notice of Allowance for U.S. Appl. No. 17/109,686, dated Nov. 23, 2022, 5 pages.
Office Action for Canadian Application No. 2,962,788, dated Nov. 1, 2022, 4 pages.
Office Action for Korean Application No. 10-2017-7015132, dated Oct. 12, 2022, 17 pages.
Office Action for U.S. Appl. No. 17/402,059, dated Aug. 5, 2022, 6 pages.
Reinhart et al., "Research and Demonstration Center for the Production of Large-Area Lithium-Ion Cells," Future Trends in Production Engineering, Jan. 1, 2012, pp. 3-12.
Restriction Requirement for U.S. Appl. No. 17/169,862, dated Sep. 21, 2022, 9 pages.
Examination Report for Canadian Application No. 2,962,788, dated Mar. 23, 2023, 3 pages.
Grant Notification for Indonesian Application No. P00201703544, dated Apr. 5, 2023, 4 pages.
International Search Report and Written Opinion for Application No. PCT/US2022/048085, dated Feb. 16, 2023, 16 pages.
Notice of Allowance for U.S. Appl. No. 17/169,862 dated Apr. 21, 2023, 8 pages.
Notice of Allowance for U.S. Appl. No. 17/402,059 dated Jan. 19, 2023, 7 pages.
Office Action and Search Report for Chinese Application No. CN202110490592.X dated Feb. 23, 2023, 14 pages.
Office Action for Indian Application No. IN201717010973 dated Dec. 29, 2022, 2 pages.
Office Action for Indian Application No. IN201717010973 dated Feb. 3, 2023, 2 pages.
Office Action for Indian Application No. IN201717010973 dated Feb. 27, 2023, 2 pages.
Office Action for Japanese Application No. JP20210092052 dated Feb. 7, 2023, 9 pages.
Office Action for Japanese Application No. JP2022099328 dated May 8, 2023, 7 pages.
Office Action for Korean Application No. KR20177018200 dated Feb. 21, 2023, 14 pages.
Office Action for U.S. Appl. No. 17/683,557, dated Mar. 28, 2023, 8 pages.
First Office Action and Search Report for Chinese Application No. 202080081045 dated Jul. 26, 2023, 20 pages.
Office Action and Search Report for Chinese Application No. 20211045727 dated Jul. 15, 2023, 19 pages.
Office Action for Canadian Application No. 2969135 dated Jul. 19, 2023, 5 pages.
Office Action for Chinese Application No. 202110490592 dated May 27, 2023, 17 pages.
Office Action for Japanese Application No. 2020-119675, dated Sep. 14, 2021, 24 pages.
Office Action for Korean Application No. 20177015132 dated May 30, 2023, 5 pages.
Substantive Examination Report for Philippines Application No. 1-2017-500654 dated Jul. 11, 2023, 5 pages.

\* cited by examiner

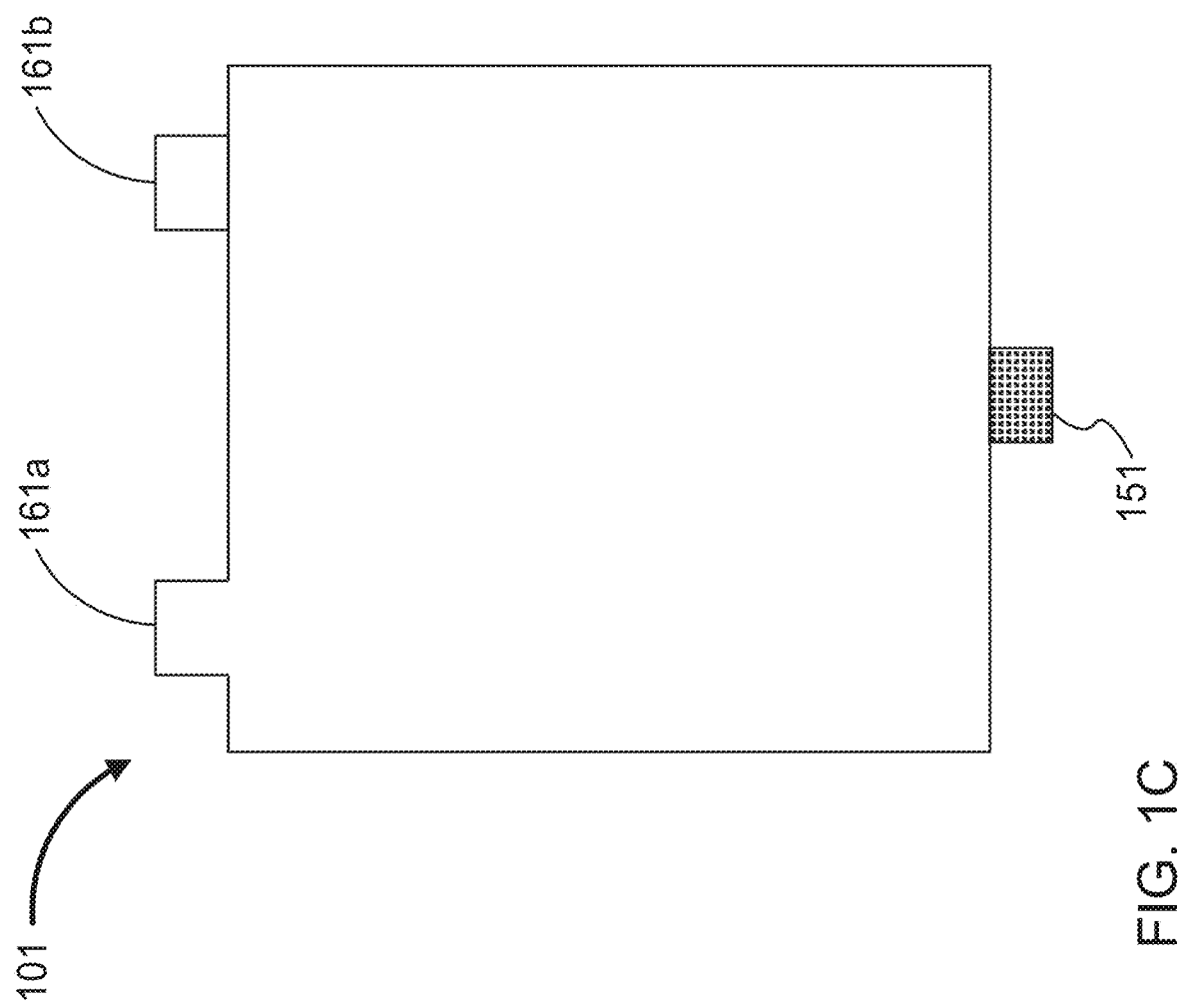

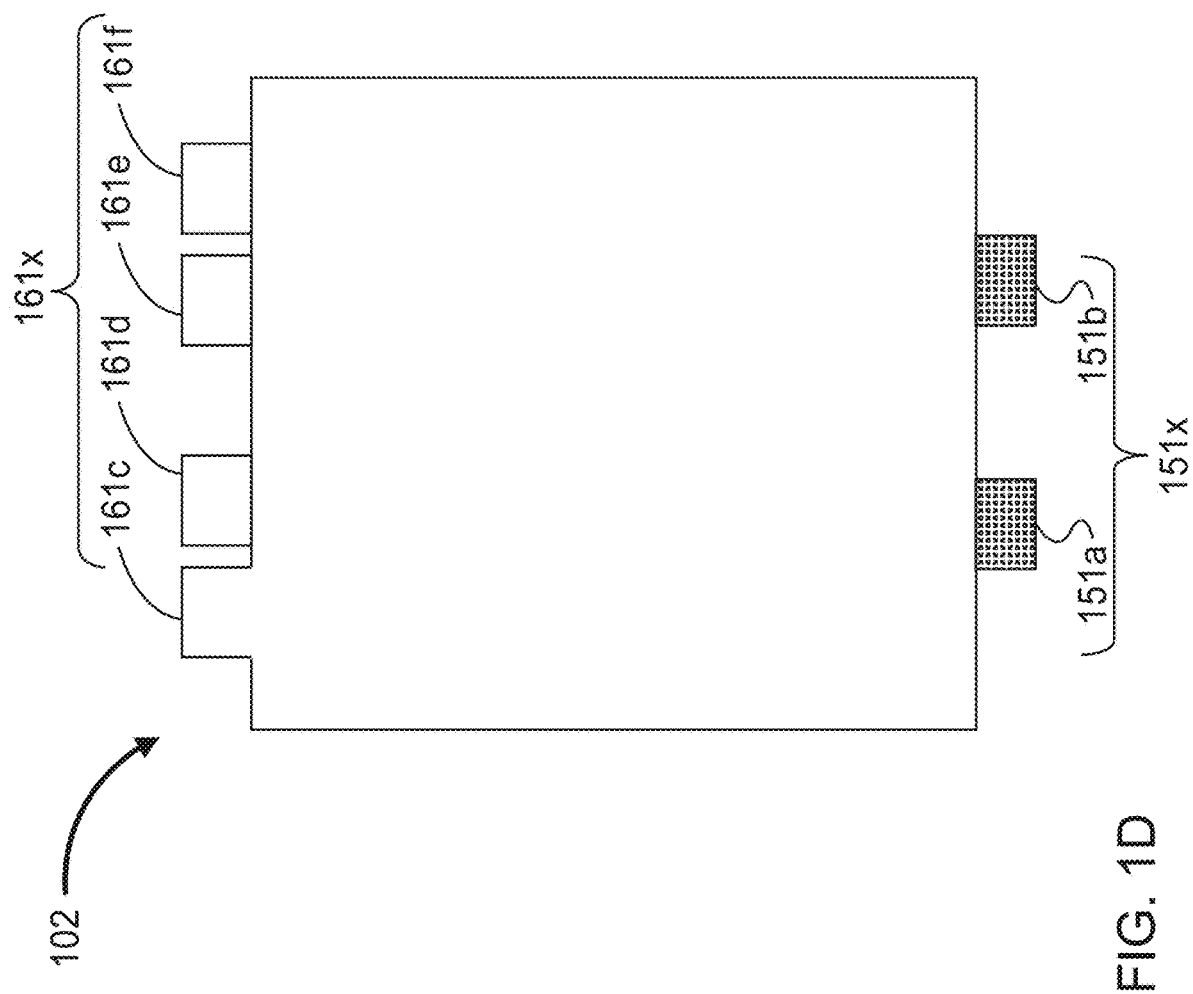

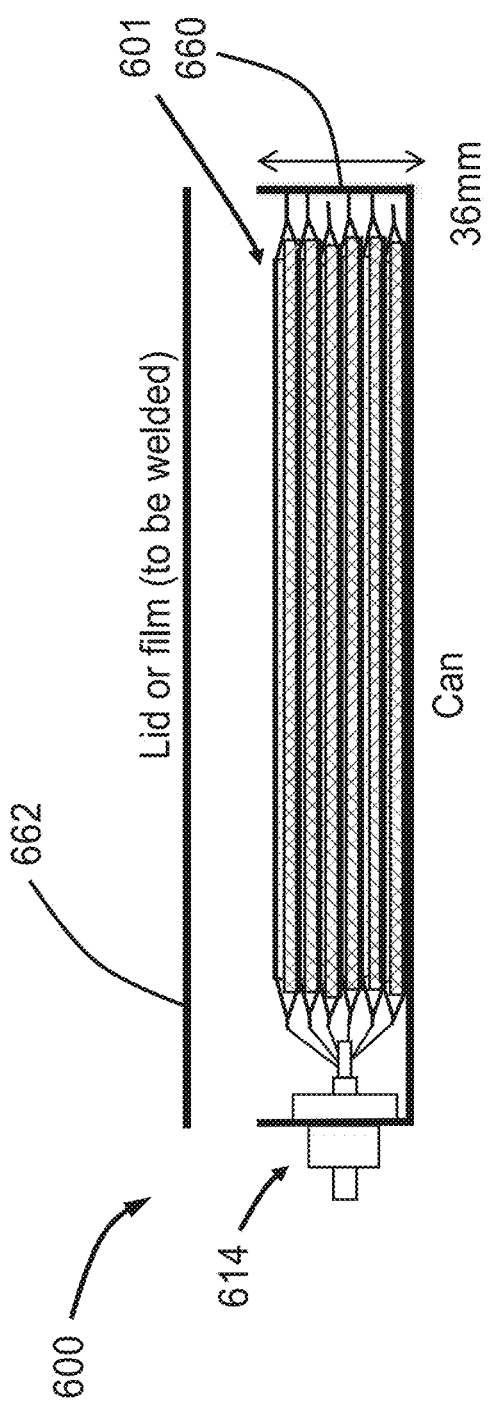
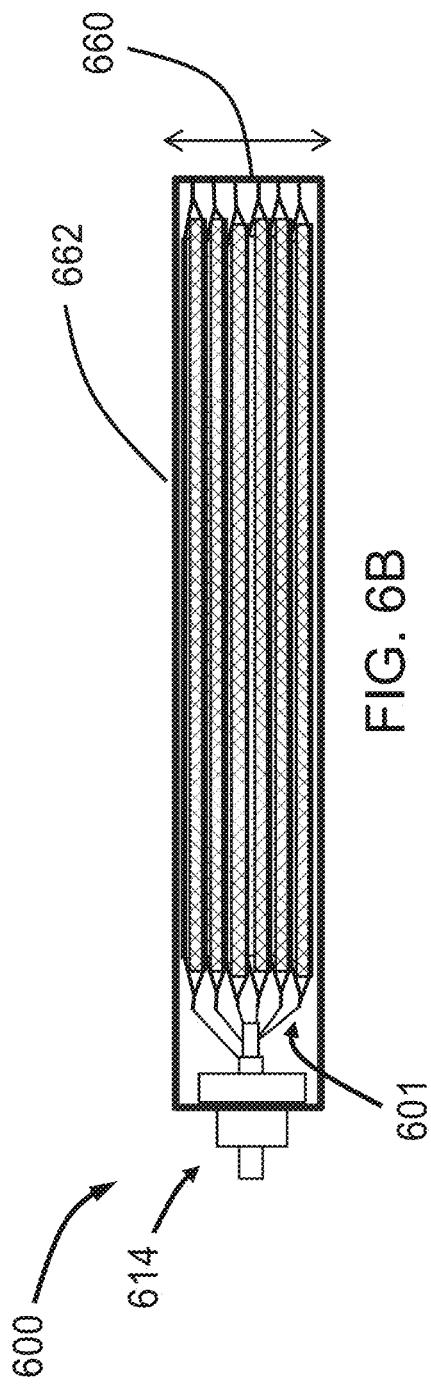

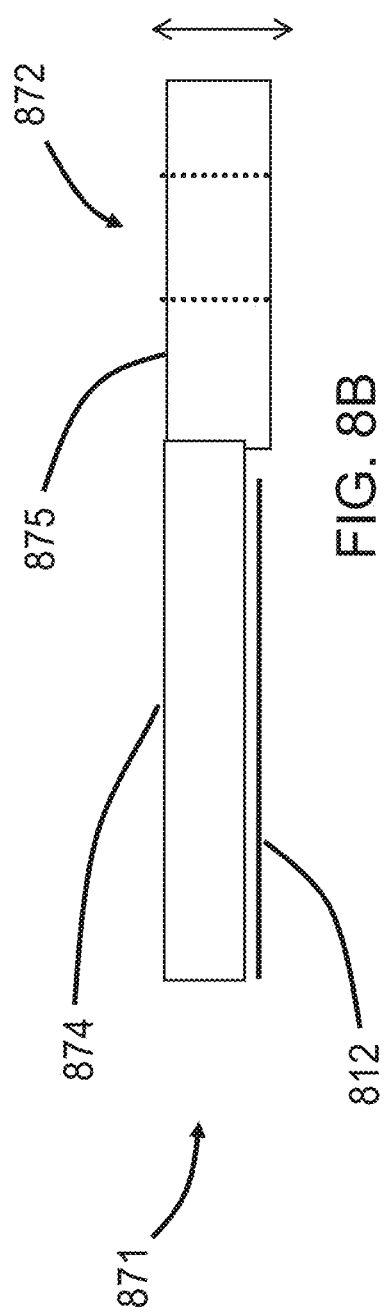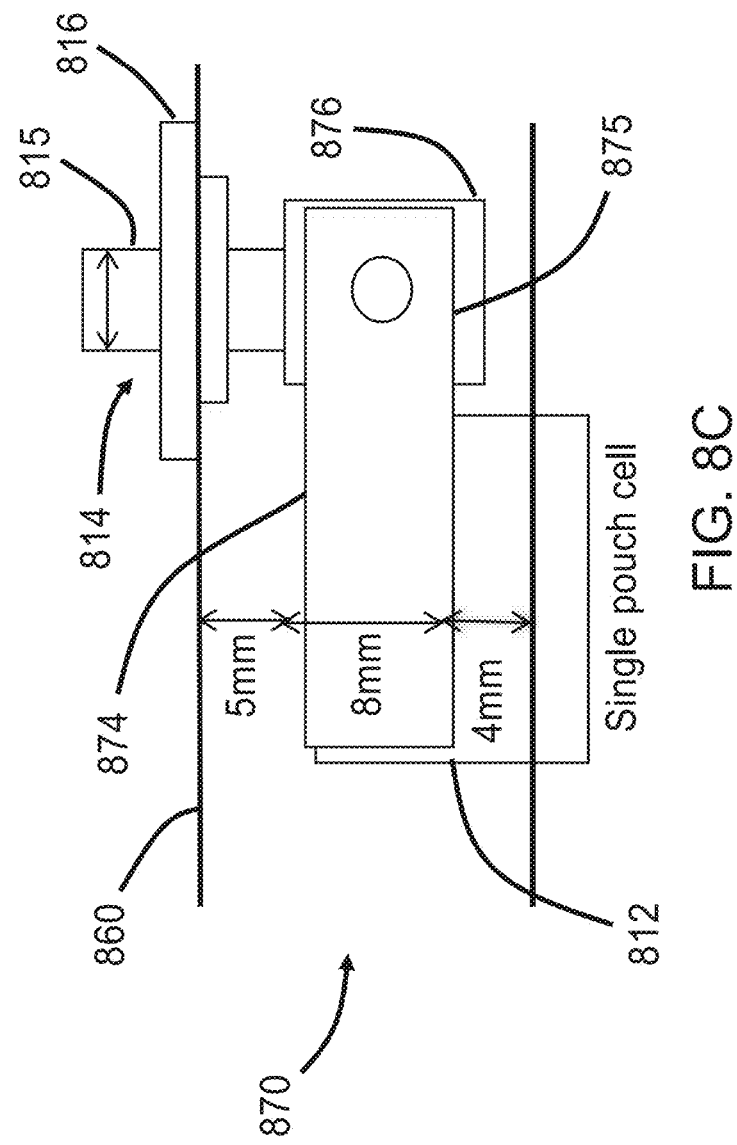

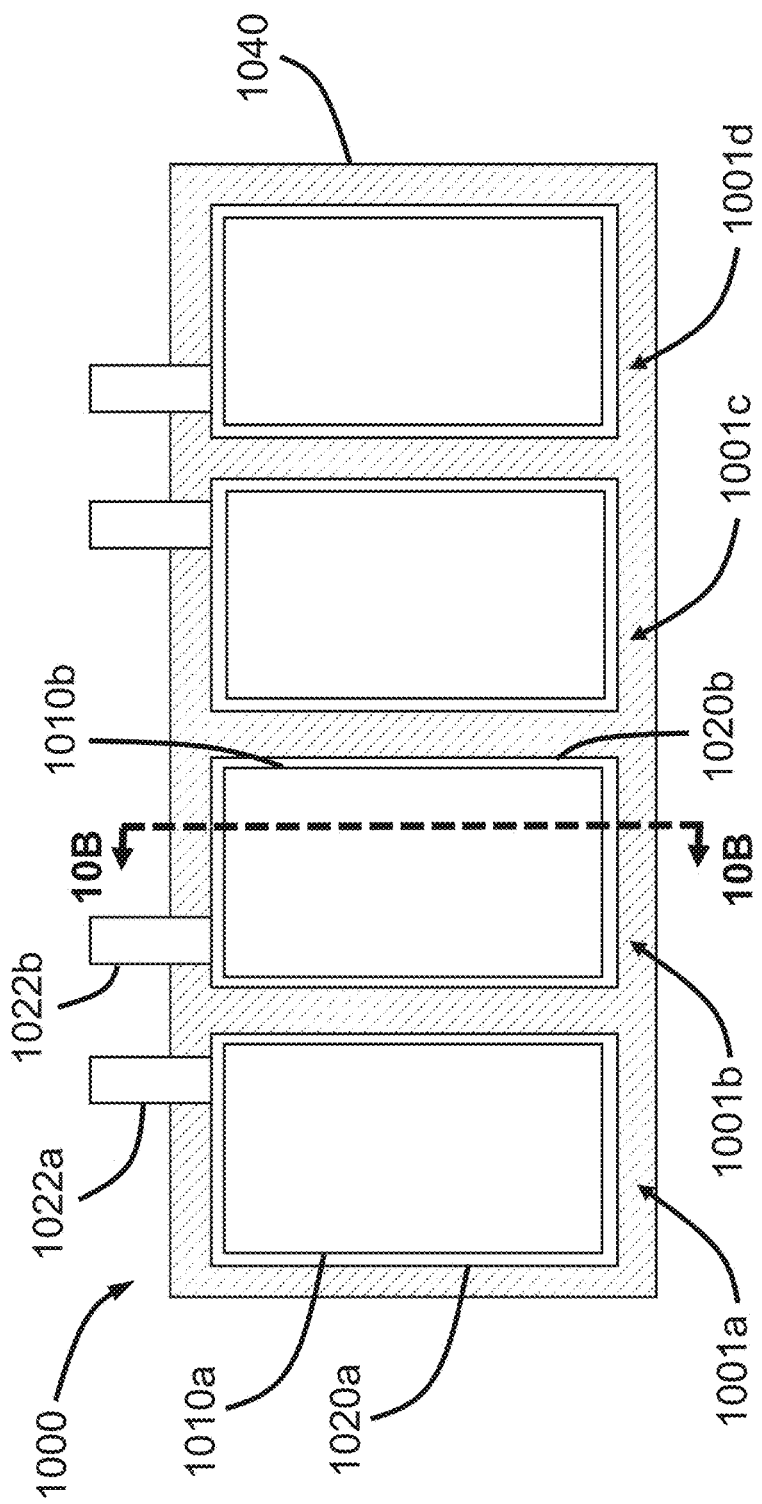
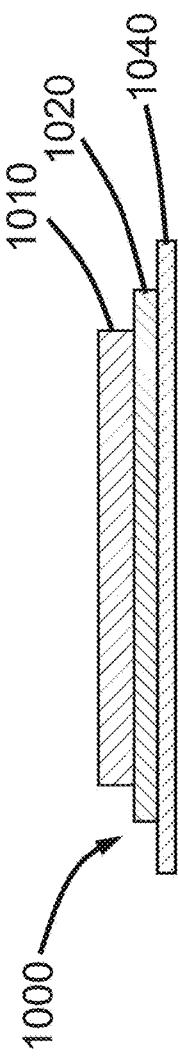
FIG. 10A
FIG. 10B

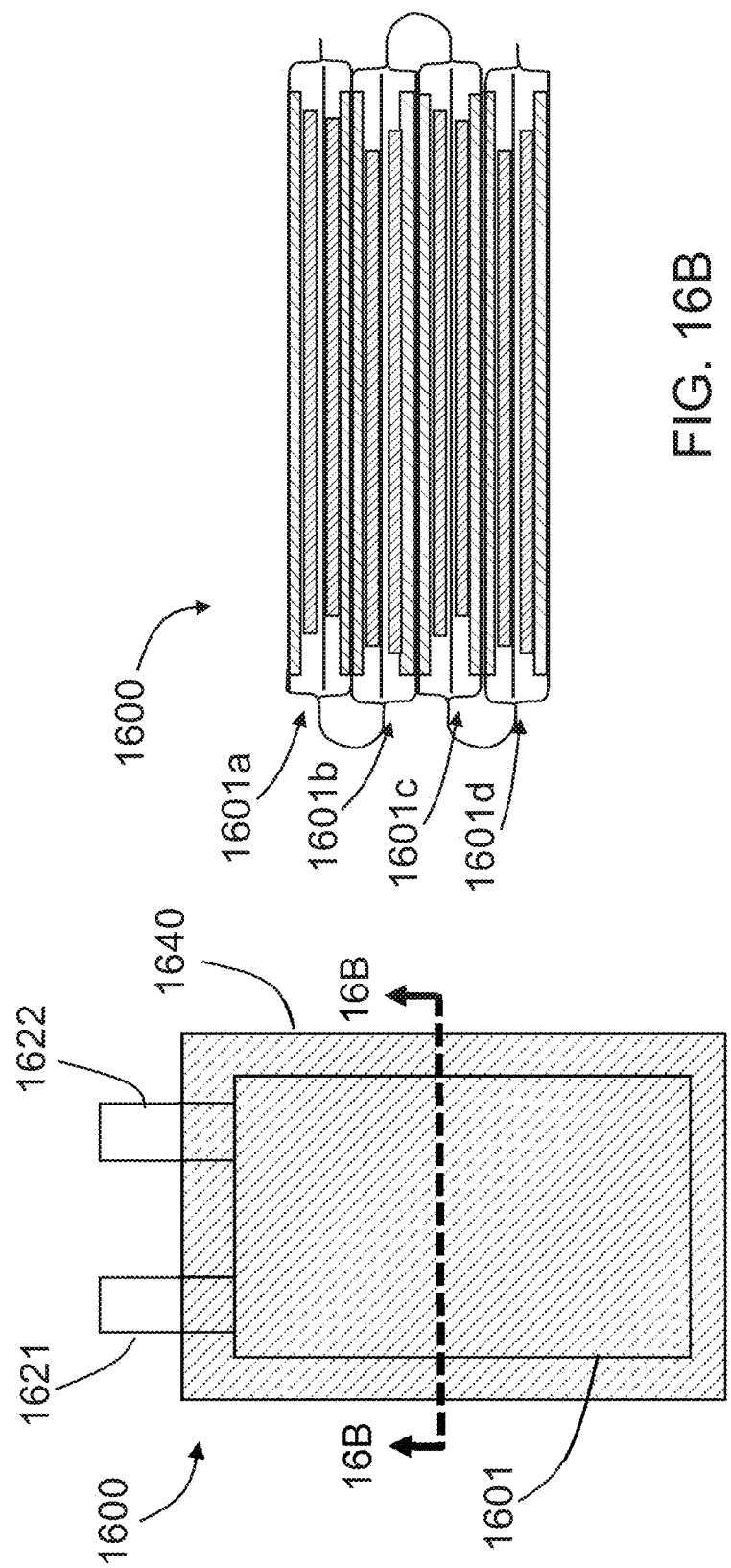

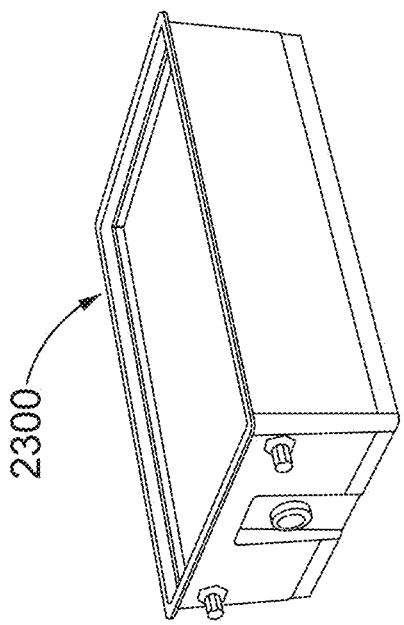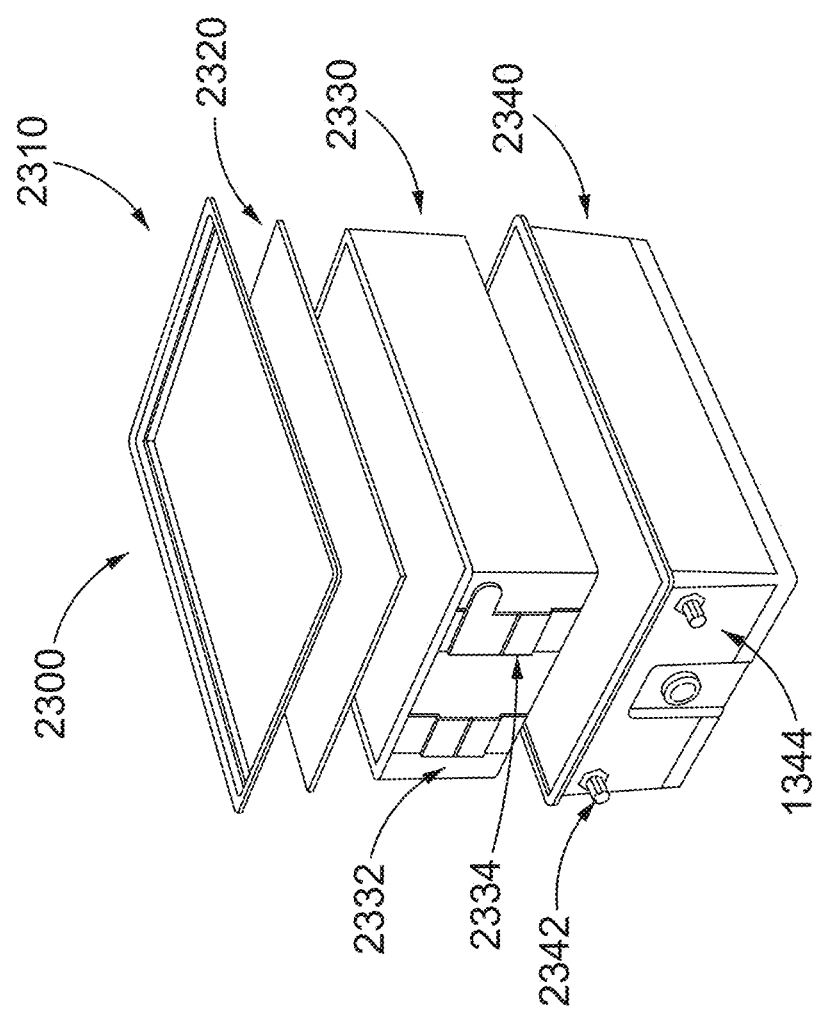

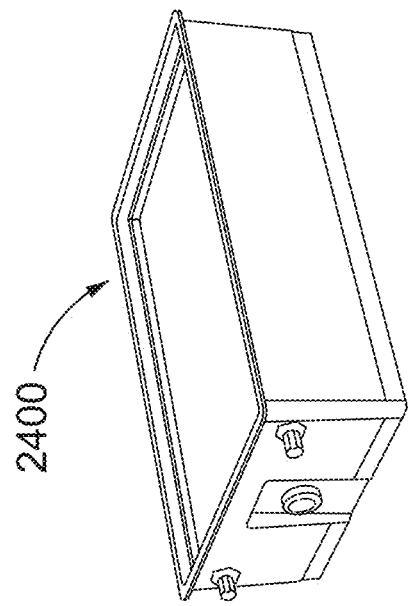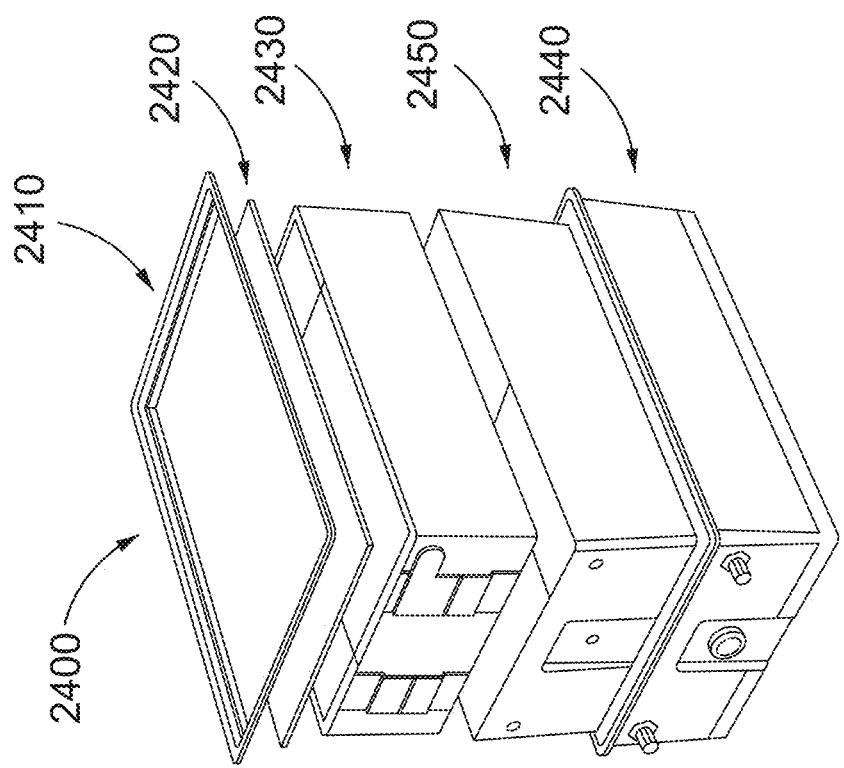

US 11,831,026 B2

SINGLE POUCH BATTERY CELLS AND METHODS OF MANUFACTURE

CROSS-REFERENCE TO RELATED APPLICATIONS

This application is a continuation of U.S. patent application Ser. No. 16/201,283, filed Nov. 27, 2018 and titled "Single Pouch Battery Cells and Methods of Manufacture," which is a continuation of U.S. patent application Ser. No. 15/185,625, filed Jun. 17, 2016, now U.S. Pat. No. 10,181,587, and titled "Single Pouch Battery Cells and Methods of Manufacture," which claims priority to and the benefit of U.S. Provisional Patent Application Ser. No. 62/181,385, entitled "Single Pouch Battery Cells and Methods of Manufacture," filed Jun. 18, 2015, the disclosures of which are hereby incorporated by reference in their entirety.

BACKGROUND

Embodiments described herein relate generally to the preparation of battery cells and more particularly to systems and methods of preparing and using single pouch battery cells in a battery module.

Lithium-ion electrochemical (battery) cells typically include alternating layers of anode and cathode separated by separators. A combination of one anode and one cathode separated by one separator can be referred to as one stack. Multiple stacks are normally connected in parallel and inserted into a pouch to form a battery cell. The number of stacks within a battery cell (and according a pouch) is usually relatively large (e.g., >20) so as to increase the capacity. The pouch also includes an electrolyte (e.g., an organic solvent and dissolved lithium salt), normally introduced in a carefully controlled environment, to provide media for lithium ion transport. The amount of electrolyte within a pouch can be proportional to the number of stacks within the pouch, i.e., more electrolytes for more stacks.

In manufacturing, a battery cell can be constructed by stacking alternating layers of electrodes (typical for high-rate capability prismatic cells), or by winding long strips of electrodes into a "jelly roll" configuration (typical for cylindrical cells). Electrode stacks or rolls can be inserted into hard cases that are sealed with gaskets (most commercial cylindrical cells), laser-welded hard cases, or enclosed in foil pouches with heat-sealed seams (commonly referred to as lithium-ion polymer cells).

One promising application of lithium-ion battery cells is in automotive battery packs, which typically include a large number of battery cells, sometimes several hundreds, even thousands, to meet desired power and capacity needs. Each battery cell can further contain a plurality of stacks (i.e., anodes, cathodes, and separators) and electrode leads (i.e., tabs). Several cells are usually joined together through battery tabs and bus-bars (i.e., interconnecting units) to form a module. A typical battery pack can then include tens of such modules. As a result, a significant amount of jointing, such as welding, is normally needed to deliver the desired amount of power and capacity in a battery pack.

SUMMARY

Apparatus, systems, and methods described herein relate to the manufacture and use of single pouch battery cells. In some embodiments, an electrochemical cell includes a first current collector coupled to a first portion of a pouch, the first current collector having a first electrode material disposed thereon, a second current collector coupled to a second portion of the pouch, the second current collector having a second electrode material disposed thereon, and a separator disposed between the first electrode material and the second electrode material. The first portion of the pouch is coupled to the second portion of the pouch to enclose the electrochemical cell.

BRIEF DESCRIPTION OF THE DRAWINGS

FIG. 1C is a top plan view of the battery cell shown in FIG. 1B.

FIG. 1D is a top plan view of another battery cell, according to some embodiments.

FIG. 6A is a side view of a battery module (with its lid open) including single pouch battery cells enclosed in a metal case, according to some embodiments.

FIG. 6B is another side view of the battery module shown in FIG. 6A after the lid is closed.

FIG. 8B shows a spacer of the tab design, including the tab connection regions in the battery module shown in FIG. 8A.

FIG. 8C shows a connector portion of the battery module shown in FIG. 8A.

FIG. 10A shows a layout of an anode assembly including multiple anodes disposed on a pouch film, according to some embodiments.

FIG. 10B shows a cross sectional view of the anode assembly shown in FIG. 10A.

FIGS. 16A-16B show a top view and a cross sectional view of the unit cell stack prepared by the methods illustrated in FIGS. 15A-15B.

FIGS. 23A-23B are collapsed view and exploded view of a battery module including a plurality of single pouch battery modules enclosed in a metal case, according to some embodiments.

FIGS. 24A-24B are collapsed view and exploded view of a battery module including a plurality of single pouch battery modules enclosed in a plastic case, according to some embodiments.

DETAILED DESCRIPTION

Figure 1A:
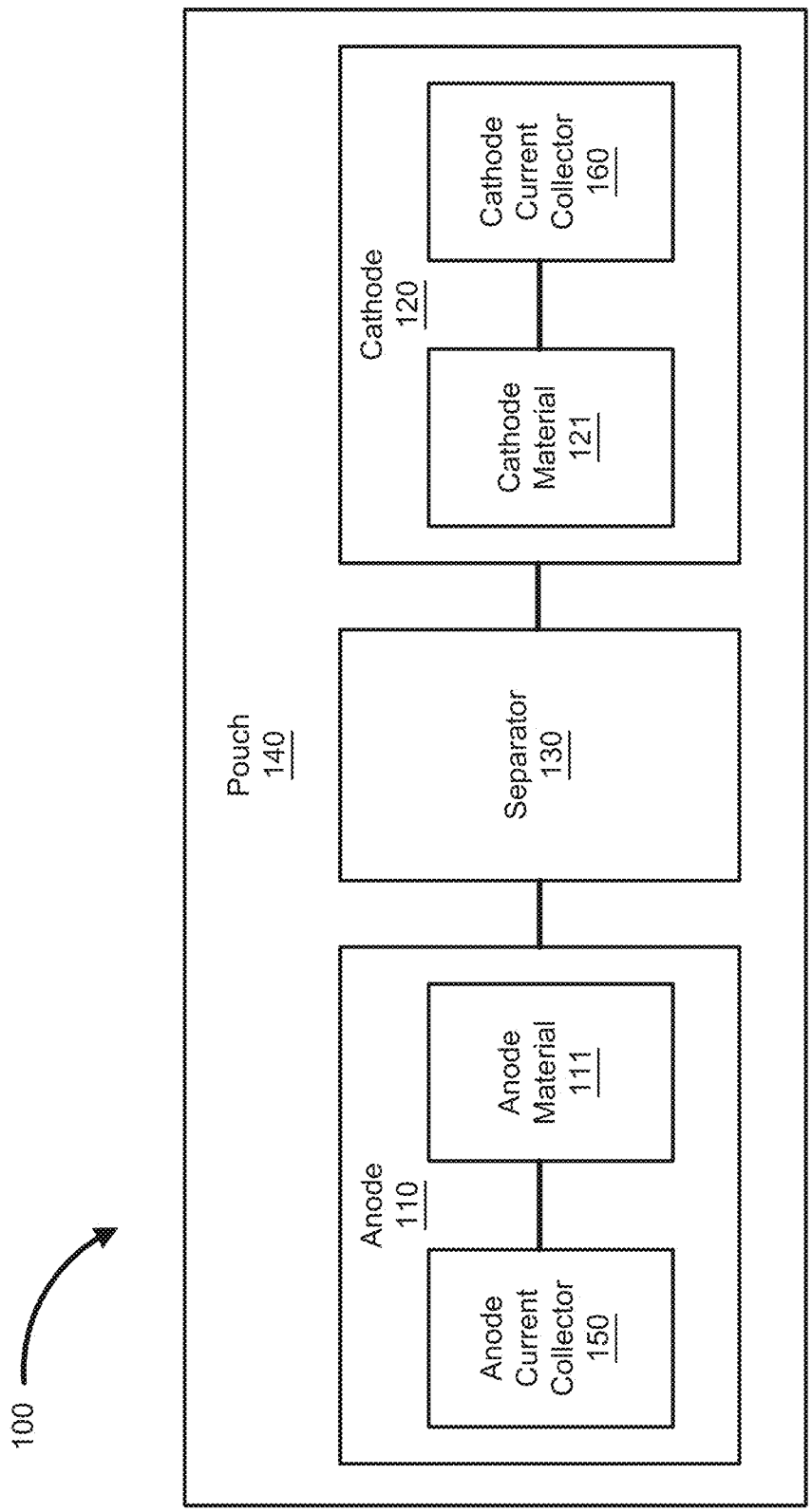
FIG. 1A is a schematic view of a battery cell, according to an embodiment.

Embodiments described herein relate generally to single pouch battery cells and particularly to systems and methods of making and using single pouch battery cells in a battery module or a battery pack. In some embodiments, a single pouch battery cell includes an anode, a cathode, a separator disposed in between, and a pouch to contain the anode, the cathode, and the separator so as to form the single pouch battery cell. In some embodiments, the anode and/or the cathode include semi-solid electrode materials.

Reducing the amount of non-electrochemically active material in a battery cell can provide an increase in energy density for a given battery cell. The thickness of the current collectors is typically selected for ease of handling and/or to provide mechanical support for the electrode as opposed to current density considerations. In other words, the current collectors are generally thicker than they need to be to accommodate the high current density produced by the electrochemical reaction in the battery, but thinner current collectors (i.e., optimized for current density) can be very fragile and can tear easily during the manufacturing process. For example, a 20 µm-thick current collector currently used in some conventional batteries can easily handle the amount of current produced in a conventional battery, where only a few µm of current collector would be needed to shuttle the electrons.

As described herein, a single pouch cell can enable using a thinner current collector while improving other aspects of the battery cell architecture. For example, a current collector can be coupled to the pouch and the pouch can provide the physical support of the current collector and improve handling so a thinner current collector can be used for electrical conduction in conjunction with the use of the pouch. Some additional benefits of this approach include, but are not limited to: (i) mitigation or elimination of defect propagation from one battery cell to adjacent battery cell(s), (ii) reduction of fire hazard or other thermal hazards induced by the large amount of flammable electrolyte in conventional batteries; (iii) reduction or elimination of metal contamination, which can be introduced into electrode materials during welding processes in conventional battery manufacturing and can cause internal short circuit within the battery, thereby compromising the performance of the battery, (iv) easier handling of individual pouches when stacking multiple single pouch battery cells into a battery module or a battery pack, (v) convenience of screening and rejection of individual pouch when manufacturing multi-pouch or multi-stack batteries, thereby increasing manufacturing yield (by capacity, thickness, impedance, weight, etc.); (vi) providing a means for supporting the semi-solid electrode material during battery or electrode manufacturing, thereby achieving uniform distribution (e.g., uniform thickness) of electrode materials and avoiding spill-over of electrode materials out of the battery cells; and (vii) reducing or eliminating fire hazard for wet electrodes in welding processes, in which the welding spark can potentially ignite the electrolyte that is normally flammable. The approach of single pouch battery cells can reduce or eliminate such fire hazard because all welding processes can be performed after each individual battery cell contained in the pouch, thereby preventing welding sparks from reaching the electrolyte and igniting the electrolyte. As used herein, the term "semi-solid" refers to a material that is a mixture of liquid and solid phases, for example, such as a particle suspension, colloidal suspension, emulsion, gel, or micelle.

As used herein, the term "single pouch battery cell" refers to a battery cell (also referred to herein as "electrochemical cell") including a pouch typically containing one unit cell assembly, which further includes one anode, one cathode, and one separator. In some cases, as explicitly stated in the specification, a single pouch battery cell can contain two unit cell assemblies.

As used in this specification, the terms "about" and "approximately" generally include plus or minus 10% of the value stated. For example, about 5 would include 4.5 to 5.5, approximately 10 would include 9 to 11, and about 100 would include 90 to 110.

Typical battery manufacturing involves numerous complex and costly processes carried out in series, each of which is subject to yield losses, incurs capital costs for equipment, and includes operating expenses for energy consumption and consumable materials. The process first involves preparing separate anodic and cathodic mixtures (also referred to as "slurries") that are typically mixtures of electrochemically active ion storage compounds, electrically conductive additives, and polymer binders. The mixtures are then coated onto the surfaces of flexible metal foils to form electrodes (anodes and cathodes). The formed electrodes are also typically compressed under high pressure to increase density and control thickness. These compressed electrode/foil composites are then slitted into sizes and/or shapes that are appropriate for the particular form factor of the manufactured battery.

One anode, one cathode, and one separator can be stacked together to form a unit cell assembly. Each unit cell assembly normally also includes conductive tabs (also referred to as a lead) to couple the electrodes to external circuits. Multiple unit cell assemblies are then stacked or arrayed together to form a battery cell. The number of unit cell assemblies in a battery cell may vary depending on, for example, the desired capacity and/or thickness of the resulting battery cell. These stacked unit cell assemblies are electrically in parallel, and respective tabs in each unit cell assembly are typically welded together via welding processes such as resistance welding, laser welding, and ultrasonic welding, seam welding, electric beam welding, among others. A vacuum pouch sealing step can then be carried out to form a battery cell. During vacuum pouch sealing, an electrolyte is typically injected into the stacked unit cell assembly and the unit cell assemblies and the electrolyte are sealed into a pouch.

The sealed battery cell is then subject to a formation process, in which an initial charging operation can be performed to create a stable solid-electrolyte-interphase (SEI) that can passivate the electrode-electrolyte interface as well as prevent side reactions. Moreover, several cycles of charging and discharging of the batteries are usually also carried out to ensure that the capacity of the batteries meets the required specifications. A degassing step is normally performed to release gases introduced either during initial charging stage called pre-charge step or during the electrochemical reactions in the battery formation step. The presence of entrapped gas in the electrodes generally reduces the conductivity and density of the electrodes, and limits the amount of active electrochemical materials that can be placed in a battery cell and may cause lithium dendrite growth that can erode battery performance, i.e., reduction in cycle life, and the overall safety performance. A reseal step may be taken to seal the battery cell again after the entrapped gas is released.

The manufacturing process described above and the resulting batteries may suffer from several issues. The first issue can be defect propagation, either during the manufacturing or during the operation of the batteries. More specifically, during the manufacturing, if there is an issue with one unit cell assembly, the entire cell, which normally includes multiple unit cell assemblies, can become defective. Therefore, the defect of one unit cell assembly can propagate and result in the rejection of multiple unit cell assemblies within the same battery cell, thereby affecting the manufacturing yield. In addition, during battery operations, defects may also propagate from one unit cell assembly to adjacent one(s). For example, a typical defect of batteries is thermal runaway, in which an increased temperature causes more active electrochemical reactions that can further increase the temperature, thereby leading to a positive feedback loop and possibly a destructive cycle. If one unit cell assembly in a battery cell undergoes a thermal runaway reaction, it is likely to cause thermal runaway in adjacent unit cell assemblies by way of various heat transfer mechanisms such as direct case-to-case contact, impingement of hot vent gases, or impingement of flaming vent gases. A chain reaction can occur in which a pack can be destroyed in a few seconds or over several hours as each cell is being consumed.

A second issue in conventional battery manufacturing can be the fire hazard introduced by the large amount of electrolyte within each battery cell. The electrolyte, which is typically hydrocarbon-based in lithium ion batteries, is normally flammable. The hydrocarbon-based electrolyte in lithium-ion cells means that under fire conditions, these cells can behave in a different way than lead acid, NiMH or NiCd cells, which contain a water-based electrolyte. More specifically, leakage or venting of lithium-ion cells can release flammable vapors. If fire impinges on cells with water-based electrolyte, the water in the cells can absorb heat, thereby reducing the total heat release of the fire and mitigating the hazard. In comparison, fire impingement on lithium-ion cells will cause release of flammable electrolyte, thereby increasing the total heat release of the fire and exacerbating the fire hazard. The amount of electrolyte in a battery cell is in general proportional to the amount of electrode materials in the same battery cell. Conventional battery cells, which include multiple unit cell assemblies (i.e., multiple stacks of anodes and cathodes), normally include a correspondingly large amount of electrolyte. The large amount of electrolyte in each battery cell therefore can pose increased fire hazard.

A third issue in conventional battery manufacturing can be the metal contamination introduced during the welding process. Since the welding is normally performed before the entire battery cell that includes multiples stacks of electrodes is sealed into a pouch, the electrodes are exposed to metal particles that are spattered out of the welding portion. An electric short circuit may occur if the metal particles are attached in the vicinity of the welding portion. In addition, the metal particles may be dispersed into the electrode materials during the welding and induce internal short circuits. The same metal contaminated within the cell may create the metal dendrite which would create a short circuit. For instance, copper contamination during welding to the cathode area can be electrochemically deposited onto the anode side during battery cycles which may create an internal short circuit because the copper is not stable under most of cathode material voltage. A copper dendrite is more robust compared to lithium dendrites due to its higher melting temperature.

Single Pouch Battery Cells and Battery Modules

FIG. 1A shows a schematic view of a battery cell that can address, at least partially, the aforementioned issues in conventional battery manufacturing. The battery cell 100 includes an anode 110, which includes anode material 111 disposed on an anode current collector 150 (also referred to herein as "ACC 150"), a cathode 120, which includes cathode material 121 disposed on a cathode current collector 160 (also referred to herein as "CCC 160"), and a separator 130 disposed between the anode 110 and the cathode 120.

The assembly of the anode 110, the cathode 120, and the separator 130 is contained substantially in a pouch 140, which can separate the battery cell 100 from adjacent cell(s) in a battery module or pack, thereby mitigating defect propagation (e.g., fire hazard) by limiting unintended electrochemical reactions to within individual cells. Optionally, the ACC 150 and the CCC 160 can be disposed on the inside of the pouch 140 prior to assembling the anode 110, the cathode 120 or the battery cell 100. The use of a pouch can also reduce or eliminate metal contamination in the electrodes during welding process in the construction of a battery module/pack since the electrodes (i.e., the anode 110 and the cathode 120) are protected by the pouch 140 from metal particles or any other materials that can potentially short-circuit the battery cells. Optionally, in some embodiments, at least one of the ACC 150 and CCC 160 can include a tab or tab connection (not shown) that acts as an electrical lead (or connecting point) to connect to one or more external electrical circuits.

In some embodiments, the ACC 150 and CCC 160 (collectively referred to herein as the "current collector") can include a conductive material in the form of a substrate, sheet or foil, or any other form factor. In some embodiments, the current collector can include a metal such as aluminum, copper, lithium, nickel, stainless steel, tantalum, titanium, tungsten, vanadium, or a mixture, combinations or alloys thereof. In other embodiments, the current collector can include a non-metal material such as carbon, carbon nanotubes, or a metal oxide (e.g., TiN, $TiB_2$, $MoSi_2$, n-$BaTiO_3$, $Ti2O_3$, $ReO_3$, $RuO_2$, $IrO_2$, etc.). In some embodiments, the current collector can include a conductive coating disposed on any of the aforementioned metal and non-metal materials. In some embodiments, the conductive coating can include a carbon-based material, conductive metal and/or non-metal material, including composites or layered materials.

In some embodiments, the current collector includes a base substrate having one or more surface coatings so as to improve the mechanical, thermal, chemical, or electrical properties of the current collector. In one example, the coating(s) on the current collector can be configured to reduce corrosion and alter adhesion characteristics (e.g., hydrophilic or hydrophobic coatings, respectively). In another example, the coating(s) on the current collector can comprise a material of high electrical conductivity to improve the overall charge transport of the base substrate. In yet another example, the coatings can comprise a material of high thermal conductivity to facilitate heat dissipation of the base substrate and protect the battery from overheating. In yet another example, the coatings can comprise a heat-resistant or fire-retardant material to prevent the battery from fire hazards. In yet another example, the coatings can be configured to be rough so as to increase the surface area and/or the adhesion with the electrode material (e.g., anode material 111 and cathode material 121). In yet another example, the coatings can include a material with good adhering or gluing properties with the electrode material.

In some embodiments, the current collector includes a conductive substrate, sheet or foil having a roughened surface so as to improve the mechanical, electrical, and thermal contact between the electrode material and the current collector. The roughened surface of the current collector can increase the physical contact area between the electrode material and the current collector, thereby increasing the adherence of the electrode material to the current collector. The increased physical contact area can also improve the electrical and thermal contact (e.g., reduced electrical and thermal resistance) between the current collector and the electrode material.

In some embodiments, the current collector includes a porous current collector such as a wire mesh. The wire mesh (also referred to herein as mesh) can include any number of filament wires that can be assembled in various configurations using suitable processes, such as a regular pattern or structure produced by weaving, braiding, knitting, etc. or a more random pattern or structure produced by randomly distributing wires and joining them by welding, adhesives, or other suitable techniques. Moreover, the wires comprising the mesh can be any suitable material. For example, in some embodiments, the wires are metallic such as, steel, aluminum, copper, titanium or any other suitable metal. In other embodiments, the wires can be a conductive non-metallic material such as, for example, carbon nanofiber or any other suitable material. In some embodiments, the wires can include coatings. For example, the coatings can be configured to reduce corrosion and enhance or reduce adhesion characteristics (e.g., hydrophilic or hydrophobic coatings, respectively). Examples of porous current collectors are described in U.S. Patent Publication No. U.S. 2013/0065122, entitled "Semi-Solid Electrode Cell Having A Porous Current Collector and Methods of Manufacture," and U.S. patent application Ser. No. 15/097,838, entitled "Semi-Solid Electrodes with Porous Current Collectors and Methods of Manufacture," the entire disclosures of which are hereby incorporated by reference herein.

In some embodiments, the current collector can be produced via any of the following coating or deposition techniques including, but not limited to, chemical vapor deposition (CVD) (including initiated CVD, hot-wire CVD, plasma enhanced CVD, and other forms of CVD), physical vapor deposition, sputter deposition, magnetron sputtering, radio frequency sputtering, atomic layer deposition, pulsed laser deposition, plating, electroplating, dip-coating, brushing, spray-coating, sol-gel chemistry (through dip-coating, brushing or spray-coating), electrostatic spray coating, 3D printing, spin coating, electrodeposition, powder coating, sintering, self-assembly methods, and any combination of the techniques thereof.

In some embodiments, the properties the deposited or coated current collector can be optimized during the deposition by varying deposition parameters. Physical properties such as, for example, coating texture, coating thickness, thickness uniformity, surface morphology, including surface roughness, porosity and general mechanical properties, including fracture toughness, ductility, and tensile strength can be optimized via fine tuning of deposition parameters. Similarly, chemical properties such as, for example, chemical resistance and corrosion resistance to electrolyte and salts, along with other chemical properties, including specific reactivity, adhesion, affinity, and the like can be optimized by varying deposition parameters to produce a functioning current collector. In some embodiments, various physical and chemical properties of the deposited or coated current collector can be further improved or modified post deposition by a subsequent surface or temperature treatment, such as annealing or rapid-thermal (flash) annealing, or electromechanical polishing, and using any combination of the techniques thereof.

In some embodiments, the anode current collector 150 can have a thickness in a range of about 1 μm to about 20 μm. In some embodiments, the ACC 150 can have a thickness in a range of about 1 μm to about 18 μm. In some embodiments, the ACC 150 can have a thickness in a range of about 1 μm to about 17 μm. In some embodiments, the ACC 150 can have a thickness in a range of about 1 μm to about 16 μm. In some embodiments, the ACC 150 can have a thickness in a range of about 1 μm to about 15 μm. In some embodiments, the ACC 150 can have a thickness in a range of about 1 μm to about 14 μm. In some embodiments, the ACC 150 can have a thickness in a range of about 1 μm to about 13 μm. In some embodiments, the ACC 150 can have a thickness in a range of about 1 μm to about 12 μm. In some embodiments, the ACC 150 can have a thickness in a range of about 2 μm to about 11 μm. In some embodiments, the ACC 150 can have a thickness in a range of about 3 μm to about 10 μm. In some embodiments, the ACC 150 can have a thickness in a range of about 4 μm to about 9 μm. In some embodiments, the ACC 150 can have a thickness in a range of about 5 μm to about 8 μm. In some embodiments, the ACC 150 can have a thickness in a range of about 6 μm to about 7 μm. In some embodiments, the ACC 150 can have a thickness less than about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, and about 20 μm, inclusive of all thicknesses therebetween.

The anode material 111 can be selected from a variety of materials. In some embodiments, the anode material 111 comprises a carbon-based material, including, but are not limited to, hard carbon, carbon nanotubes, carbon nanofibers, porous carbon, and graphene. In some embodiments, the anode material 111 comprises a titanium-based oxide including, but are not limited to, spinel $Li_4Ti_5O_{12}$ (LTO) and titanium dioxide ($TiO_2$, Titania). In some embodiments, the anode material 111 comprises alloy or de-alloy material including, but are not limited to, silicon, silicon monoxide (SiO), germanium, and tin oxide ($SnO_2$). In some embodiments, the anode material 111 comprises a transition metal compound (e.g., oxides, phosphides, sulphides and nitrides). The general formula of a transition compound can be written as $M_xN_y$, where M can be selected from iron (Fe), cobalt (Co), copper (Cu), manganese (Mn), and nickel (Ni), and N can be selected from oxygen (O), phosphorous (P), sulfur (S), and nitrogen (N).

In some embodiments, the anode material 111 can include a solid selected from the group consisting of amorphous carbon, disordered carbon, graphitic carbon, or a metal-coated or metal-decorated carbon, graphite, non-graphitic carbon, mesocarbon microbeads, boron-carbon alloys, hard or disordered carbon, lithium titanate spinel, or a solid metal or metal alloy or metalloid or metalloid alloy that reacts with lithium to form intermetallic compounds, e.g., Si, Ge, Sn, Bi, Zn, Ag, Al, any other suitable metal alloy, metalloid alloy or combination thereof, or a lithiated metal or metal alloy including such compounds as LiAl, $Li_9Al_4$, $Li_3Al$, LiZn, LiAg, $Li_{10}Ag_3$, $Li_5B_4$, $Li_7B_6$, $Li_{12}Si_7$, $Li_{21}Si_8$, $Li_{13}Si_4$, $Li_{21}Si_5$, $Li_5Sn_2$, $Li_{13}Sn_5$, $Li_7Sn_2$, $Li_{22}Sn_5$, $Li_2Sb$, $Li_3Sb$, LiBi, or $Li_3Bi$, or amorphous metal alloys of lithiated or non-lithiated compositions, any other materials or alloys thereof, or any other combination thereof.

In some embodiments, the anode material 111 comprises an intermetallic compound. An intermetallic compound can be based on a formulation MM', wherein M is one metal element and M' is a different metal element. An intermetallic compound can also include more than two metal elements. The M atoms of an intermetallic compound can be, for example, Cu, Li, and Mn, and the M' element of an intermetallic compound can be, for example, Sb. Exemplary intermetallic compounds include $Cu_2Sb$, $Li_2CuSb$, and $Li_3Sb$, among others. In one example, the intermetallic compound in the anode material 111 can have fully disordered structures in which the M or M' atoms are arranged in a random manner. In another example, the intermetallic compound in the anode material 111 has partially disordered structures in which the M or M' atoms in the crystal lattice are arranged in a non-random manner.

In some embodiments, the anode material 111 can be porous so as to increase the surface area and enhance the rate of lithium intercalation in the resulting electrodes. In one example, the anode material 111 includes porous $Mn_2O_3$, which can be prepared by, for example, thermal decomposition of $MnCO_3$ microspheres. In another example, the anode material 111 includes porous carbon fibers prepared by, for example, electrospinning a blend solution of polyacrylonitrile and poly(l-lactide), followed by carbonization. In some embodiments, the porosity of the anode material 111 can be achieved or increased by using a porous current collector. For example, the anode material 111 can include $Cu_2Sb$, which is deposited conformally on a porous foam structure, to have certain degree of porosity.

In some embodiments, the thickness of the anode material 111 can be in the range of about 250 μm to about 2,000 μm, about 300 μm to about 2,000 μm, about 350 μm to about 2,000 μm, about 400 μm to about 2,000 μm, about 450 μm to about 2,000 μm, about 500 to about 2,000 μm, about 250 μm to about 1,500 μm, about 300 μm to about 1,500 μm, about 350 μm to about 1,500 μm, about 400 μm to about 1,500 μm, about 450 μm to about 1,500 μm, about 500 to about 1,500 μm, about 250 μm to about 1,000 μm, about 300 μm to about 1,000 μm, about 350 μm to about 1,000 μm, about 400 μm to about 1,000 μm, about 450 μm to about 1,000 μm, about 500 μm to about 1,000 μm, about 250 μm to about 750 μm, about 300 μm to about 750 μm, about 350 μm to about 750 μm, about 400 μm to about 750 μm, about 450 μm to about 750 μm, about 500 μm to about 750 μm, about 250 μm to about 700 μm, about 300 μm to about 700 μm, about 350 μm to about 700 μm, about 400 μm to about 700 μm, about 450 μm to about 700 μm, about 500 μm to about 700 μm, about 250 μm to about 650 μm, about 300 μm to about 650 μm, about 350 μm to about 650 μm, about 400 μm to about 650 μm, about 450 μm to about 650 μm, about 500 μm to about 650 μm, about 250 μm to about 600 μm, about 300 μm to about 600 μm, about 350 μm to about 600 μm, about 400 μm to about 600 μm, about 450 μm to about 600 μm, about 500 μm to about 600 μm, about 250 μm to about 550 μm, about 300 μm to about 550 μm, about 350 μm to about 550 μm, about 400 μm to about 550 μm, about 450 μm to about 550 μm, or about 500 μm to about 550 μm, inclusive of all ranges or any other distance therebetween.

In some embodiments, the cathode 120 includes a cathode current collector 160 and a cathode material 121. The cathode current collector 160 in the cathode 120 can be substantially the same as the anode current collector 150 in the anode 110 as described above, and hence the same techniques as described with respect to deposition and/or coating techniques of anode current collector 150 can also be applicable in production of a cathode current collector 160. In some embodiments, the cathode current collector 160 can have a thickness in a range of about 1 μm to about 40 μm. In some embodiments, the CCC 160 can have a thickness in a range of about 2 μm to about 38 μm. In some embodiments, the CCC 160 can have a thickness in a range of about 2 μm to about 36 μm. In some embodiments, the CCC 160 can have a thickness in a range of about 2 μm to about 34 μm. In some embodiments, the CCC 160 can have a thickness in a range of about 2 μm to about 32 μm. In some embodiments, the CCC 160 can have a thickness in a range of about 2 μm to about 30 μm. In some embodiments, the CCC 160 can have a thickness in a range of about 2 μm to about 28 μm. In some embodiments, the CCC 160 can have a thickness in a range of about 2 μm to about 26 μm. In some embodiments, the CCC 160 can have a thickness in a range of about 2 μm to about 24 μm. In some embodiments, the CCC 160 can have a thickness in a range of about 2 μm to about 22 μm. In some embodiments, the CCC 160 can have a thickness in a range of about 2 μm to about 20 μm. In some embodiments, the CCC 160 can have a thickness in a range of about 2 μm to about 18 μm. In some embodiments, the CCC 160 can have a thickness in a range of about 3 μm to about 16 μm. In some embodiments, the CCC 160 can have a thickness in a range of about 4 μm to about 14 μm. In some embodiments, the CCC 160 can have a thickness in a range of about 5 μm to about 12 μm. In some embodiments, the CCC 160 can have a thickness in a range of about 6 μm to about 10 μm. In some embodiments, the CCC 160 can have a thickness in a range of about 7 μm to about 8 μm. In some embodiments, the CCC 160 can have a thickness less than about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 27 μm, about 38 μm, about 39 μm, and about 40 μm, inclusive of all thicknesses therebetween.

The cathode material 121 in the cathode 120 can be, for example, Nickel Cobalt Aluminum (NCA), Core Shell Gradient (CSG), Spinel-based lithium-ion (LMO), Lithium Iron Phosphate (LFP), Cobalt-based lithium-ion (LCO) and Nickel Cobalt Manganese (NCM). In some embodiments, the cathode material 121 can include solid compounds known to those skilled in the art as those used in Nickel-metal Hydride (NiMH) and Nickel Cadmium (NiCd) batteries. In some embodiments, the cathode material 121 can include the general family of ordered rocksalt compounds $LiMO_2$ including those having the α-$NaFeO_2$ (so-called "layered compounds") or orthorhombic-$LiMnO_2$ structure type or their derivatives of different crystal symmetry, atomic ordering, or partial substitution for the metals or oxygen. M comprises at least one first-row transition metal but may include non-transition metals including but not limited to Al, Ca, Mg, or Zr. Examples of such compounds include $LiCoO_2$, $LiCoO_2$ doped with Mg, $LiNiO_2$, Li(Ni, Co, Al)$O_2$ (known as "NCA") and Li(Ni, Mn, Co)$O_2$ (known as "NMC" or "NCM"). Other families of exemplary cathode material 121 can include those of spinel structure, such as $LiMn_2O_4$ and its derivatives, so-called "layered-spinel nanocomposites" in which the structure includes nanoscopic regions having ordered rocksalt and spinel ordering, olivines $LiMPO_4$ and their derivatives, in which M comprises one or more of Mn, Fe, Co, or Ni, partially fluorinated compounds, such as $LiVPO_4F$, other "polyanion" compounds as described below, and vanadium oxides $V_xO_y$ including $V_2O_5$ and $V_6O_{11}$.

In some embodiments, the cathode material 121 comprises a transition metal polyanion compound, for example as described in U.S. Pat. No. 7,338,734. In some embodiments, the cathode material 121 comprises an alkali metal transition metal oxide or phosphate, and for example, the compound has a composition $A_x(M'_{1-a}M''_a)_y(XD_4)_z$, $A_x(M'_{1-a}M''_a)_y(DXD_4)_z$, or $A_x(M'_{1-a}M''_a)_y(X_2D_7)_z$, and have values such that x, plus y(1−a) times a formal valence or valences of M', plus ya times a formal valence or valence of M", is equal to z times a formal valence of the $XD_4$, $X_2D_7$, or $DXD_4$ group; or a compound comprising a composition $(A_{1-a}M''_a)_xM'_y(XD_4)_z$, $(A_{1-a}M''_a)_xM'_y(DXD_4)z$ $(A_{1-a}M''_a)_xM'_y(X_2D_7)_z$ and have values such that (1−a)x plus the quantity ax times the formal valence or valences of M" plus y times the formal valence or valences of M' is equal to z times the formal valence of the $XD_4$, $X_2D_7$ or $DXD_4$ group. In the compound, A is at least one of an alkali metal and hydrogen, M' is a first-row transition metal, X is at least one of phosphorus, sulfur, arsenic, molybdenum, and tungsten, M" any of a Group IIA, IIIA, IVA, VA, VIA, VIIA, VIIIA, IB, IIB, IIIB, IVB, VB, and VIB metal, D is at least one of oxygen, nitrogen, carbon, or a halogen. The cathode material 121 can be an olivine structure compound $LiMPO_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the cathode material 121 comprises a thermally stable, transition-metal-doped lithium transition metal phosphate having the olivine structure and having the formula $(Li_{1-x}Z_x)MPO_4$, where M is one or more of V, Cr, Mn, Fe, Co, and Ni, and Z is a non-alkali metal dopant, such as one or more of Ti, Zr, Nb, Al, or Mg, and x ranges from 0.005 to 0.05.

In other embodiments, the lithium transition metal phosphate material has an overall composition of $Li_{1-x-z}M_{1+z}PO_4$, where M comprises at least one first row transition metal selected from the group consisting of Ti, V, Cr, Mn, Fe, Co and Ni, where x is from 0 to 1 and z can be positive or negative. M includes Fe, z is between about 0.15-0.15. The material can exhibit a solid solution over a composition range of 0<x<0.15, or the material can exhibit a stable solid solution over a composition range of x between 0 and at least about 0.05, or the material can exhibit a stable solid solution over a composition range of x between 0 and at least about 0.07 at room temperature (22-25° C.). The material may also exhibit a solid solution in the lithium-poor regime, e.g., where x≥0.8, or x≥0.9, or x≥0.95.

In some embodiments, the cathode material 121 comprises a metal salt that stores an alkali ion by undergoing a displacement or conversion reaction. Examples of such compounds include metal oxides, such as CoO, $Co_3O_4$, NiO, CuO, MnO, typically used as a negative electrode in a lithium battery, which upon reaction with Li undergo a displacement or conversion reaction to form a mixture of $Li_2O$ and the metal constituent in the form of a more reduced oxide or the metallic form. Other examples include metal fluorides, such as $CuF_2$, $FeF_2$, $FeF_3$, $BiF_3$, $CoF_2$, and $NiF_2$, which undergo a displacement or conversion reaction to form LiF and the reduced metal constituent. Such fluorides may be used as the positive electrode in a lithium battery. In other embodiments, the cathode material 121 comprises carbon monofluoride or its derivatives. In some embodiments, the cathode material 121 undergoing displacement or conversion reaction is in the form of particulates having on average dimensions of 100 nanometers or less. In some embodiments, the cathode material 121 undergoing displacement or conversion reaction comprises a nanocomposite of the cathode material 121 mixed with an inactive host, including but not limited to conductive and relatively ductile compounds such as carbon, or a metal, or a metal sulfide. $FeS_2$ and $FeF_3$ can also be used as cheap and electronically conductive cathode materials 121 in a nonaqueous or aqueous lithium system. In some embodiments, a $CF_x$ electrode, FeS₂ electrode, or MnO₂ electrode is a positive cathode material used with a lithium metal negative electrode to produce a lithium battery. In some embodiments, such battery is a primary battery. In some embodiments, such battery is a rechargeable battery.

In some embodiments, a working ion in the cathode material 121 is selected from the group consisting of $Li^+$, $Na^+$, $H^+$, $Mg^{2+}$, $Al^{3+}$, or $Ca^{2+}$. In some embodiments, the working ion is selected from the group consisting of $Li^+$ or $Na^+$. In some embodiments, the cathode material 121 includes a solid including an ion-storage compound. In some embodiments, the ion is proton or hydroxyl ion and the cathode material 121 includes those used in a nickel-cadmium or nickel metal hydride battery. In some embodiments, the ion is lithium and the cathode material 121 is selected from the group consisting of metal fluorides, such as $CuF_2$, $FeF_2$, $FeF_3$, $BiF_3$, $CoF_2$, and $NiF_2$.

In some embodiments, the ion is lithium and the cathode material 121 is selected from the group consisting of metal oxides, such as $CoO$, $Co_3O_4$, $NiO$, $CuO$, and $MnO$.

In some embodiments, the ion is lithium and the cathode material 121 includes an intercalation compound selected from compounds with formula $(Li_{1-x}Z_x)MPO_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

In some embodiments, the ion is lithium and the cathode material 121 includes an intercalation compound selected from compounds with formula $LiMPO_4$, where M is one or more of V, Cr, Mn, Fe, Co, and Ni, in which the compound is optionally doped at the Li, M or O-sites.

In some embodiments, the ion is lithium and the cathode material 121 includes an intercalation compound selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, wherein x, plus y(1−a) times a formal valence or valences of M', plus ya times a formal valence or valence of M'', is equal to z times a formal valence of the $XD_4$, $X_2D_7$, or $DXD_4$ group; and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the cathode material 121 includes an intercalation compound selected from the group consisting of $A_{1-a}M''_a)_xM'_y(XD_4)_z$, $(A_{1-a}M''_a)_xM'_y(DXD_4)_z$ and $A_{1-a}M''_a)_xM'_y(X_2D_7)_z$, where (1−a)x plus the quantity ax times the formal valence or valences of M'' plus y times the formal valence or valences of M' is equal to z times the formal valence of the $XD_4$, $X_2D_7$ or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the ion is lithium and the cathode material 121 includes an intercalation compound selected from the group consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, where M includes at least one first-row transition metal but may include non-transition metals including but not limited to Al, Ca, Mg or Zr.

In some embodiments, the cathode material 121 includes a solid including amorphous carbon, disordered carbon, graphitic carbon, or a metal-coated or metal decorated carbon.

In some embodiments, the cathode material 121 can include a solid including nanostructures, for example, nanowires, nanorods, and nanotetrapods.

In some embodiments, the cathode material 121 includes a solid including an organic redox compound.

In some embodiments, the cathode material 121 can include a solid selected from the groups consisting of ordered rocksalt compounds $LiMO_2$ including those having the α-$NaFeO_2$ and orthorhombic-$LiMnO_2$ structure type or their derivatives of different crystal symmetry, atomic ordering, or partial substitution for the metals or oxygen, wherein M Includes at least one first-row transition metal but may include non-transition metals including but not limited to Al, Ca, Mg, or Zr.

In some embodiments, the cathode material 121 can include a solid selected from the group consisting of $A_x(M'_{1-a}M''_a)_y(XD_4)_z$, $A_x(M'_{1-a}M''_a)_y(DXD_4)_z$, and $A_x(M'_{1-a}M''_a)_y(X_2D_7)_z$, and where x, plus y(1−a) times a formal valence or valences of M', plus ya times a formal valence or valence of M'', is equal to z times a formal valence of the $XD_4$, $X_2D_7$, or $DXD_4$ group, and A is at least one of an alkali metal and hydrogen, M' is a first-row transition metal, X is at least one of phosphorus, sulfur, arsenic, molybdenum, and tungsten, M'' any of a Group IIA, IIIA, IVA, VA, VIA, VIIA, VIIIA, IB, IIB, IIIB, IVB, VB, and VIB metal, D is at least one of oxygen, nitrogen, carbon, or a halogen.

In some embodiments, the cathode material 121 can include a compound selected from the group consisting of $LiMn_2O_4$ and its derivatives; layered-spinel nanocomposites in which the structure includes nanoscopic regions having ordered rocksalt and spinel ordering; so-called "high voltage spinels" with a potential vs. Li/Li+ that exceeds 4.3V including but not limited to $LiNi_{0.5}Mn_{1.5}O_4$; olivines $LiMPO_4$ and their derivatives, in which M includes one or more of Mn, Fe, Co, or Ni, partially fluorinated compounds such as $LiVPO_4F$, other "polyanion" compounds, and vanadium oxides $V_xO_y$ including $V_2O_5$ and $V_6O_{11}$.

In some embodiments, the thickness of the cathode material 121 can be in the range of about 250 μm to about 2,000 μm, about 300 μm to about 2,000 μm, about 350 μm to about 2,000 μm, 400 μm to about 2,000 μm, about 450 μm to about 2,000 μm, about 500 to about 2,000 μm, about 250 μm to about 1,500 μm, about 300 μm to about 1,500 μm, about 350 μm to about 1,500 μm, about 400 μm to about 1,500 μm, about 450 μm to about 1,500 μm, about 500 to about 1,500 μm, about 250 μm to about 1,000 μm, about 300 μm to about 1,000 μm, about 350 μm to about 1,000 μm, about 400 μm to about 1,000 μm, about 450 μm to about 1,000 μm, about 500 μm to about 1,000 μm, about 250 μm to about 750 μm, about 300 μm to about 750 μm, about 350 μm to about 750 μm, about 400 μm to about 750 μm, about 450 μm to about 750 μm, about 500 μm to about 750 μm, about 250 μm to about 700 μm, about 300 μm to about 700 μm, about 350 μm to about 700 μm, about 400 μm to about 700 μm, about 450 μm to about 700 μm, about 500 μm to about 700 μm, about 250 μm to about 650 μm, about 300 μm to about 650 μm, about 350 μm to about 650 μm, about 400 μm to about 650 μm, about 450 μm to about 650 μm, about 500 μm to about 650 μm, about 250 μm to about 600 μm, about 300 μm to about 600 μm, about 350 μm to about 600 μm, about 400 μm to about 600 μm, about 450 μm to about 600 μm, about 500 μm to about 600 μm, about 250 μm to about 550 μm, about 300 µm to about 550 µm, about 350 µm to about 550 µm, about 400 µm to about 550 µm, about 450 µm to about 550 µm, or about 500 µm to about 550 µm, inclusive of all ranges or any other distance therebetween.

In some embodiments, at least one of the anode material or the cathode material includes a semi-solid or a condensed ion-storing liquid reactant. By "semi-solid" it is meant that the material is a mixture of liquid and solid phases, for example, such as a semi-solid, particle suspension, colloidal suspension, emulsion, gel, or micelle. "Condensed ion-storing liquid" or "condensed liquid" means that the liquid is not merely a solvent as it is in the case of an aqueous flow cell catholyte or anolyte, but rather, that the liquid is itself redox-active. Such a liquid form may also be diluted by or mixed with another, non-redox-active liquid that is a diluent or solvent, including mixing with such a diluent to form a lower-melting liquid phase, emulsion or micelles including the ion-storing liquid. The cathode or anode material can be flowable semi-solid or condensed liquid compositions. A flowable anodic semi-solid (herein called "anolyte") and/or a flowable cathodic semi-solid ("catholyte") are/is comprised of a suspension of electrochemically-active agents (anode particulates and/or cathode particulates) and, optionally, electronically conductive particles. The cathodic particles and conductive particles are co-suspended in an electrolyte to produce a catholyte semi-solid. The anodic particles and conductive particles are co-suspended in an electrolyte to produce an anolyte semi-solid. The semi-solids are capable of flowing due to an applied pressure, gravitational force, or other imposed field that exerts a force on the semi-solid, and optionally, with the aid of mechanical vibration. Examples of battery architectures utilizing semi-solid suspensions are described in International Patent Publication No. WO 2012/024499, entitled "Stationary, Fluid Redox Electrode," and International Patent Publication No. WO 2012/088442, entitled "Semi-Solid Filled Battery and Method of Manufacture," the entire disclosures of which are hereby incorporated by reference.

In some embodiments, the separator 130 can be a thin, microporous membrane that electrically separates the cathode 120 from the anode 110 but allows ions to pass through the pores between the two electrodes during discharging and charging. In some embodiments, the separator 130 includes a thermoplastic polymer, such as polyolefins, polyvinyl chlorides, nylons, fluorocarbons, and polystyrenes, among others. In some embodiments, the separator 130 includes polyolefins material that comprises, for example, polyethylene, ultra-high molecular weight polyethylene, polypropylene, polybutene, polymethylpentene, polyisoprene, copolymers thereof, and their combinations. Exemplary combinations can include, but are not limited to, mixtures containing two or more of the following polyethylene, ultra-high molecular weight polyethylene, and polypropylene, as well as, mixtures of the foregoing with copolymers such as ethylene-butene copolymer and ethylene-hexene copolymer.

In some embodiments, the battery 100 further includes an electrolyte (not shown in FIG. 1A), which is substantially contained in the pouch 140. The electrolyte can include non-aqueous electrolyte such as lithium salt (for lithium ion batteries) or sodium salt (for sodium ion batteries) in a solvent. Exemplary lithium salts can include $LiPF_6$, $LiBF_4$, and $LiClO_4$, among others. Exemplary sodium salts include $NaClO_4$, $NaPF_6$ and Bis-Trifluoromethansulfonylimide sodium (Na-TFSI). Exemplary solvents include propylene carbonate (PC), ethylene carbonate (EC), dimethyl carbonate (DMC), dimethoxyethane (DME), diethyl carbonate (DEC), Tetrahydrofuran (THF), and Triethylene glycol dimethyl ether (Triglyme).

The pouch 140 in the battery cell 100 shown in FIG. 1A substantially contains the anode 110, the cathode 120, the separator 130, and the electrolyte (not shown). The pouch 140 can physically separate the battery cell 100 from adjacent cells so as to mitigate or eliminate defect propagation, and to facilitate easy handling of the battery cell 100 during battery manufacturing. The pouch 140 can also reduce the possibility of fire ignition of flammable electrolyte during possible welding processes in battery manufacturing, which at times generates sparks.

In some embodiments, the anode 110, the cathode 120, the separator 130, and the electrolyte (not shown) are completely sealed in the pouch 140 (e.g., via vacuum sealing). In some embodiments, the pouch 140 can be only partially sealed or not sealed at all. In some embodiments, the pouch 140 can be sealed around its perimeter to enclose the anode 110, the cathode 120, the separator 130, and the electrolyte. In some embodiments, the seal of the pouch 140 can substantially enclose the anode 110, the cathode 120, the separator 130, and the electrolyte. In some embodiments, the seal of the pouch 140 has a sealing region, which has a width in a range of about 10 µm to about 10 mm, about 10 µm to about 9 mm, about 10 µm to about 8 mm, about 10 µm to about 7 mm, about 10 µm to about 6 mm, about 10 µm to about 5 mm, about 10 µm to about 4 mm, about 10 µm to about 3 mm, about 10 µm to about 2 mm, about 10 µm to about 1 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all widths and width ranges therebetween.

In some embodiments, the sealing region of the pouch 140 is a certain distance from the outer edge of the pouch 140. In some embodiments, the distance between the sealing region and the outer edge can be from about 10 µm to about 20 mm, about 10 µm to about 15 mm, about 10 µm to about 10 mm, about 10 µm to about 5 mm, about 10 µm to about 4 mm, about 10 µm to about 3 mm, about 10 µm to about 2 mm, about 10 µm to about 1 mm, about 10 µm to about 900 µm, about 10 µm to about 800 µm, about 10 µm to about 700 µm, about 10 µm to about 600 µm, about 10 µm to about 500 µm, about 10 µm to about 400 µm, about 10 µm to about 300 µm, about 10 µm to about 200 µm, about 10 µm to about 100 µm, and about 10 µm to about 50 µm, inclusive of all distances and ranges of distance therebetween.

In some embodiments, the sealing region of the pouch 140 is a certain distance from an outermost edge of at least one of the anode 110 and the cathode 120. In some embodiments, the distance between the sealing region and the outermost edge of at least one of the anode 110 and the cathode 120 can be from about 1 µm to about 10 mm, about 1 µm to about 9 mm, about 1 µm to about 8 mm, about 1 µm to about 7 mm, about 1 µm to about 6 mm, about 1 µm to about 5 mm, about 1 µm to about 4 mm, about 1 µm to about 3 mm, about 1 µm to about 2 mm, about 1 µm to about 1 mm, about 1 µm to about 900 µm, about 1 µm to about 800 µm, about 1 µm to about 700 µm, about 1 µm to about 600 µm, about 1 µm to about 500 µm, about 1 µm to about 400 µm, about 1 µm to about 300 µm, about 1 µm to about 200 µm, about 1 µm to about 100 µm, and about 1 µm to about 50 µm, inclusive of all distances and ranges of distance therebetween.

In some embodiments, the separator 130 is larger than at least one of the anode 110 and the cathode 120. In some embodiments, the separator 130 is larger than at least one of the anode current collector 150 and the cathode current collector 160. In some embodiments, the separator 130 is larger than at least one of the anode material 111 and the cathode material 121. In some embodiments, the separator 130 extends beyond at least one of the anode 110, cathode 120, anode material 111, cathode material 121, ACC 150, and CCC 160, and therefore, can be sealed at the pouch 140 inside the sealing region. In another word, the separator 130 extends into the sealing region of the pouch 140 and effectively separating the anode 110 and the cathode 120. In some embodiments, the separator 130 extends into the sealing region of the pouch 140 and completely separates the anode 110 and the cathode 120. In some embodiments, the separator 130 extends partially into the sealing region of the pouch 140 and partially separates the anode 110 and the cathode 120. In some embodiments, the separator 130 extends to a plurality of locations of the sealing region of the pouch 140 and effectively separates the anode 110 and the cathode 120 at those locations. For example, if at least one of the anode 110 and the cathode 120 has a tab connection for making an external electrical connection, the separator 130 may not extend to the location and region around the tab connection of the pouch 140. In some embodiments, one or more of the plurality of locations and regions to which the separator 130 extends into the sealing region of the pouch 140 can be used to form one or more structure for a functional purpose in the single pouch battery cell 100. For example, a functional purpose can be a form of pressure release or pressure alleviation from pressure buildup due to overcharging, gas generation or a form of electrochemical malfunction. Similarly, in some embodiments, one or more of the plurality of locations and regions to which the separator 130 does not extend into the sealing region of the pouch 140 can also be used to form one or more structure for a functional purpose in the single pouch battery cell 100.

In these embodiments, the pouch 140 can still reduce or eliminate chances of exposure to sparking (e.g., from welding processes) that could ignite the electrolyte. A final sealing step can be carried out after the welding process to seal one or more single pouch battery cells into an external pouch or package, in which case the external pouch or package can function as moisture control. In some embodiments, the pouch 140 is mechanically attached to cathode 120 and/or the anode 110. In some embodiments, the pouch 140 is attached to the current collector of the cathode 120 and/or the current collector of anode 110 via, for example, heat sealing, glue, or any other method known in the art.

In some embodiments, the pouch 140 includes a three-layer structure, namely an intermediate layer sandwiched by an outer layer and an inner layer, wherein the inner layer is in contact with the electrodes and the electrolyte. For example, the outer layer can include a nylon-based polymer film. The inner layer can include a polypropylene (PP) polymer film, which can be corrosion-resistive to acids or other electrolyte and insoluble in electrolyte solvents. The intermediate layer can include of aluminum (Al) foil. This structure allows the pouch to have both high mechanical flexibility and strength.

In some embodiments, the outer layer of the pouch 140 includes polymer materials such as polyethylene terephthalate (PET), polybutylene terephthalate (PBT), nylon, high-density polyethylene (HDPE), oriented polypropylene (o-PP), polyvinyl chloride (PVC), polyimide (PI), polysulfone (PSU), and any combinations thereof.

In some embodiments, the intermediate layer of the pouch 140 includes metal layers (foils, substrates, films, etc.) comprising aluminum (Al), copper (Cu), stainless steel (SUS), and their alloys or any combinations thereof.

In some embodiments, the inner layer of the pouch 140 includes materials such as cast polypropylene (c-PP), polyethylene (PE), ethylene vinylacetate (EVA), PET, Poly-vinyl acetate (PVA), polyamide (PA), acrylic adhesives, ultraviolet (UV)/electron beam (EB)/infrared (IR) curable resin, and any combinations thereof.

In some embodiments, the pouch 140 can include a non-flammable material, such as for example, polyether ether ketone (PEEK), polyethylene naphthalate (PEN), polyethersulfone (PES), PI, polyphenylene sulfide (PPS), polyphenylene oxide (PPO), and any combinations thereof. In some embodiments, the pouch 140 can include a coating or a film of flame retardant additive material, such as flame retardant PET.

In some embodiments, the pouch 140 includes a two-layer structure, namely an outer layer and an inner layer. In some embodiments, the outer layer can include PET, PBT, or other materials as described above. In some embodiments, the inner layer can include PP, PE, or other materials described above.

In some embodiments, the pouch 140 can include a water barrier layer and/or gas barrier layer. In some embodiments, the barrier layer can include a metal layer and/or an oxide layer. In some embodiments, it can be beneficial to include the oxide layer because oxide layers tend to be insulating and can prevent short circuits within the battery.

In some embodiments, there can be only one (or two) unit cell(s) assembly within the pouch 140, the pouch 140 can be substantially thinner than pouches commonly used for multi-stack battery cells. For example, the pouch 140 can have a thickness less than 200 µm, less than 150 µm, less than 100 µm, less than 50 µm, less than 45 µm, less than 40 µm, less than 35 µm, less than 30 µm, less than 25 µm, less than 20 µm, less than 18 µm, less than 16 µm, less than 14 µm, less than 12 µm, less than 10 µm, less than 9 µm, less than 8 µm, less than 7 µm, less than 6 µm, less than 5 µm, less than 4 µm, less than 3 µm, less than 2 µm, or less than 1 µm. In some embodiments, the thickness of the pouch 140 can depend on at least two aspects. In one aspect, it can be desirable to achieve high energy density in the resulting battery cells, in which case thinner pouches can be helpful since a larger portion of space within a battery cell can be reserved for electrode materials. In another aspect, it can be desirable to maintain or improve the safety advantage of the pouch 140. In this case, a thicker pouch and/or non-flammable pouch can be helpful to, for example, reduce fire hazard. In some embodiments, the pouch thickness can be quantified as a ratio of the volume occupied by the pouch material to the total volume of the battery cell.

In some embodiments, the ratio of electrode material (e.g., anode material 111 and/or cathode material 121) to non-electrode material, such as the current collector and/or the pouch 140 can be defined in terms of ratio between the thicknesses. In some embodiments, the ratio of an electrode material to a current collector can be greater than about 12:1, about 14:1, about 16:1, about 18:1, about 20:1, about 22:1, about 24:1, about 26:1, about 28:1, about 30:1, about 32:1, about 34:1, about 36:1, about 38:1, about 40:1, about 42:1, about 44:1, about 46:1, about 48:1, about 50:1, about 52:1, about 54:1, about 56:1, about 58:1, about 60:1, about 62:1, about 64:1, about 66:1, about 68:1, about 70:1, about 72:1, about 74:1, about 76:1, about 78:1, about 80:1, about 82:1, about 84:1, about 86:1, about 88:1, about 90:1, about 92:1, about 94:1, about 96:1, about 98:1, about 100:1, about 110:1, about 112:1, about 114:1, about 116:1, about 118:1, about 120:1, about 122:1, about 124:1, about 126:1, about 128:1, about 130:1, about 132:1, about 134:1, about 136:1, about 138:1, about 140:1, about 142:1, about 144:1, about 146:1, about 148:1, about 150:1, about 152:1, about 154:1, about 156:1, about 158:1, about 160:1, about 162:1, about 164:1, about 166:1, about 168:1, about 170:1, about 172:1, about 174:1, about 176:1, about 178:1, about 180:1, about 182:1, about 184:1, about 186:1, about 188:1, about 190:1, about 192:1, about 194:1, about 196:1, about 198:1, about 200:1, about 300:1, about 400:1, about 500:1, about 600:1, about 700:1, about 800:1, about 900:1, about 1000:1, and about 2000:1, inclusive of all thickness ratios therebetween.

In some embodiments, the current collector can be coated on the pouch 140, providing a combined thickness. In these embodiments, the ratio between an electrode material and the combined thickness of a current collector and the pouch 140 can be about 12:1, about 14:1, about 16:1, about 18:1, about 20:1, about 22:1, about 24:1, about 26:1, about 28:1, about 30:1, about 32:1, about 34:1, about 36:1, about 38:1, about 40:1, about 42:1, about 44:1, about 46:1, about 48:1, about 50:1, about 52:1, about 54:1, about 56:1, about 58:1, about 60:1, about 62:1, about 64:1, about 66:1, about 68:1, about 70:1, about 72:1, about 74:1, about 76:1, about 78:1, about 80:1, about 82:1, about 84:1, about 86:1, about 88:1, about 90:1, about 92:1, about 94:1, about 96:1, about 98:1, about 100:1, about 110:1, about 112:1, about 114:1, about 116:1, about 118:1, about 120:1, about 122:1, about 124:1, about 126:1, about 128:1, about 130:1, about 132:1, about 134:1, about 136:1, about 138:1, about 140:1, about 142:1, about 144:1, about 146:1, about 148:1, about 150:1, about 152:1, about 154:1, about 156:1, about 158:1, about 160:1, about 162:1, about 164:1, about 166:1, about 168:1, about 170:1, about 172:1, about 174:1, about 176:1, about 178:1, about 180:1, about 182:1, about 184:1, about 186:1, about 188:1, about 190:1, about 192:1, about 194:1, about 196:1, about 198:1, about 200:1, about 300:1, about 400:1, about 500:1, about 600:1, about 700:1, about 800:1, about 900:1, about 1000:1, and about 2000:1, inclusive of all thickness ratios therebetween.

In some embodiments, the pouch 140 includes a single layer of lower cost materials that are thinner. For example, these materials can be polypropylene or a combination of polyolefins that can be sealed together using heat or pressure (e.g., thermal fusion or vacuum sealing).

In some embodiments, the pouch 140 includes a single layer of fire retardant materials so as to prevent the propagation of fire hazard from one single pouch battery cell to another. In some embodiments, the pouch 140 includes an air-proof material so as to prevent the propagation of gas released by one single pouch battery cell to another, thereby reducing defect propagation.

In practice, the battery 100 can have several benefits. For example, this single pouch battery cell approach (also referred to as individually packaged cell approach) can be conveniently integrated into manufacturing of batteries including semi-solid electrodes. The use of individually packaged cells makes handling and processing of the individual stacks easier. It also provides a method of protecting the individual stacks from deformation that could occur in the event of packaging a stack of electrodes.

Another advantage of using a single pouch for a single stack can be the avoidance of metal contamination into the electrode material or electrolyte. The pouch in each single pouch battery cell can prevent metal contaminants (or other types of contaminants) from entering the electrode material and the electrolyte.

In some embodiments, a single pouch can have an energy capacity, also referred to herein as "package size." In some embodiments, the package size includes an energy capacity of about 0.1 Ah to about 40 Ah. In some embodiments, the package size includes an energy capacity of about 0.5 Ah to about 35 Ah. In some embodiments, the package size includes an energy capacity of about 1 Ah to about 30 Ah. In some embodiments, the package size includes an energy capacity of about 1.5 Ah to about 25 Ah. In some embodiments, the package size includes an energy capacity of about 2 Ah to about 20 Ah. In some embodiments, the package size includes an energy capacity of about 2.5 Ah to about 15 Ah. In some embodiments, the package size includes an energy capacity of about 3 Ah to about 10 Ah. In some embodiments, the package size includes an energy capacity of about 3 Ah to about 8 Ah. In some embodiments, the package size includes an energy capacity of about 3 Ah to about 6 Ah. In some embodiments, the package size includes an energy capacity of about 3 Ah to about 5 Ah. In some embodiments, the package size includes an energy capacity of about 0.1 Ah to about 5 Ah. In some embodiments, the package size includes an energy capacity of about 0.1 Ah to about 4 Ah. In some embodiments, the package size includes an energy capacity of about 0.1 Ah to about 3 Ah. In some embodiments, the package size includes an energy capacity of about 0.1 Ah to about 2 Ah. In some embodiments, the package size includes an energy capacity of about 0.1 Ah to about 1 Ah. In some embodiments, the package size includes an energy capacity of about 0.1 Ah, about 0.2 Ah, about 0.3 Ah, about 0.4 Ah, about 0.5 Ah, about 0.6 Ah, about 0.7 Ah, about 0.8 Ah, about 0.9 Ah, about 1 Ah, about 1.2 Ah, about 1.4 Ah, about 1.6 Ah, about 1.8 Ah, about 2 Ah, about 2.2 Ah, about 2.4 Ah, about 2.6 Ah, about 2.8 Ah, about 3 Ah, about 3.2 Ah, about 3.4 Ah, about 3.6 Ah, about 3.8 Ah, about 4 Ah, about 4.2 Ah, about 4.4 Ah, about 4.6 Ah, about 4.8 Ah, about 5 Ah, about 5.5 Ah, about 6 Ah, about 6.5 Ah, about 7 Ah, about 7.5 Ah, about 8 Ah, about 8.5 Ah, about 9 Ah, about 9.5 Ah, about 10 Ah, about 11 Ah, about 12 Ah, about 13 Ah, about 14 Ah, about 15 Ah, about 16 Ah, about 17 Ah, about 18 Ah, about 19 Ah, about 20 Ah, about 22 Ah, about 24 Ah, about 26 Ah, about 28 Ah, about 30 Ah, about 32 Ah, about 34 Ah, about 36 Ah, about 38 Ah, and about 40 Ah, inclusive of all energy capacities and capacity ranges therebetween.

In addition, using a simple single pouch material to seal the single stack can also relax stringent requirements on pouch materials and sealing methods in conventional battery manufacturing. Since each pouch normally contains only one or two unit cell assembly, and accordingly less electrode material and electrolyte compared to conventional multi-stack battery cells, the pouch material can have more options, such as a single layer of polymer instead of multilayer structures. The pouch thickness can also be smaller (e.g., <100 μm), and the sealing method can also be flexible (e.g., pressure sealing, thermal sealing, and/or UV sealing).

In some embodiments, the separator 130 can be large enough to be disposed and sealed along with the pouch 140. In some embodiments, the pouch 140 can include a laminate sheet and the laminate sheet can include a periphery portion that extends beyond a periphery of the separator 130 such that the pouch can be joined to form a seal. In some embodiments, the inner layers of the pouch are each formed with a material that is thermally bondable to itself such that when the two laminate sheets are joined, the two inner layers can be joined around their peripheries and thermally bond to each other to form a hermetic seal. Additional examples are described in International Patent Publication No. WO 2013/173689, entitled "Electrochemical Cells and Methods of Manufacturing the Same," the entire disclosure of which is hereby incorporated by reference.

In some embodiments, a tab (electrical lead) can be long enough that when the pouch is sealed, the tab is exposed outside the pouch and can be used for electrically connecting the battery cell. For example, a first tab from the ACC 150 and a second tab from the CCC 160 can be used for connecting to at least one of the negative end and positive end of an external circuit. In some embodiments, the tab can be sealed inside the pouch, and in such cases, a hole can be created in the pouch to enable electrical connection between at least one of the ACC 150 and CCC 160 and an external contact or an electrical circuit. One or more hole can be placed in any location on the pouch, with preferential positions being next to the respective ACC 150 and CCC 160.

Figure 1B:
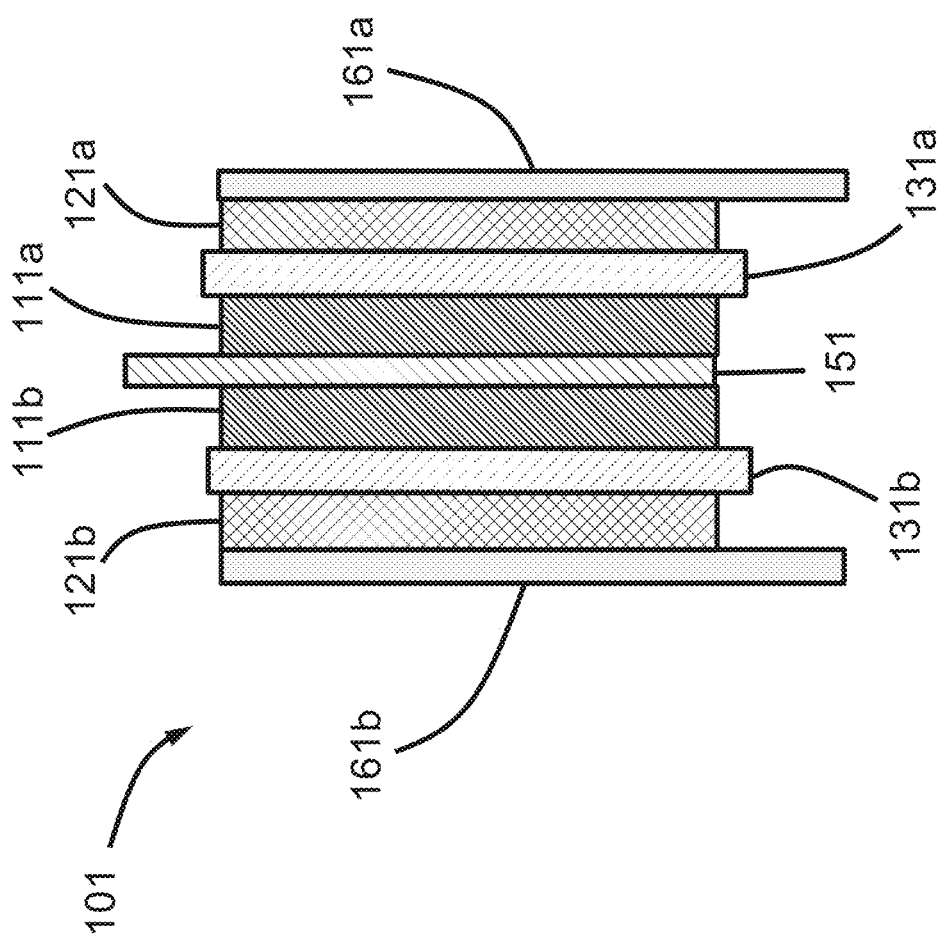
FIG. 1B is a schematic view of another type of battery cell, according to some embodiments.
Figure 1F:
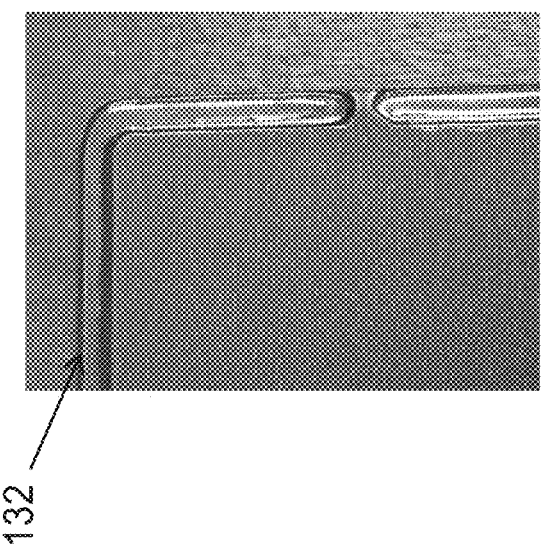
FIG. 1F is a photo of an edge of the battery cell shown in FIG. 1E.

FIG. 1B shows a schematic view of a battery cell 101 according to various other embodiments of the invention and can be referred to as a "bi-cell." In the battery cell 101, an anode current collector 151 is sandwiched between two anode materials 111*a* and 111*b* (collectively referred to as "anode materials 111"). On each anode material 111*a* and 111*b* disposed a respective separator 131*a* and 131*b* (collectively referred to as "separators 131"). A pair of cathode materials 121*a* and 121*b* (collectively referred to as "cathode materials 121") is disposed on each of the separators 131*a* and 131*b*, respectively. On each cathode material 121*a* and 121*b* disposed a corresponding cathode current collector 161*a* and 161*b* (collectively referred to as "cathode current collectors 161"). The anode materials 111, the anode current collector 151, the cathode materials 121, the cathode current collectors 161, and the separators 131 can be substantially the same as described above relating to FIG. 1A. In one example, the anode current collector 151 and the cathode current collectors 161 comprise substantially the same material. In another example, the anode current collector 151 comprises a first metal material (e.g., copper) and the cathode current collectors 161 comprise a second metal material (e.g., aluminum). The battery cell 101 is substantially sealed in a pouch (not shown) to form a single pouch battery cell.

The battery cell 101 shown in FIG. 1B is cross-section view of an exemplary embodiment of a bi-cell that includes a double-sided anode (including the anode current collector 151 and the pair of anode materials 111*a* and 111*b*) and two single-sided cathodes (including a first cathode material 121*a* disposed on a first cathode current collector 161*a* and a second cathode material 121*b* disposed on a second cathode current collector 161*b*) disposed on each side of the double-sided anode. In some other embodiments, the battery 101 can also include a double-sided cathode and two single-sided anodes disposed on each side of the cathode. As described herein, the battery cell 101 can be packaged singly inside a pouch or can be packaged with multiple "bi-cells" inside the pouch.

FIG. 1C shows a top plan view of the battery cell 101 shown in FIG. 1B. From the top plan view, the cathode current collectors 161*a* and 161*b* can be seen misaligned or staggered within the bi-cell. In some embodiments, the anode current collector 151 and the cathode current collectors 161 are located on different sides of the battery cell 101. In some embodiments, the anode current collector 151 and the cathode current collectors 161 are located on opposite sides of the battery cell 101. In some embodiments, the anode current collector 151 and the cathode current collectors 161 are located on the same side of the battery cell 101.

FIG. 1D shows another embodiment of a battery cell 102. In this embodiment, the battery cell 102 includes two bi-cells that include two double-sided anodes. In some embodiments, the battery cell 102 can include two bi-cells comprising two double-sided cathodes. As shown in the figure, the cathode current collectors 161*c*, 161*d*, 161*e*, and 161*f* (collectively referred to herein as "cathode current collectors 161*x*") can be seen dis-aligned or staggered within the battery cell 102. Similarly, the anode current collectors 151*a* and 151*b* (collectively referred to herein as "anode current collectors 151*x*") can be seen misaligned or staggered within the battery cell 102. In some embodiments, the anode current collectors 151*x* and the cathode current collectors 161*x* are located on different sides of the battery cell 102. In some embodiments, the anode current collectors 151*x* and the cathode current collectors 161*x* are located on opposite sides of the battery cell 102. In some embodiments, the anode current collectors 151*x* and the cathode current collectors 161*x* are located on the same side of the battery cell 102.

In some embodiments, dis-aligning or staggering of the current collectors allow various interconnectivity of the current collectors within the single pouch cell. In some embodiments, by connecting the desired current collectors together via extension tab, for example, a single extension tab can be used to extend into a sealed region of the single pouch cell for external electrical contact. This can prevent electrode or battery contamination by welding the electrical contacts outside the single pouch cell.

Figure 1E:
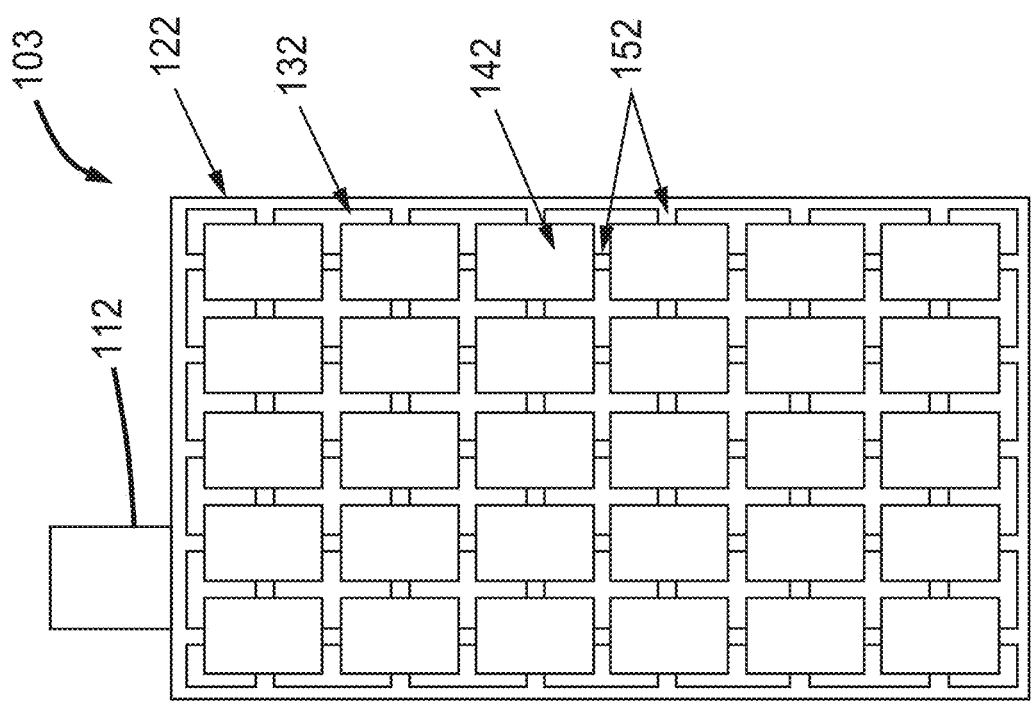
FIG. 1E is a schematic view of a type of battery cell produced using a self-fusing concept, according to some embodiments.

FIG. 1E shows a schematic view of a single pouch battery cell using a self-fusing concept. Only one electrode (either the anode or the cathode) is shown in FIG. 1E, and the separator and the other electrode in the battery cell can be added according to embodiments as described in any of FIG. 1A, FIG. 1B, FIG. 1C or FIG. 1D. The battery cell 103 includes a tab 112 to couple the battery cell 103 with other battery cells or to an external electrical contact, a foil 122 including a plurality of slurry pockets 142 containing electrode materials, a plurality of foil bridges 152 electrically coupling the plurality of slurry pockets 142 with each other, and an epoxy portion 132 filling the portions of the foil that is not covered by the slurry pockets 142 and the foil bridges 152. FIG. IF is a photo of a portion of the battery cell 103.

Figure 2:
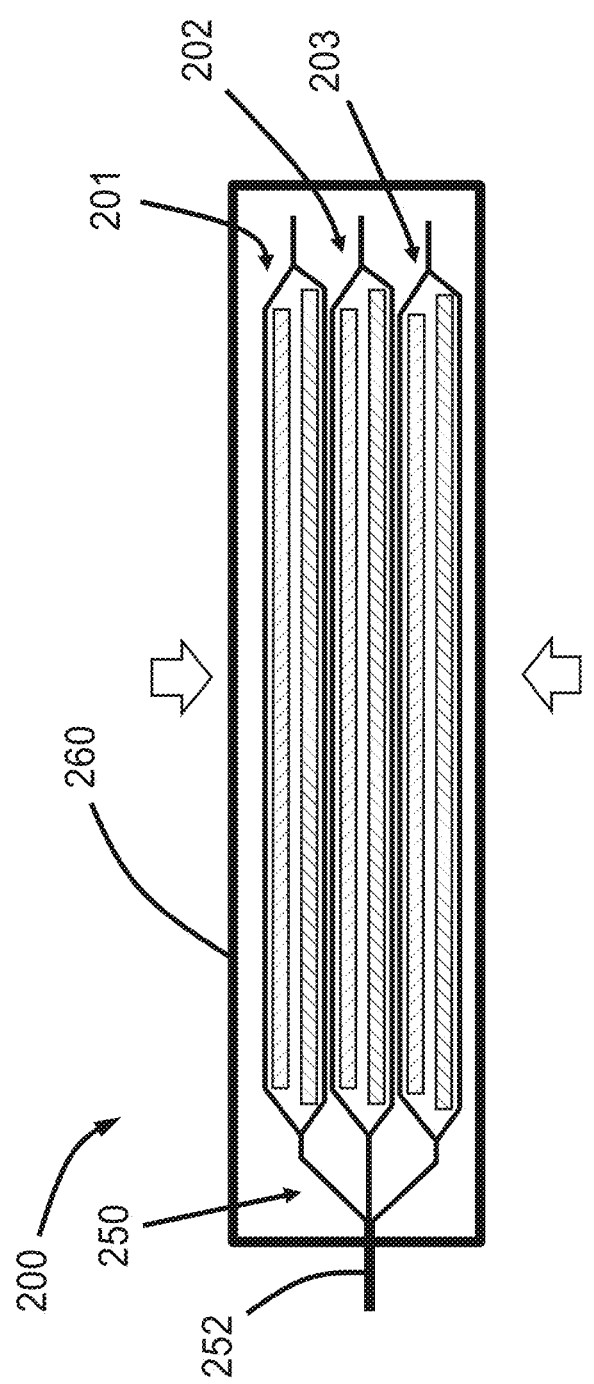
FIG. 2 is a schematic view of a battery module including a plurality of single pouch battery cells, according to some embodiments.

FIG. 2 shows a battery module 200 including multiple single pouch battery cells, according to some embodiments. As shown, the battery module 200 includes a plurality of single pouch battery cells 201, 201, and 203, enclosed in a module case 260. The battery module also includes a tab connection 250 that couples the tabs from each of the single pouch battery cells 201-203 to an external tab 252, which can then electrically connect the battery module 200 to an external circuit.

In some embodiments, the respective tab from each of the single pouch battery modules 201-203 can be part of the respective current collector. For example, each current collector in the single pouch battery cells 201-203 can have a lead portion that extends out of the electrode portion (i.e., portions disposed with electrode materials) as the tab. In some embodiments, the respective tab from each single pouch battery cell 201-203 can be an additional and independent component electrically coupled to the respective current collector or electrode material. For example, each tab can be a metal strip attached to the current collector via soldering, welding, gluing, or other means known in the art.

In some embodiments, the coupling between the tab connection 250 and the external tab 252 can be achieved by, for example, a welding point, a rivet, a screw, or other means known in the art. Note that when welding is used to couple the tab connection 250 and the external 252, metal contamination to the electrode materials can still be substantially avoided since the welding can be performed after each single pouch battery cell 201-203 has been sealed in their respective pouch, which can block metal particles from reaching the electrode materials.

In some embodiments, the module case 260 can apply a force upon the stack of the single pouch battery cells 201-203 so as to exert stack pressure the battery module 200. In some embodiments, the module case 260 includes a metal material, such as stainless steel. In some embodiments, the module case 260 includes a plastic or polymer material. In some embodiments, the module case 260 comprises substantially the same material that constitutes the pouch in each single pouch battery cell 201-203. In these embodiments, the module case 260 can be regarded as an additional pouch, which can further mitigate defect propagation, fire hazard, and metal contamination.

In some embodiments, the single pouch battery cells 201-203 can be stacked by gluing, applying adhesive or via a heat stake to bond the single pouch battery cells. For example, the application of heat or adhesive can be done sequentially one gluing after another, or simultaneously applying glue to all the single pouch battery cells. In some embodiments, the stacking process can include a non-contact heating approach. For example, each of the single pouch battery cells can be coated with a layer or a portion of a material that can be activated to act as an adhesive under application of heat, light, such as UV or IR, or mechanical or electrical perturbation, such as ultrasonic or acoustic wave, or radio frequency or microwave, or any combination thereof.

The battery module 200 shown in FIG. 2 includes three single pouch battery cells 201-203. However, in practice, the number of single pouch battery cells in a module may be more than three or less than three, depending on the desired output capacity, the thickness requirement, or other specifications.

Figure 3:
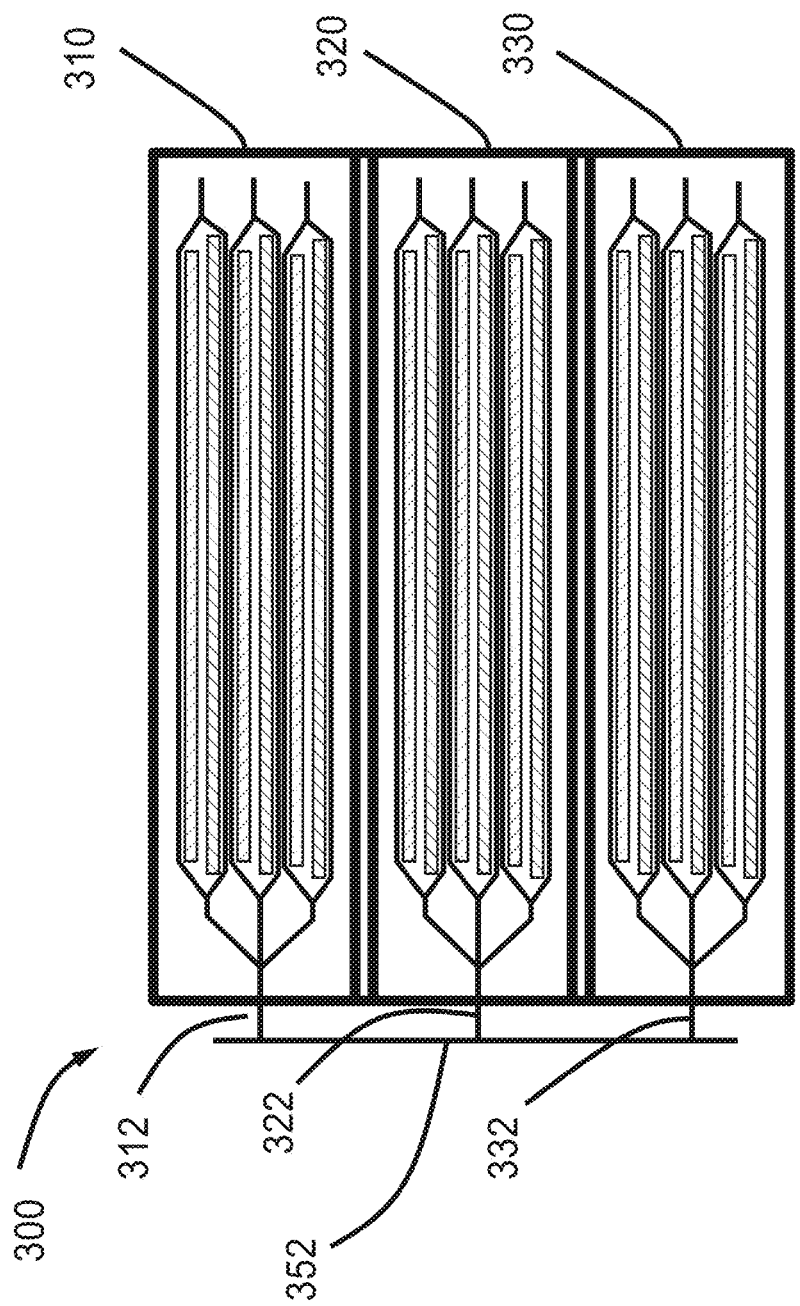
FIG. 3 is a schematic view of a battery pack including multiple battery modules shown in FIG. 2, according to an embodiment.

FIG. 3 shows a schematic view of a battery pack including a plurality of battery modules, according to some embodiments. The battery pack 300 includes a first battery module 310, a second battery module 320, and a third battery module 330. Each battery module in the plurality of battery modules 310-330 can be substantially the same as the battery module 200 shown in FIG. 2. Each battery module in the plurality of battery modules 310-330 includes a respective external tab 312, 322, and 332, which are coupled to an external bus bar 352. The coupling between the external tabs 312-332 and the external bus bar 352 can be achieved by, for example, welding, soldering, riveting, screwing, or other means known in the art.

The modular design of each battery module in the plurality of battery modules 310-330 allows convenience construction of batteries that can satisfy practical demands in applications. In some embodiments, the plurality of battery modules 310-330 can be connected in series, as shown in FIG. 3, so as to achieve a higher output voltage. In some embodiments, the plurality of battery modules 310-330 can be connected in parallel so as to achieve a higher output current. In some embodiments, the plurality of battery modules 310-330 can be stacked together vertically, as shown in FIG. 3, to satisfy certain thickness or shape requirement. In some embodiments, the plurality of battery modules 310-330 can be distributed horizontally to achieve a certain form factor (e.g., when a sheet of battery pack with a custom thickness is desired).

The battery pack 300 shown in FIG. 3 includes three battery modules 310-330. However, in practice, the number of battery modules in a battery pack may be more than three or less than three, depending on the desired output capacity, the thickness requirement, or other specifications.

Tab Connections in Single Pouch Battery Cells and Modules

Figure 4A:
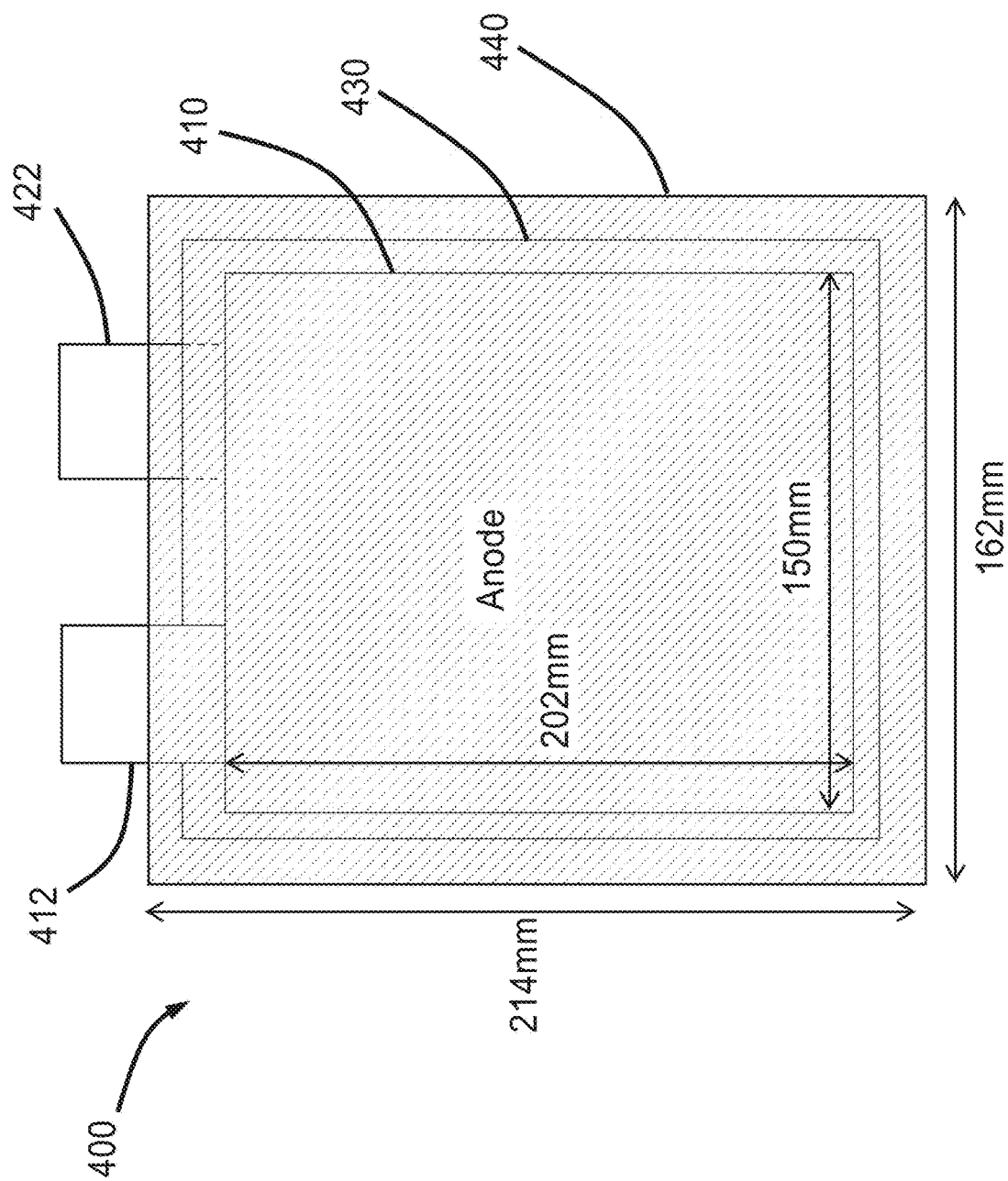
FIG. 4A is a schematic view of relative dimensions of each component in a single pouch battery cell, according to some embodiments.
Figure 4B:
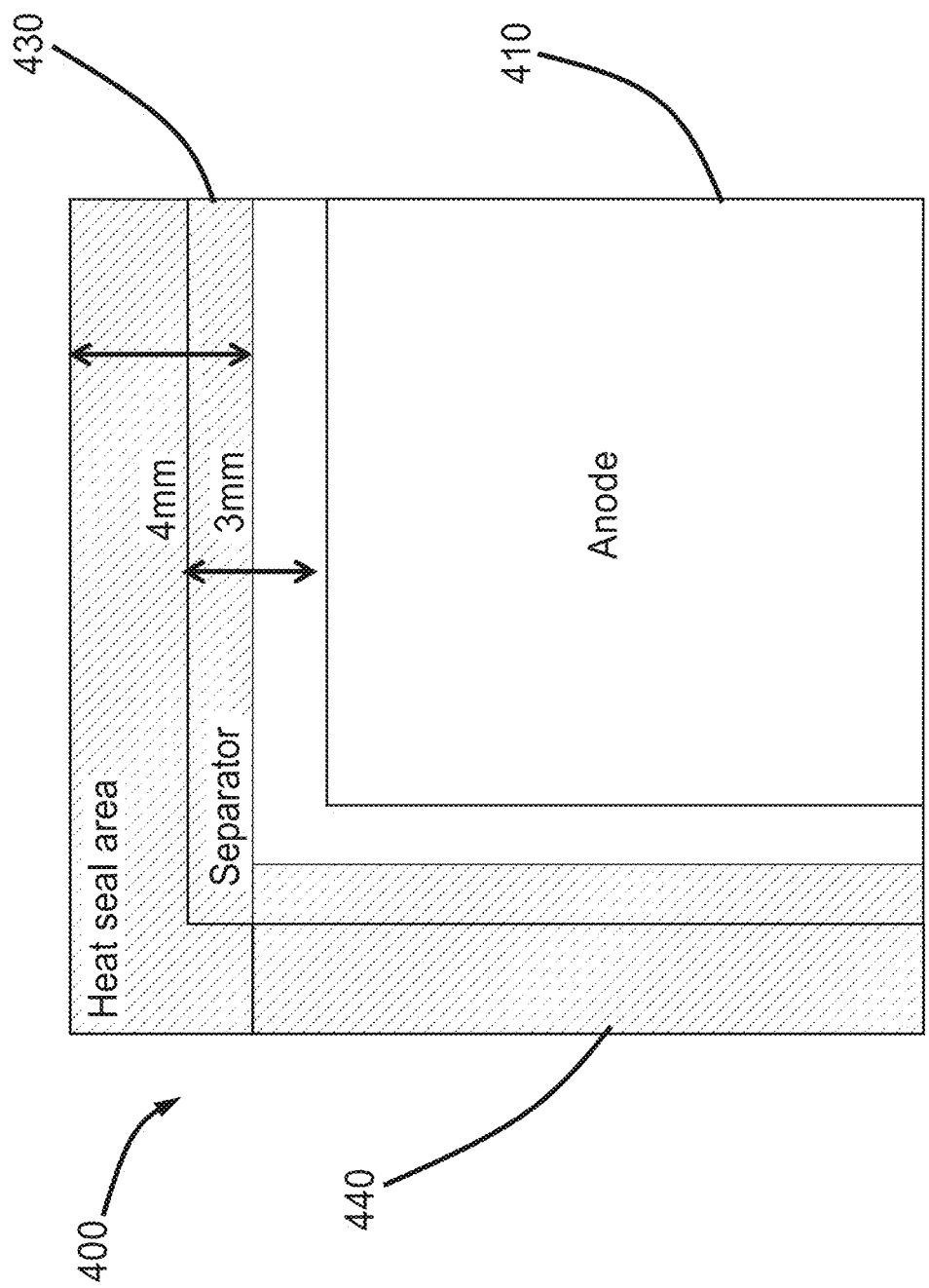
FIG. 4B shows an enlarged view of a corner of the single pouch battery cell shown in FIG. 4A.

FIGS. 4A-4B show perspective views of a single pouch battery cell including conductive tabs to couple the battery cell to external circuits, neighboring battery cells, or other electrical components in an application. The single pouch battery cell 400 shown in FIG. 4A includes an anode 410, a separator 430, and a cathode 420 (behind the separator 430, seen in FIG. 4B), which are stacked together as described above. A pouch 440 then substantially contains the stack of the anode 410, the cathode 420, and the separator 430. The anode 410 has an anode lead portion 412 extending out of the electrode portion (i.e., the portion covered by anode material) of the current collector (not shown) as a tab. Similarly, the cathode also has a cathode lead portion 422 extending out of the electrode portion (i.e., the portion covered by cathode material) of the current collector as a tab. In some embodiments, the lead portions 412 and 422, as shown in FIG. 4A, are metal strips. In some embodiments, the current collectors used in the anode 410 and the cathode 420 can be mesh current collectors and the corresponding lead portions 412 and 422 can be, for example, a metal wire, a bundle of metal wires, a braid of metal wires, or an array of metal wires. In some embodiments, the metal wires can be substantially the same as the wire constituting the mesh current collectors. In some embodiments, the metal wires can comprise a different conductive material from the metal material as used in the mesh current collector.

FIG. 4A also illustrates one example of relative dimensions of each component in a single pouch battery cell. As shown in FIG. 4A, both the anode 410 and the cathode 420 are smaller than the separator 430 so as to avoid electrical contact between the anode 410 and the cathode 420. The pouch 440 is larger than the electrode portions of the anode 410 and the cathode 420, as well as the separator 430, so as to seal the battery cell and/or avoid leakage of electrode material and electrolyte. The two tabs 412 and 422 are extending out of the pouch 440 so as to electrically couple the battery cell 400 to external elements, such as other battery cells.

FIG. 4B shows a magnified view of the corner of the single pouch battery cell 400 to more clearly illustrate the relative dimensions of each elements described above. In FIG. 4B, the cathode 420 is slightly smaller than the anode 410 and therefore the cathode 420 is "hidden" from view by the anode 410. In some embodiments, at least a portion of the separator 430 is heat sealed in the pouch 440 to prevent any contact between the anode 410 and the cathode 420. In some embodiments, the cathode 420 can be substantially the same size as the anode 410.

The relatively large size of the pouch 440 provides a means for supporting electrode materials, in particular semi-solid electrode materials, during battery manufacturing, i.e., the pouch 440 can hold the anode material and the cathode material. The pouch 440 can also protect the electrodes from deformation, in particular at the edge of the electrodes, which could occur in the event of packaging a stack of electrodes.

An exemplary dimension of each element in a single pouch battery cell 400 can be as following: the anode 410 and cathode 420 have a dimension of 202 mm×150 mm; the separator 430 can be 3 mm larger on each direction, i.e., 205 mm×153 mm; the pouch 440 has a dimension of 214 mm×162 mm, 12 mm larger than the anode 410 and the cathode 420 on each direction. The thickens of each electrode (anode 410 or cathode 420) can be, for example, greater than 150 µm, greater than 200 µm, or greater than 300 µm. The total thickness of a single pouch battery can be, for example, greater than 600 µm, greater than 800 µm, or greater than 1 mm.

Figure 5:
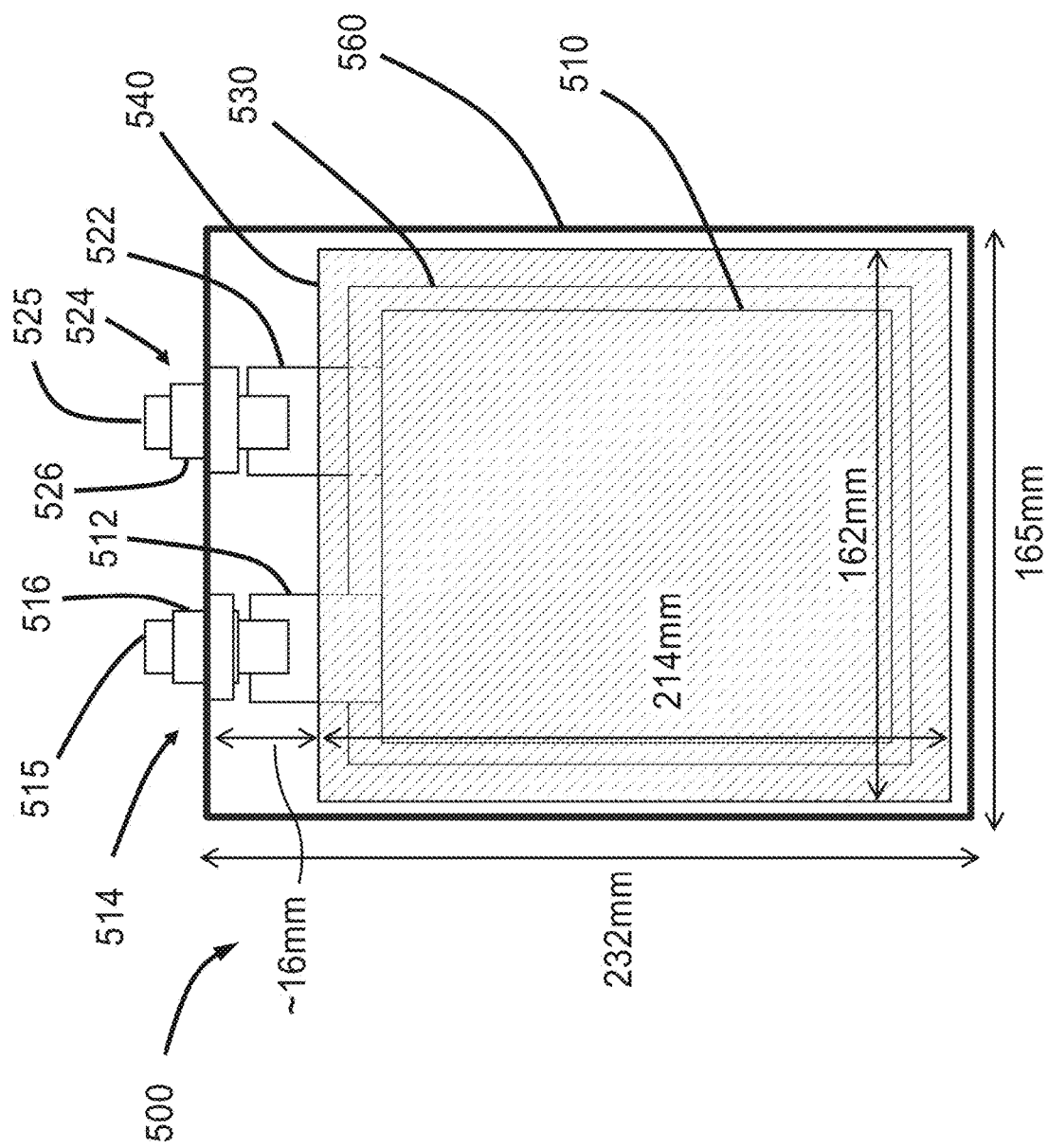
FIG. 5 is a schematic view of a battery module including single pouch battery cells enclosed in a metal case, according to some embodiments.

FIG. 5 shows a top view of a battery module including a plurality of single pouch battery cells enclosed in a metal case. The battery module 500 includes a metal case 560 that substantially encloses a plurality of single pouch battery cells (only one single pouch battery cell is shown in FIG. 5). Each single pouch battery cell includes an anode 510, a separator 530, and a cathode (behind the separator 530, not shown in FIG. 5), all of which are contained and sealed in a pouch 540. The anode 510 has a current collector with a lead portion 512 extending out of the electrode portion as an anode tab. Similarly, the cathode has a current collector with a lead portion 522 extending out of the electrode portion as a cathode tab. The plurality of anode tabs 512 and cathode tabs 522 are coupled together, and the coupled tabs 512 and 522 are further coupled to external electrical connectors 514 and 524. More specifically, the anode tabs 512 are coupled to an anode connector 514 of the battery module 500, and the cathode tabs 522 are coupled to a cathode connector 524 of the battery module 500.

The anode connector 514 includes a conductive element 515, which on the one end is coupled to the anode tabs 512 and on the other end is coupled to external elements such as other batteries or utilities. The conductive element 515 is disposed through the wall of the metal case 560 and is electrically separated from the wall of the metal case 560 via an anode connector coupler 516, which also substantially holds the conductive element 515 and prevents sliding of the conductive element 515. Similarly, the cathode connector 524 includes a conductive element 525 coupled to the cathode tabs 522 on one end and to external element on the other end. A cathode connector coupler 526 is configured to electrically insulate the conductive element 525 from the wall of the metal case 560 and substantially hold the conductive element 525. In some embodiments, one of the conductive elements 515 or 525 can be connected to the metal case 560 directly without any insulation. In these embodiments, the metal can 560 can have a same polarity with that of the conductive element (i.e., 515 or 525) directly connected to the metal case 560.

In some embodiments, the anode connector coupler 516 and/or the cathode connector 526 can be a pair of fasteners (e.g., screws or bolts) and nuts, which are made of non-conductive material or coated with non-conductive materials and are mechanically coupled with each other and with the wall of the metal case 560. In some embodiments, the anode connector coupler 516 and/or the cathode connector 526 can be a pair of magnetic couplers that are coupled together via magnetic force. In some embodiments, the anode connector coupler 516 and/or the cathode connector 526 can be glued together with and disposed through the wall of the metal case 560.

In some embodiments, the metal case 560 is substantially rigid to protect the battery cells within the metal case 560. In some embodiments, the metal case 560 has certain mechanical flexibility so as to be more impact resistant. In some embodiments, the metal case 560 comprises a material such as stainless steel, copper, aluminum, or their combinations or alloys. In some embodiments, the metal case 560 has a thickness of about 0.2 mm to 2 mm, or 0.5 mm to 1.5 mm, or 0.8 mm to 1 mm. In some embodiments, the metal case 560 can be slightly larger than the pouch 540. In one example, the pouch 540 has a dimension of 214 mm×162 mm, and the metal case 560 has a dimension of 232 mm×165 mm. Therefore, the single pouch battery cells are expected to be substantially fixed within the metal case without free movement.

In some embodiments, the battery module 500 functions as an independent battery providing power through the anode connector 514 and the cathode connector 524. In some embodiments, the battery module 500 can be coupled with other battery modules, similar or dissimilar, to form a battery pack with certain specification (e.g., capacity, voltage, current, size, shape, etc.).

FIGS. 6A-6B show side views of a battery module including single pouch battery cells enclosed in a metal case. FIG. 6A shows a battery module 600 including a metal can 660 and a lid 662, which, taken together, form a metal case to contain a plurality of single pouch battery cells 601. The battery module also includes an electrode connector 614, which can be either an anode connector or a cathode connector. Only one electrode connector is shown in FIG. 6A, while the other electrode connector can be behind the shown connector and therefore is not seen.

In practice, the plurality of the single pouch battery cells can be disposed into the metal can 660, after which the lid 662 can be disposed or sealed on top of the metal can 660 so as to form the battery module 600. The completed battery module 600 is shown in FIG. 6B.

In some embodiments, the lid 662 and the metal can 660 comprise substantially the same material, such as stainless steel, copper, and aluminum, among others. In some embodiments, the lid 662 comprises a material different from the material in the metal can 660. For example, the metal can 660 is made of stainless steel and the lid 662 comprises an aluminum foil or tin foil that can be more easily welded to the metal can 660. In some embodiments, the lid 662 can be attached to the metal can 660 by laser welding, seam welding, mechanical methods such as crimping, or any other method known in the art.

Figure 7A:
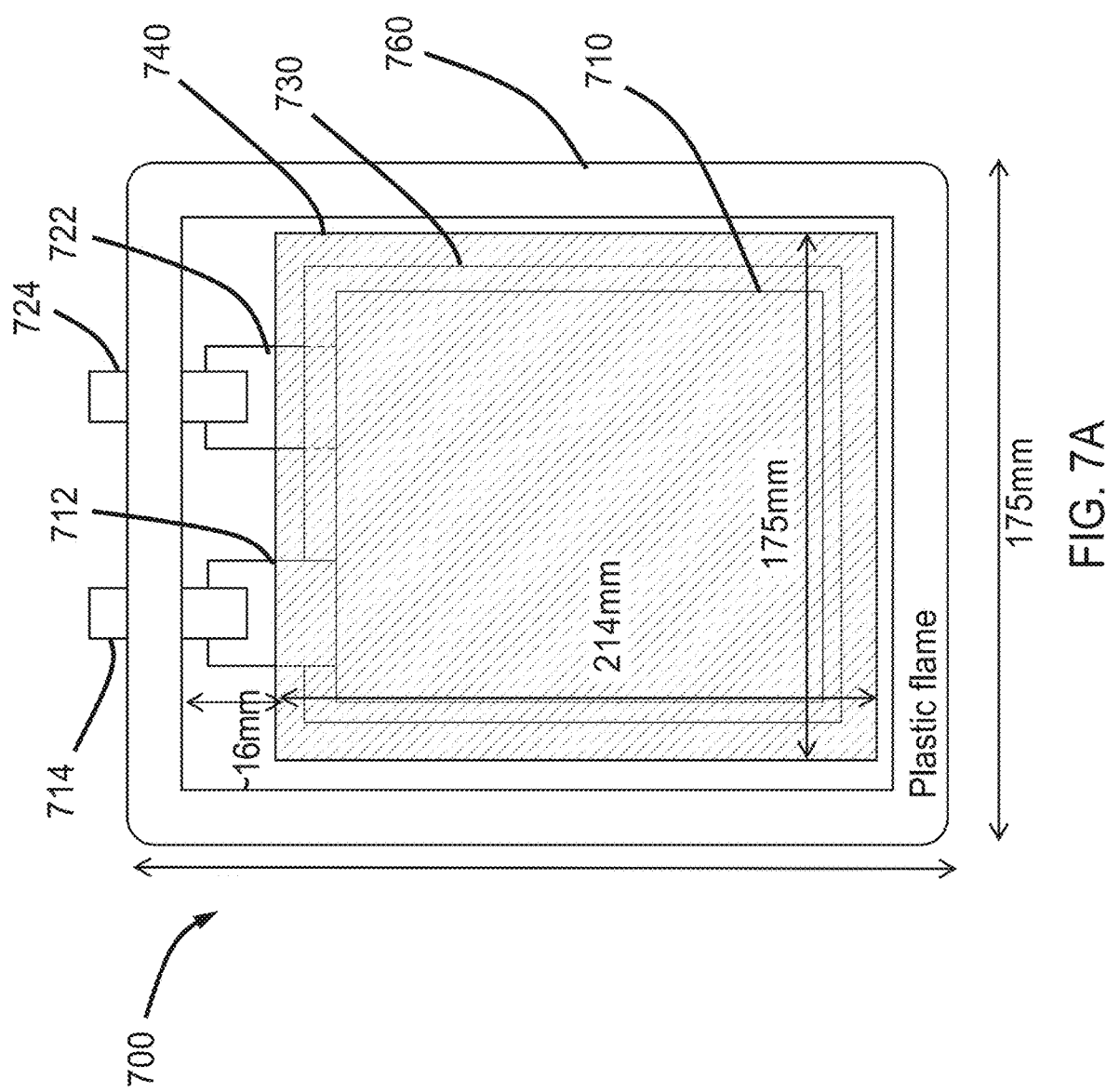
FIG. 7A is a top view of a battery module including multiple single pouch battery cells enclosed in a plastic frame, according to some embodiments.

FIG. 7A shows a top view of a battery module including a plurality of single pouch battery cells enclosed in a plastic frame. The battery module 700 includes a plastic frame 760 that substantially contains the periphery (sides) a plurality of single pouch battery cells (only one single pouch battery cell is shown in FIG. 7A). Each single pouch battery cell includes an anode 710, a separator 730, and a cathode (behind the separator 730, not shown in FIG. 7), all of which are contained and sealed in a pouch 740. The anode 710 has a current collector with a lead portion 712 extending out of the electrode portion as an anode tab. Similarly, the cathode has a current collector with a lead portion 722 extending out of the electrode portion as a cathode tab. The plurality of anode tabs 712 and cathode tabs 722 are coupled together, and the coupled tabs are further coupled to external electrical connectors. More specifically, the anode tabs 712 are coupled to an anode connector 714 of the battery module 700, and the cathode tabs 722 are coupled to a cathode connector 724 of the battery module 700.

In some embodiments, the anode connector 714 and the cathode connector 724 are in direct contact with the wall of the plastic frame 760 since the plastic frame 760 is insulating. In some embodiments, additional couplers, such as the couplers 516 and 526 shown in FIG. 5, can be employed to mechanically hold the anode connector 714 and the cathode connector 724.

In some embodiments, the plastic frame 760 can have a thickness about 2 mm to about 10 mm so as to provide sufficient rigidity and protect the single pouch batteries within the plastic frame 760. In some embodiments, the thickness of the plastic frame 760 can be about 3 mm to about 7 mm, or about 4 mm to about 6 mm. In some embodiments, the plastic frame 760 include materials such as nylon, acrylic, polyvinyl chloride (PVC), uPVC, polythene, polypropylene, polycarbonate, Bakelite, epoxy resin, and Melamine, among others. In some embodiments, the plastic frame 760 can include a thin metal plate or foil on the outer surface, on the inner surface, or within the plastic frame 760 so as to prevent gas and water penetration. In some embodiments, the plastic frame 760 can include a surface coating. In some embodiments, the surface coating can reduce penetration of water and gases.

Figure 7B:
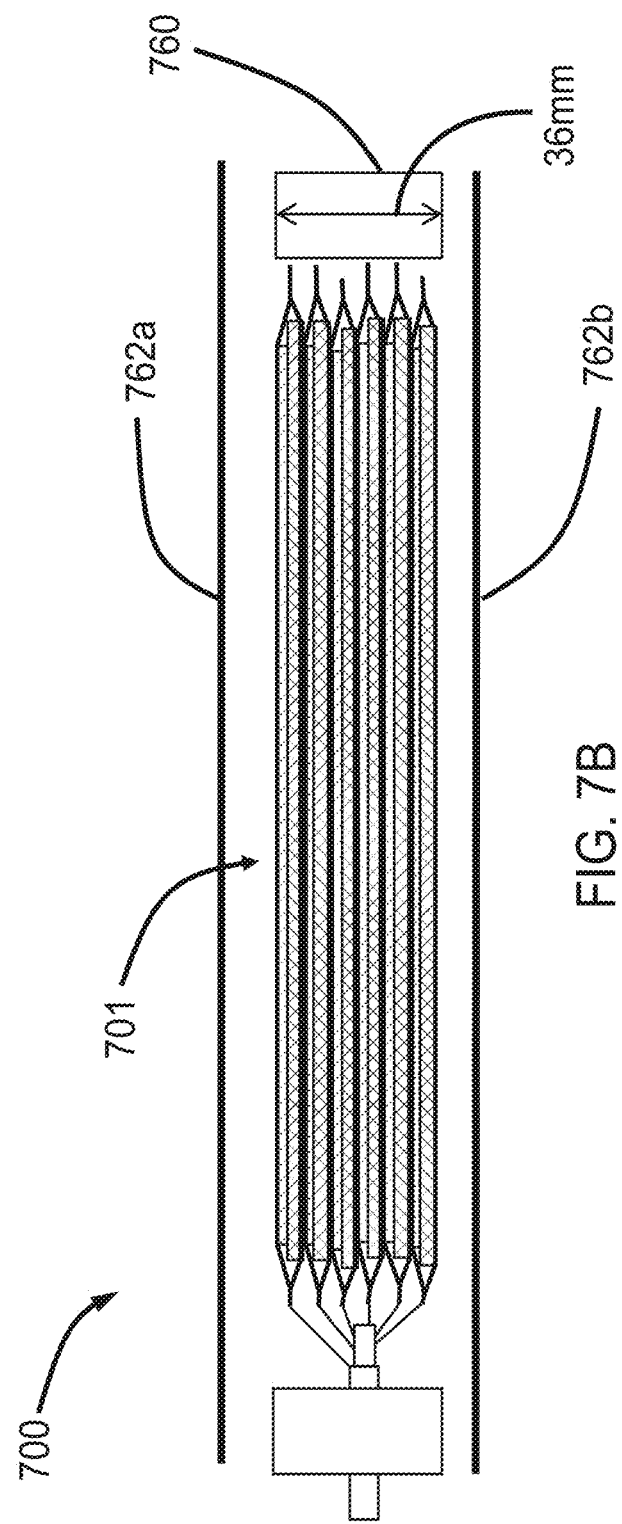
FIG. 7B is a side view of the battery module shown in FIG. 7A with the top and bottom lids shown.

FIG. 7B shows a side view of the battery module 700 shown in FIG. 7A. As seen in FIG. 7B, the battery module 700 also includes a pair of lids 762a and 762b, disposed on each side (top and bottom) of the plastic frame 760, so as to form an entire container to substantially contain the single pouch battery cells. In some embodiments, the lids 762a and 762b include polymer foils that can be thermally fused with the plastic frame 760. In some embodiments, the lids 762a and 762b include polymer or other plastic foils that can be vacuum sealed with the plastic frame 760. In some embodiments, the lids 762a and 762b include foils that can be glued the plastic frame 760. In some embodiments, one or both of the lids 762a and 762b include a plate, which can be plastic or metal. In some embodiments, the plastic plate can include metal foil disposed on the outer or inner surface. In some embodiments, the plate can have surface coating.

Figure 8A:
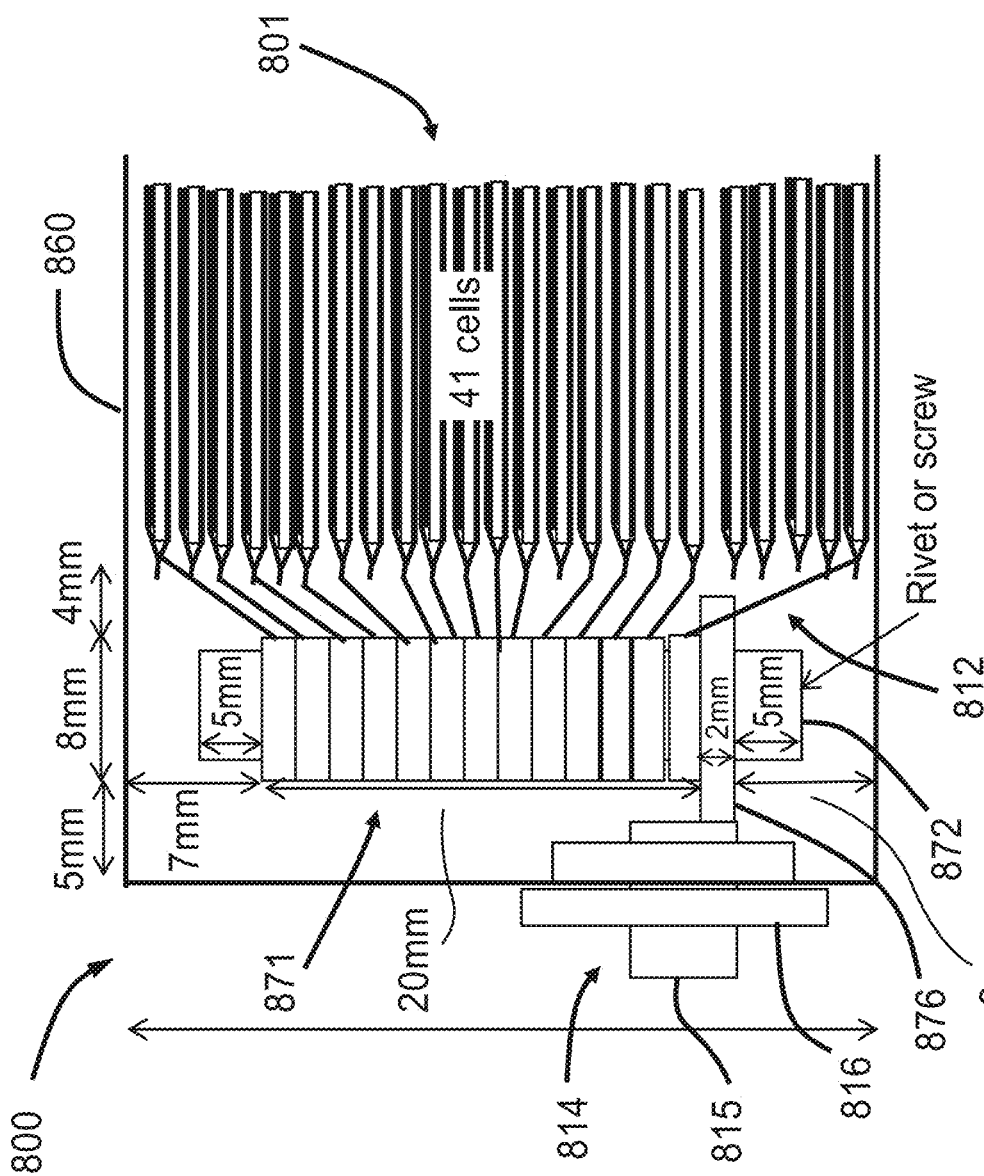
FIG. 8A shows a tab design employed in a battery module including multiple single pouch battery cells, according to some embodiments.

FIGS. 8A-8C show a tab design in a battery module including a plurality of single pouch battery cells enclosed in a metal case and the corresponding tab connection regions, respectively. FIG. 8A shows a side view of a battery module 800 including a metal case 860 (only a portion of the entire case is shown in FIG. 8A) that substantially contains a plurality of single pouch battery cells 801, each of which has a tab 812 that couples the respective single pouch battery cell with the rest of the battery cells in the battery module 800 via a plurality of spacers 871. A spacer coupler 872 then electrically couples the spacers 871 as well as the tabs 812 to an end piece 876, which is electrically coupled to an electrode connector 814 (either anode connector or cathode connector). The electrode connector 814 further includes a conductive piece 815 penetrating through the wall of the metal case 860 and a connector coupler 816 that electrically insulates the conductive piece 815 from the wall of the metal case 860. The battery module 800 can provide power to utilities through the electrode connector 814. In some embodiments, the conductive piece 815 is a coaxial connector. In some embodiments, the conductive piece 815 is a snap connector. In some embodiments, the conductive piece 815 is a pin connector, or any other electrical connector known in the art.

FIG. 8B shows a side view of one of the spacers 871 shown in FIG. 8A. The spacer 871 includes a bridge portion 874 and an end portion 875. The bridge portion 874 in each spacer 871 is pressed against a tab 812 from a single pouch battery cell 801. Therefore, the plurality of tabs can be electrically coupled to the plurality of spacers, which also mechanically holds the tabs in place. The end portion 875 has a hole that can receive the spacer coupler 872. In some embodiments, the spacer coupler 872 is a rivet, a screw, a bolt, or any other conductive piece.

FIG. 8C shows a connector portion 870 of the battery module 800 that is proximate to the tabs 812 and the electrode connector 814 to illustrate the tab design. When the spacer coupler 872 (e.g., a rivet) is fastened, each tab 812 can be in physical and electrical contact with the bridge portion 874 of the spacer 871. The bridge portion 874 is further electrically coupled with the end portion 875, which, via the spacer coupler 872, is electrically coupled to the end piece 876. The electrode connector 814 then connects to the end piece 876 and either provide power to external utilities or receive power (e.g., to charge the batteries) from external power sources. In some embodiments, both the bridge portion 874 and the end portion 875 of the spacer 817 can be conductive so as to form a conductive pathway from the single pouch battery cells 801 to the electrode connector 814. In some embodiments, only a portion (e.g., the portion in contact with the tabs 812) of the bridge portion 874 is conductive.

In some embodiments, the spacers 871 include a metal material (e.g., stainless steel, copper, aluminum, silver, etc.). In some embodiments, the spacers 871 include a non-conductive base (e.g., plastic) coated with a conductive material (e.g., metal, carbon, conductive metal oxide, etc.) so as to reduce the weight or cost of the battery module 800. In some embodiments, a couple of tabs 812 can be connected together to an extension tab instead of the spacer 871, and a couple of extension tabs are then connected to the end piece 876. In some embodiment, all tabs are collected and connected to the end piece 876 at once.

In some embodiments, the metal case 860 and/or the battery module 800 can include silicon oil or any liquid that will help with safety of the battery. Such liquid, silicon oil or otherwise can help maintain pressure (e.g., stacked pressure) within the metal case 860. In some embodiments, the use of such liquid can also help prevent water penetration into the metal case 860 and/or the battery module 800.

Methods of Manufacturing Single Pouch Battery Cells and Modules

Figure 9:
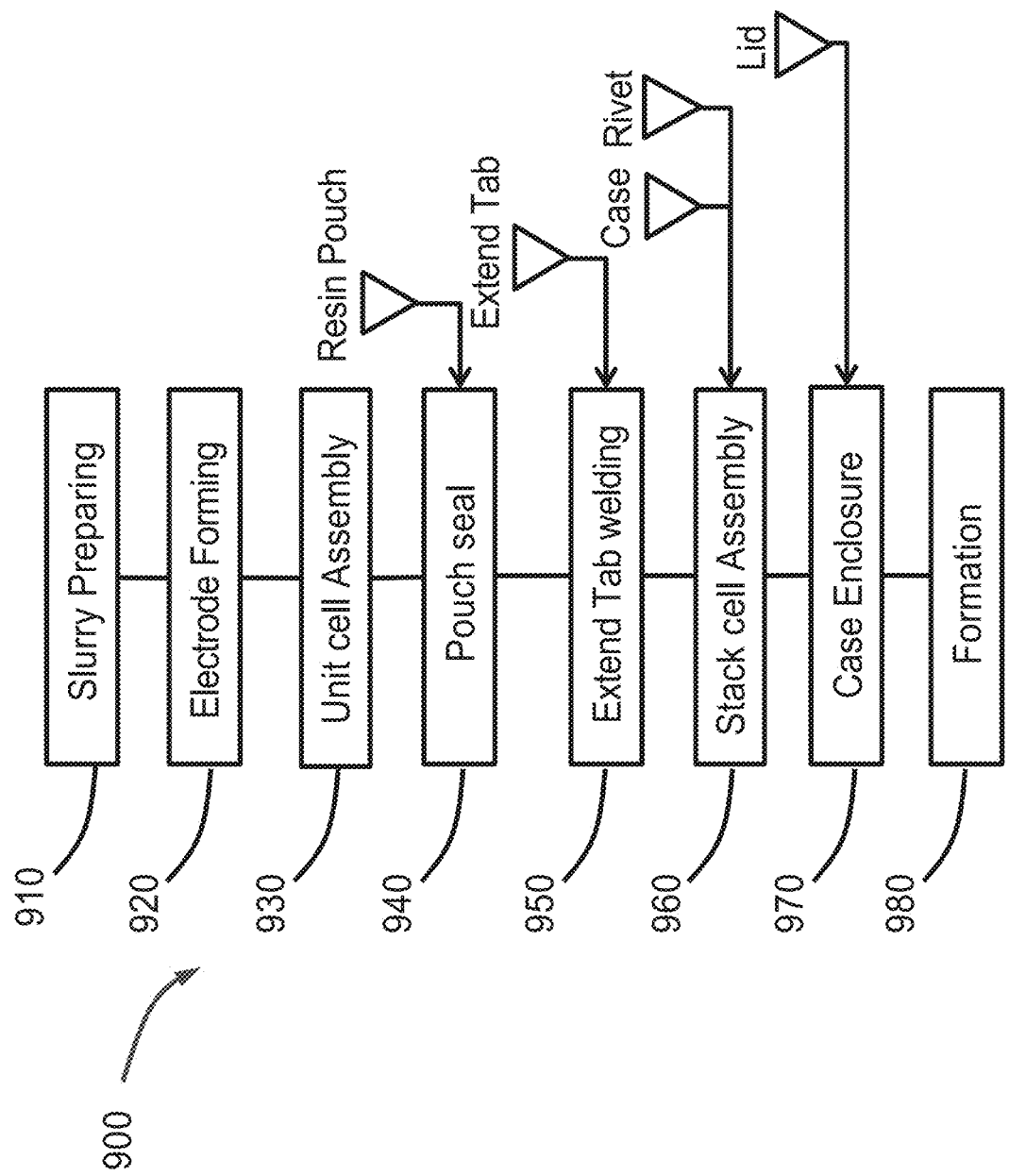
FIG. 9 is a method flowchart for manufacturing single pouch battery cells and modules, according to some embodiments.

FIG. 9 is a flowchart illustrating methods of manufacturing single pouch battery cells and modules, according to some embodiments. The method 900 starts from electrode slurry preparation in step 910, in which anode slurry and cathode slurry can be prepared separately.

In some embodiments, the electrode slurry includes a mixture of electrochemically active ion storage compounds, electrically conductive additives, and polymer binders.

In some embodiments, at least one of the anode slurry and the cathode slurry includes a semi-solid electrode material including a suspension of an active material and a conductive material in a non-aqueous liquid electrolyte. Examples of semisolid electrode materials are described in U.S. Patent Publication No. U.S. 2013/0065122 A1, entitled "Semi-solid Electrode Cell Having A Porous Current Collector and Methods of Manufacture," the entire disclosures of which is hereby incorporated by reference.

The prepared electrode slurry is then disposed (e.g., pasted or coated) on current collectors (e.g., foils, meshes, or porous conductive foams) to form electrodes in step 920. Additional compression steps, in which the current collectors coated with electrode slurry are compressed under high pressure, can be performed to increase density and control thickness.

In some embodiments, the slurry preparing step 910 and the electrode forming step 920 can be combined into a single step, referred to as the mixing and forming of a slurry electrode, which generally includes: (i) raw material conveyance and/or feeding, (ii) mixing, (iii) mixed slurry conveyance, (iv) dispensing and/or extruding, and (v) forming. In some embodiments, multiple steps in the process can be performed at the same time and/or with the same piece of equipment. For example, the mixing and conveyance of the slurry can be performed at the same time with an extruder. Each step in the process can include one or more possible embodiments. For example, each step in the process can be performed manually or by any of a variety of process equipment. Each step can also include one or more subprocesses and, optionally, an inspection step to monitor process quality.

Raw material conveyance and/or feeding can include: batch based manual weighing of material with natural feeding (e.g., allowing the mixer to accept material into the mixture without external force), batch based manual weighing of material with forced feeding either by a piston mechanism or a screw-based "side stuffer," gravimetric screw solids feeders with natural feeding (e.g., feed at the rate which the mixer can naturally accept material), gravimetric screw solids feeders with forced feeding (e.g., units sold by Brabender Industries Inc combined with a piston mechanism or a screw-based 'side stuffer'), and/or any other suitable conveyance and/or feeding methods and/or any suitable combination thereof.

In some embodiments, the slurry can be mixed using a Banburry® style batch mixer, a mixing section of a twin screw extruder, a centrifugal planetary mixer, and/or a planetary mixer. In some embodiments, the slurry can be sampled and/or monitored after mixing to measure and/or evaluate homogeneity, rheology, conductivity, viscosity, and/or density.

In some embodiments, for example after mixing, the slurry can be conveyed and/or pressurized, for example using a piston pump, peristaltic pump, gear/lobe pump, progressing cavity pump, single screw extruder, conveying section of a twin screw extruder, and/or any other suitable conveying device. In some embodiments, the torque and/or power of the conveying device, the pressure at the conveying device exit, the flow rate, and/or the temperature can be measured, monitored and/or controlled during the conveying and/or pressurizing.

In some embodiments, for example after conveying and/or pressurizing, the slurry can be dispensed and/or extruded. The slurry can be dispensed and/or extruded using, for example, a "hanger die" sheet extrusion die, a "winter manifold" sheet extrusion die, a profile-style sheet extrusion die, an arbitrary nozzle operable to apply a continuous stream of material to a substrate, injection into a mold of the correct size and shape (e.g., filling a pocket with material), and/or any other suitable dispensing device.

In some embodiments, after dispensing the slurry can be formed into a final electrode. For example, the slurry can be calendar roll formed, stamped and/or pressed, subjected to vibrational settling, and/or cut in discrete sections. Additionally, in some embodiments, unwanted portions of material can be removed (e.g., masking and cleaning) and optionally recycled back into the slurry manufacturing process.

After the electrodes (anodes and cathodes) are formed, in step 930, unit cells can be assembled. In some embodiments, each unit cell assembly can include an anode, a cathode, and a separator disposed in between to electrically insulate the anode and the cathode, e.g., as shown in FIG. 1A and described above. In some embodiments, each unit cell assembly can include a double-sided anode, two single-side cathodes, and two separators, as shown in FIG. 1B and described above.

In step 940, each assembled unit cell is sealed in a pouch. In some embodiments, the pouch includes a three-layer structure, for example, an outer layer including a nylon-based polymer film, an inner layer including a polypropylene (PP) polymer film, and an intermediate layer including an aluminum (Al) foil. This type of pouch can be sealed by, for example, heating sealing using a MSK-140 compact heating sealer provided by MTI Corporation. The sealing temperature can be, for example, 50°-200°, and the sealing pressure can be, for example, 0-0.7 MPa. In some embodiments, the pouch can include a single layer of lower cost materials that are thinner. For example, these materials can be polypropylene, resin, or a combination of polyolefins that can be sealed together using heat or pressure. In some embodiments, a pre-charge step can be performed to unit cells before sealing each individual pouch. Pre-charge steps may generate gas before pouch sealing so the need of degassing process conventionally carried out after battery formation can be eliminated.

In some embodiments, the electrode slurry is semi-solid electrode material and the prepared electrodes and the subsequent unit cell assembly already contains electrolyte in the electrode material, in which case the pouch can be sealed right after the preparation of unit cell assembly. In some embodiments, separate electrolyte (i.e., liquid electrolyte) is introduced into the pouch before sealing.

In step 950 after pouch sealing, a tab is prepared for each unit cell assembly so as to facilitate the construction of battery modules, battery packs, or other applications. In some embodiments, the tab can be part of the current collector. For example, the current collector can have a lead portion extending out of the electrode portion (e.g., 412 and 422 as shown in FIG. 4A). In some embodiments, the tab can be a separate element (e.g., a metal strip or wire) that is electrically coupled to the electrode. The coupling can be either to the current collector, or to the electrode material (i.e., electrode slurry), and can be achieved by welding, gluing, stapling, or other means known in the art.

Following the preparation of each unit cell assembly, multiple unit cell assemblies are coupled together in step 960 to form a preliminary battery module. In this step, multiple unit cell assemblies can be either stacked together vertically, arrayed together horizontally, or both, depending on practical applications. Also in this step, all the cathode tabs are typically coupled together into one connection point that can be further coupled to a cathode connector. Similarly, all the anode tabs are typically coupled together into one connection point that can be further coupled to an anode connector. In some embodiments, the tabs (either anode tabs or cathode tabs or both) are coupled together via welding, soldering, or gluing. In some embodiments, the tabs are coupled together via the use of spacers and rivets (e.g., as shown in FIGS. 8A-8C). In some embodiments, the tabs are coupled together via screws.

In step 970, the preliminary battery module is enclosed in a case. In some embodiments, the case is metal (e.g., as shown in FIG. 5). In these embodiments, the preliminary battery module can be placed in a metal can first, followed by the coupling of the tabs in each single pouch battery cell to anode and cathode connectors. Then a metal lid can be placed on top of the metal can so as to form a complete enclosure of the preliminary battery module. The metal lid can be coupled to the metal can via, for example, welding, soldering, or mechanical means. In some embodiments, the case includes a plastic frame on the side and two foils on the top and bottom, respectively (e.g., as shown in FIGS. 7A-7B). In these embodiments, the preliminary module can be coupled to the plastic frame first by connecting the tabs to anode and cathode connectors, after which the two foils can be coupled to the plastic frame via, for example, thermal fusion or pressure sealing.

The enclosed battery module is then subject to a formation process in step 980, in which an initial charging operation can be performed to create a stable solid-electrolyte-interphase (SEI) that can passivate the electrode-electrolyte interface as well as prevent side reactions. Moreover, several cycles of charging and discharging of the batteries are usually also carried out to ensure that the capacity of the batteries meets the required specifications.

FIG. 10A and FIG. 10B show a top view and a side view, respectively, of an anode assembly layout including multiple anodes, according to some embodiments. FIG. 10A shows an anode assembly 1000 that includes a pouch film 1040 (e.g., PE/PP film) that can constitute a pouch to contain the resulting battery cell, on which a plurality of anodes 1001a, 1001b, 1001c, and 1001d are disposed. For example, the first anode 1001a includes an anode material 1010a disposed on an anode current collector 1020a, which is disposed on the pouch film 1040. The first anode 1001a further includes an anode tab 1022a, electrically coupled to the anode current collector 1020a, so as to couple the first anode 1001a to an external circuit. Similarly, the second anode 1001b includes a tab 1022b and an anode material 1010b disposed on an anode current collector 1020b. Each anode (1001a through 1001d) is electrically insulated (e.g., by physical separation) from another anode in the anode assembly 1000.

The tabs (1022a, 1022b, etc.) are disposed in an alternating manner in terms of their location with respect to respective current collectors. More specifically, if one tab (e.g., 1022a) is disposed on the right side of the associated current collector (1020a), then its neighboring tabs (e.g., 1022b) are disposed on the left side of the associated current collector (1020b), and vice versa. This alternating configuration of tabs allows convenient assembly of unit cells in subsequent steps during single pouch cell manufacturing.

The anode assembly 1000 shown in FIG. 10A includes four anodes 1001a to 1001d for illustrating purposes only. In practice, the number of anodes disposed on a pouch film 1040 can be more or less than four.

FIG. 10B shows a cross sectional view (taken along the 10B-10B line shown in FIG. 10A) of the anode assembly 1000 including, from top to bottom, an anode material 1010, an anode current collector 1020, and a pouch film 1040. It can be seen from FIGS. 10A-10B that the anode material 1010 is smaller in size compared to the anode current collector 1020, which is further small in size compared to the pouch film 1040. This pyramid structure, in practice, allows for convenience handling of the anodes during manufacturing. More specifically, the relatively large size of the pouch film 1040 can provide a means for supporting electrode materials, in particular semi-solid electrode materials, during battery manufacturing, i.e., the pouch film can hold the electrode materials. The pouch film 1040 can also protect the electrodes from deformation, in particular at the edge of the electrodes, which could occur in the event of packaging a stack of electrodes. In addition, the pouch film 1040 can also prevent potential spill-over of electrode materials and contamination to other components in battery manufacturing by containing electrode materials within the space defined by the pouch film 1040.

A method of preparing the anode assembly 1000 shown in FIGS. 10A-10B can start from a pouch film. A plurality of anode current collectors can then be laminated on the pouch film (e.g., with an adhesive), with tabs configured in an alternating manner as described above. The plurality of anode current collectors can be arrayed in a periodic structure so as to facilitate subsequent assembly of unit battery cells. In some embodiments, (e.g., as shown in FIG. 10A), the anode current collectors are disposed in a one-dimensional array. In some embodiments, the anode current collectors can be disposed in two-dimensional arrays. After the pouch film and the anode current collectors are bonded together, anode materials can be disposed on each of the anode current collector so as to form the anode assembly 1000.

In some embodiments, the plurality of anode current collectors can be deposited on the pouch film via any of the following coating or deposition techniques including, but not limited to, chemical vapor deposition (CVD) (including initiated CVD, hot-wire CVD, plasma enhanced CVD, and other forms of CVD), physical vapor deposition, sputter deposition, magnetron sputtering, radio frequency sputtering, atomic layer deposition, pulsed laser deposition, plating, electroplating, dip-coating, brushing, spray-coating, sol-gel chemistry (through dip-coating, brushing or spray-coating), electrostatic spray coating, 3D printing, spin coating, electrodeposition, powder coating, sintering, self-assembly methods, and any combination of the techniques thereof.

In some embodiments, the properties of the deposited anode current collectors can be optimized during the deposition by varying deposition parameters. Physical properties such as, for example, coating texture, coating thickness, thickness uniformity, surface morphology, including surface roughness, porosity and general mechanical properties, including fracture toughness, ductility, and tensile strength can be optimized via fine tuning of deposition parameters. Similarly, chemical properties such as, for example, chemical resistance and corrosion resistance to electrolyte and salts, along with other chemical properties, including specific reactivity, adhesion, affinity, and the like can be optimized by varying deposition parameters to produce a functioning current collector. In some embodiments, various physical and chemical properties of the deposited or coated current collector can be further improved or modified post deposition by a subsequent surface or temperature treatment, such as annealing or rapid-thermal (flash) annealing, or electromechanical polishing, and using any combination of the techniques thereof.

Figure 11A:
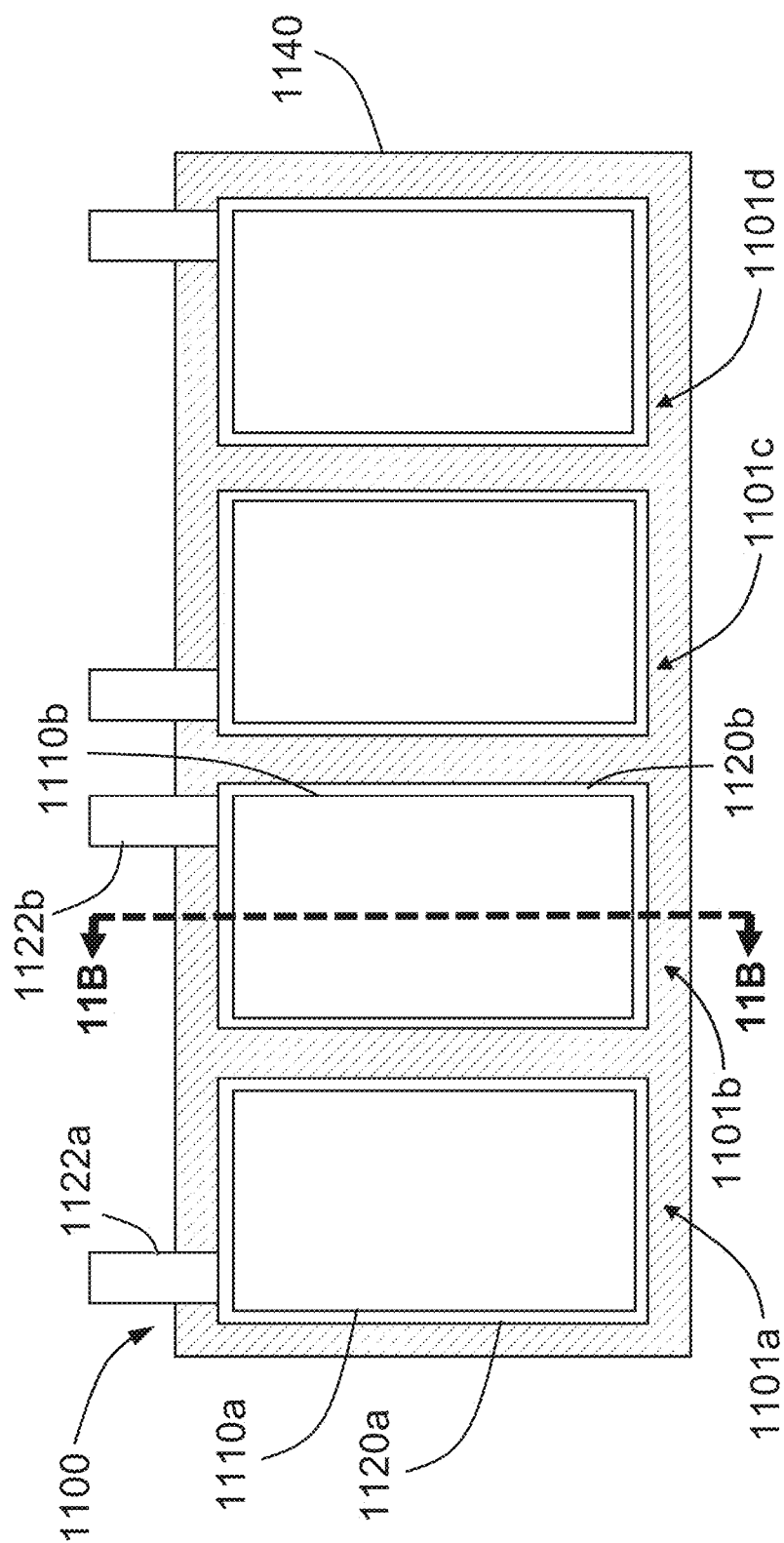
FIG. 11A shows a layout of a cathode assembly including multiple cathodes disposed on a pouch film, according to some embodiments.
Figure 11B:
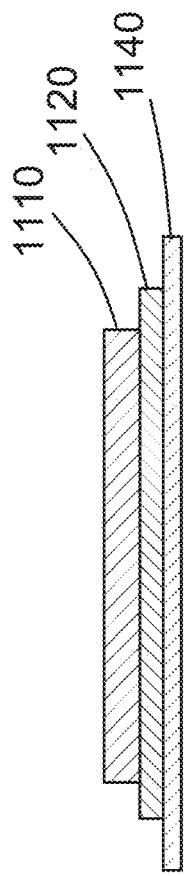
FIG. 11B shows a cross sectional view of the cathode assembly shown in FIG. 11A.

FIG. 11A shows a top view and FIG. 11B shows a cross sectional view (taken along the 11B-11B line shown in FIG. 11A) of a cathode assembly layout including multiple anodes, according to some embodiments. The cathode assembly 1100 includes a plurality of cathodes 1101a, 1101b, 1101c, and 1101d, which are disposed on a pouch film 1140. Each cathode (1101a to 1101d) includes a cathode material 1110a (take the first cathode as an example) disposed on a cathode current collector 1120a, which is laminated to the pouch film 1140. Each cathode further includes a tab 1122a for electrical coupling. FIG. 11B shows a cross sectional view of the cathode assembly 1000, which includes, from top to bottom, a cathode material 1110, a cathode current collector 1120, and a pouch film 1140.

The method of preparing the cathode assembly 1100 can be substantially similar to the method of preparing the anode assembly 1000 described above. The method can start from laminating a plurality of cathode current collectors in an array on a pouch film. Cathode materials can then be disposed on each of the cathode current collector so as to form the cathode assembly.

In some embodiments, the anode assembly 1000 shown in FIGS. 10A-10B and the cathode assembly shown in FIGS. 11A-11B can be prepared on a same pouch film (1040 or 1140). In some embodiments, the anode assembly 1000 and the cathode assembly 1100 can be prepared on separate pouch films.

Similarly, the plurality of cathode current collectors can also be deposited on the pouch film via a number of deposition or coating techniques as described above with respect to FIGS. 10A-10B. And the properties of the deposited cathode current collector can be optimized via aforementioned optimization techniques described above.

Figure 12:
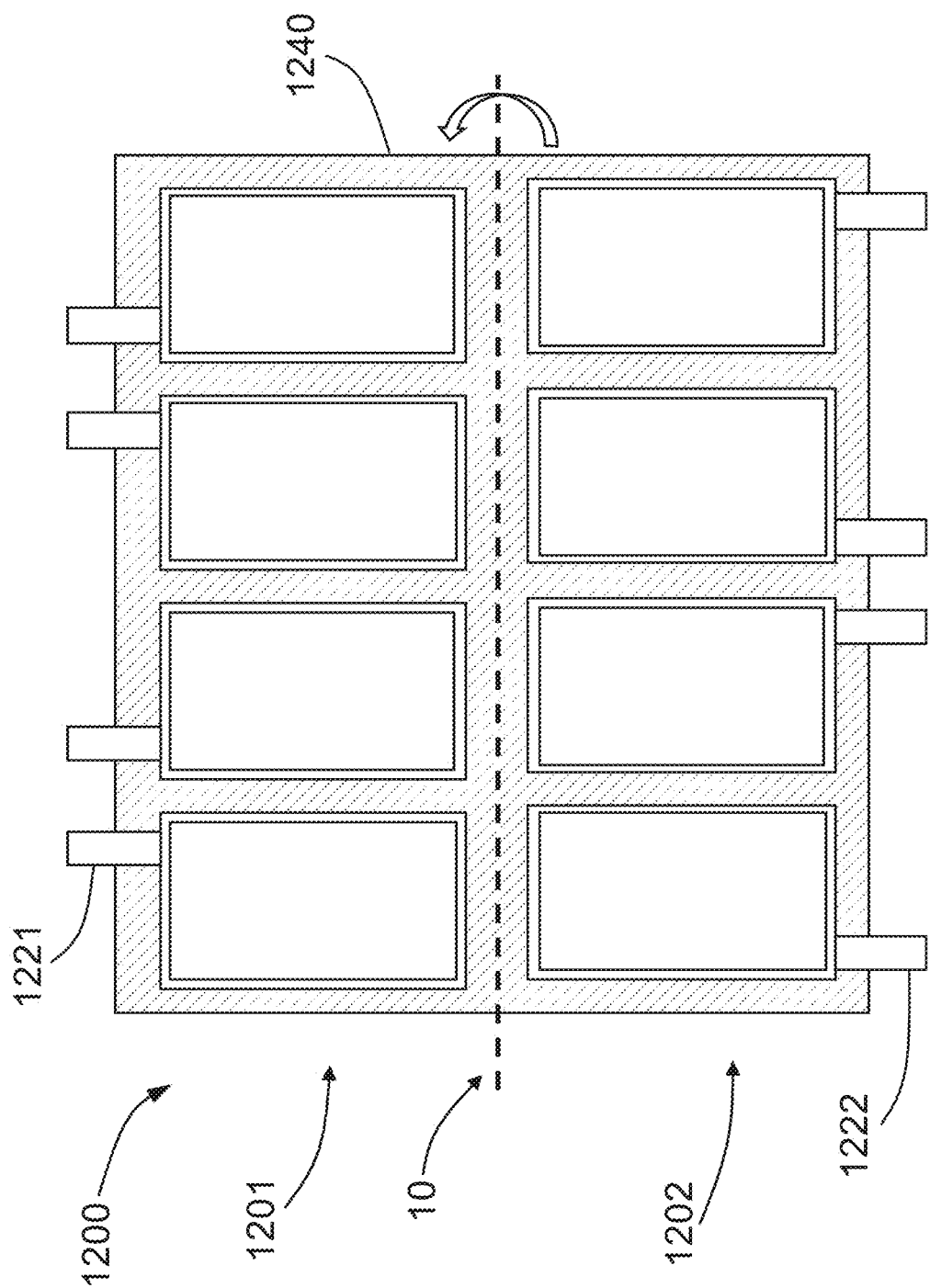
FIG. 12 shows a top view of an electrode assembly layout including a cathode assembly and an anode assembly, according to some embodiments.

FIG. 12 shows a top view of an electrode assembly layout 1200 including both an anode assembly 1201 and a cathode assembly 1202, disposed on a common pouch film 1240. The anode assembly 1201 and the cathode assembly 1202 can be substantially similar to the anode assembly 1000 in FIG. 10A and the cathode assembly 1100 in FIG. 10B, respectively, so they are not described in detail here. The anode assembly 1201 and the cathode assembly 1202 are aligned in such a way that each anode in the anode assembly 1201 overlays on a corresponding cathode in the cathode assembly 1202 when the electrode assembly 1200 is folded along the dashed line 10 in the middle. Furthermore, the respective tabs 1221 and 1222 of the anode assembly and the cathode assembly are arranged in a complementary manner. More specifically, when folded along the dashed line 10, each anode tab 1221 is on one side of the respective current collector and each cathode tab 1222 is on the other side of the respective current collector. In other words, anode tabs 1221 are not in contact with cathode tabs 1222 when the electrode assembly 1200 is folded long the dashed line 10.

In some embodiments, the pouch film can be kept folded for a prolonged period of time by application of heat or any other suitable methods to prevent from losing its fold. In some embodiments, the application of heat or any other suitable methods to prolong the folds can be performed prior to laminating the current collectors to the pouch film. In some embodiments, the application of heat or any other suitable methods to prolong the folds can be performed after lamination of the current collectors to the pouch film. Similarly, in some embodiments, the application of heat or any other suitable methods to prolong the folds can be performed prior to depositing or coating the current collectors to the pouch film. In some embodiments, the application of heat or any other suitable methods to prolong the folds can be performed after deposition or coating of the current collectors to the pouch film. The electrode assembly 1200 can be prepared by similar methods as described in relation to FIGS. 10A-10B and FIGS. 11A-11B. However, steps in the above methods (e.g., lamination of current collectors, disposition of electrode materials, etc.) can be arranged in various orders to prepare the electrode assembly 1200. In some embodiments, a method of preparing the electrode assembly 1200 starts from a pouch film, followed by separate lamination of anode current collectors and cathode current collectors. Then anode materials can be disposed on each anode current collector and cathode materials can be disposed on each cathode current collector.

In some embodiments, a method of preparing the electrode assembly 1200 begins with laminating of anode current collectors on a pouch film, followed by disposition of anode materials on each of the anode current collectors. Then the method proceeds to the lamination of cathode current collectors and disposition of cathode materials on each of the cathode current collectors.

In some embodiments, the anode current collectors and/or cathode current collectors can be deposited one after another on the pouch film via a number of deposition or coating techniques as described herein. The properties of the deposited anode current collectors and/or cathode current collectors can also be optimized as described above via aforementioned optimization techniques or approaches.

In some embodiments, the current collectors can be laminated on the pouch film in an alternating manner. More specifically, each time after a current collector of one type (anode or cathode) is laminated on the pouch film, a current collector of the other type (cathode or anode) is laminated and aligned with the current collector of the opposite type. These embodiments described immediately above are for illustrating purposes only. One of ordinary skill in the art should appreciate that various other orders can be implemented to prepare the electrode assembly 1200.

A separator can be placed on each electrode (anode or cathode) in the electrode assembly during or after the preparation of the electrode assembly 1200. In some embodiment, a separator is placed on each anode material. In some embodiments, a separator is placed on each cathode material. In some embodiments, separators are placed on electrode materials after the electrode assembly 1200 is prepared. In some embodiments, separators are placed on electrode materials during the preparation of the electrode assembly. For example, separators can be placed on anode materials after the anode assembly 1201 is prepared but before the cathode assembly 1202 is prepared. One of ordinary skill in the art should appreciate that various other orders of steps can be implemented here to dispose separators on electrode materials.

Figure 13:
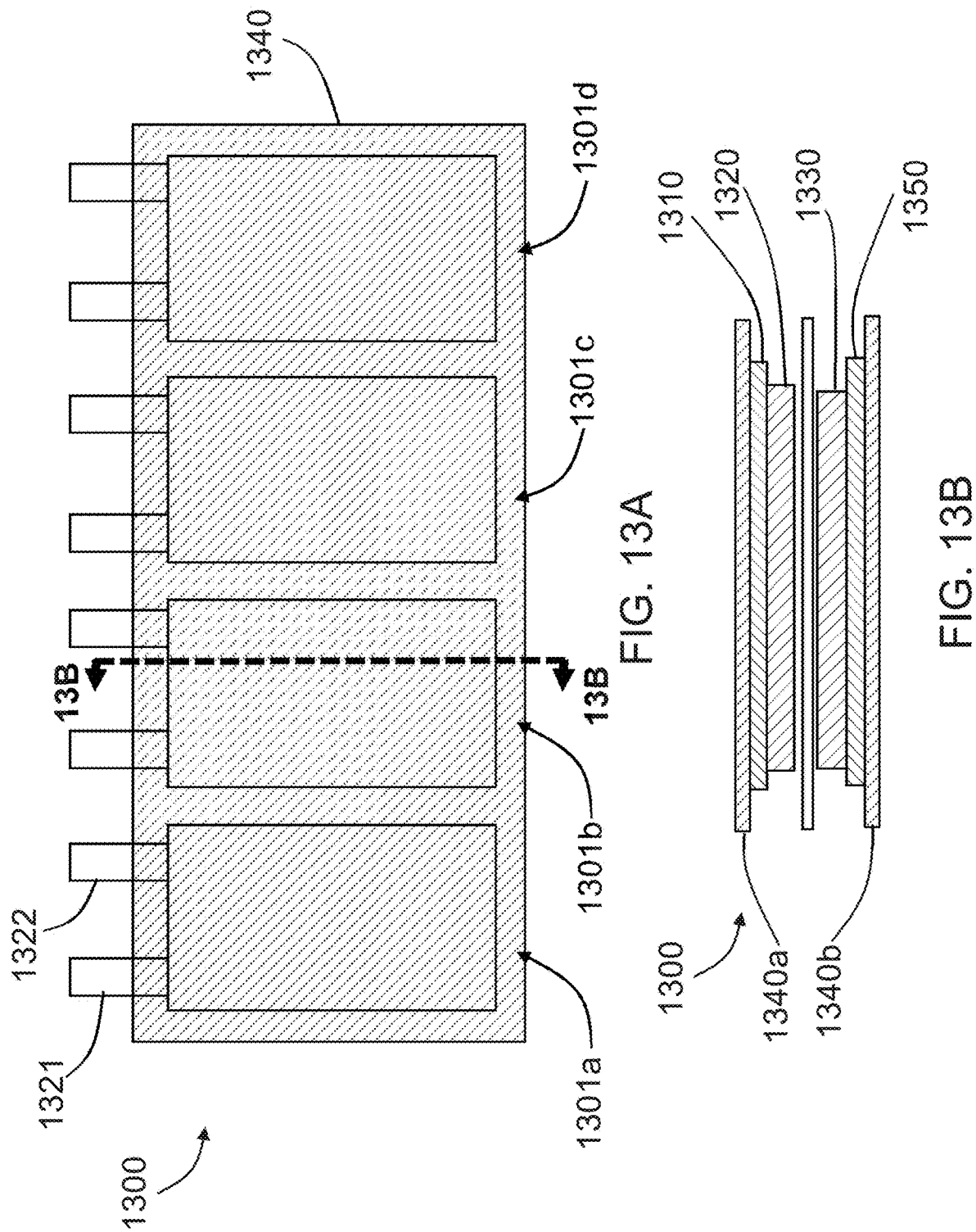
FIG. 13A shows a layout of a unit cell assembly including multiple unit cells, according to some embodiments.
FIG. 13B shows a cross sectional view of the unit cell assembly shown in FIG. 13A.

After separators (or a single large sheet of separator) are placed on the electrode assembly 1200 (on either the anode assembly 1201 or the cathode assembly 1202), the electrode assembly 1200 is then folded along the middle line 10 so as to form a unit cell assembly 1300, as shown in FIGS. 13A-13B. The unit cell assembly 1300 includes a plurality of unit cells 1301a, 1301b, 1301c, and 1301d. A pouch film 1340 substantially contains the plurality of unit cells 1301a to 1301d, except the tabs 1321 and 1322, which stick out of the pouch film 1340 so as to allow electrical coupling with external components. For illustration purposes only, four unit cells are shown in FIG. 13A. In practice, the number of unit cells in a unit cell assembly can be more or less than four, depending on manufacturing specifications.

Each unit cell (take the first unit cell 1301a for example) in the unit cell assembly includes a cathode tab 1321 on one side of the unit cell and an anode tab 1322 on the other side of the unit cell. Neighboring unit cells in the unit cell assembly 1300 have opposite configurations of the tabs 1321 and 1322. Take the first unit cell 1301a and the second unit cell 1301b for example. In the first unit cell 1301a, the cathode tab 1321 is on the left side of the unit cell and the anode tab 1322 is on the right side. In the second unit cell 1301b, however, the cathode tab 1321 is on the right side of the unit cell while the anode tab 1321 is on the left side. This alternating configuration of tabs allows for convenient cell assembly and battery manufacturing in subsequent steps, as set forth in detail below.

FIG. 13B shows a cross sectional view (taken along the 13B-13B line shown in FIG. 13A) of the unit cell assembly 1300, which includes, from top to bottom, a first pouch film 1340a, a cathode current collector 1310, a cathode material 1320, a separator 1330, an anode material 1330, an anode current collector 1350, and a second pouch film 1340b. In some embodiments, the first pouch film 1340a and the second pouch film 1340b can be different portions of a same film, for example, as shown in FIG. 12. In some embodiments, the first pouch film 1340a and the second pouch film 1340b can be different pouch films, on which an anode assembly and a cathode assembly are disposed respectively.

Figure 14:
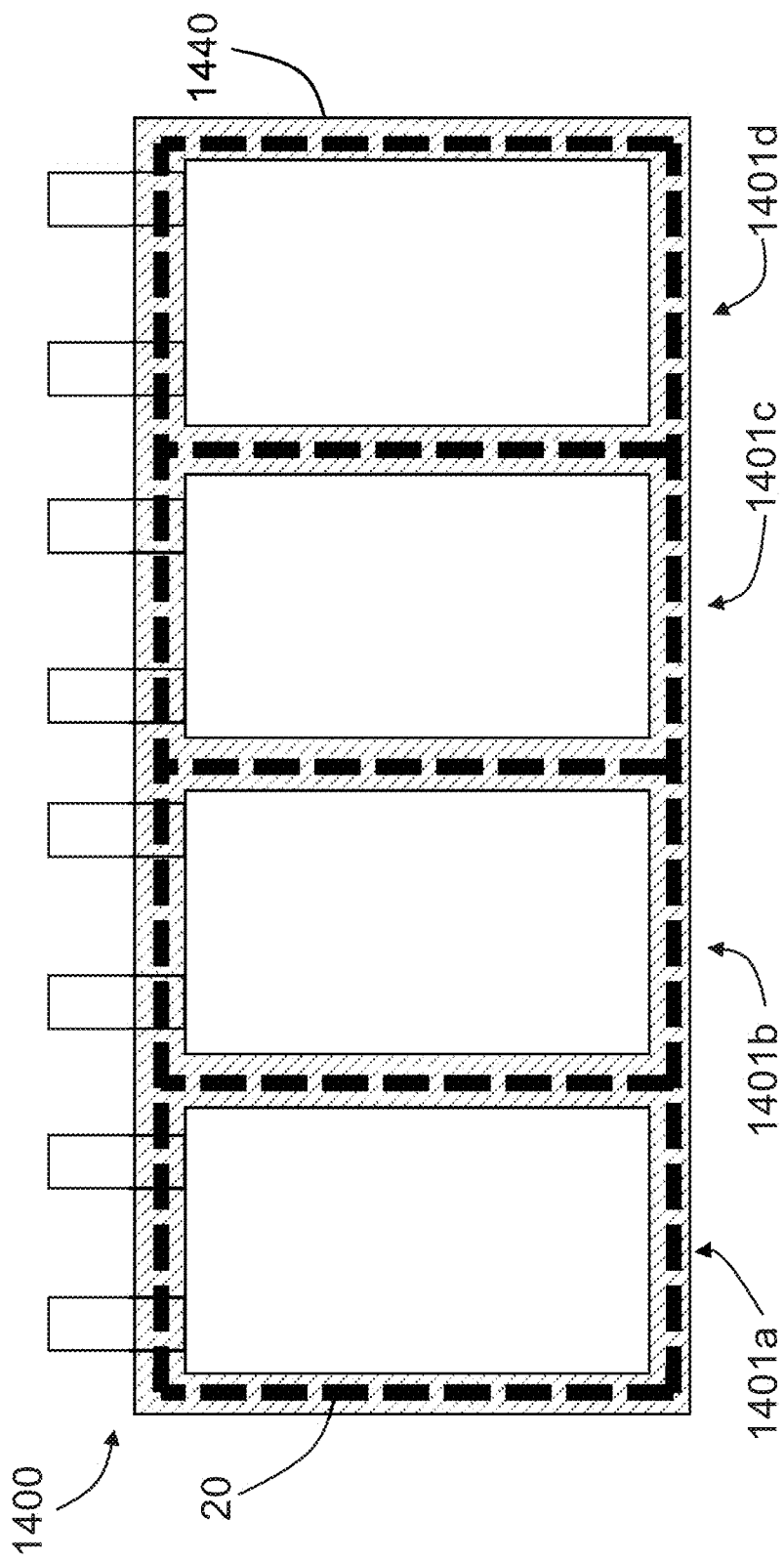
FIG. 14 illustrates a method of preparing unit cells in individual pouches, according to some embodiments.

A sealing step can be performed on the unit cell assembly 1300 shown in FIGS. 13A-13B so as to form individual unit cells, each of which is contained in a pouch, i.e., single pouch unit cells. FIG. 14 illustrates a sealing scheme of a unit cell assembly 1400, which can be substantially similar as the unit cell assembly 1300. The unit cell assembly 1400 includes a plurality of unit cells 1401a to 1401d, which are substantially contained in a pouch film 1440. The dashed line 20 indicates locations of sealing, which can be, for example, vacuum sealing or heat sealing.

In some embodiments, the sealing step can be performed along the two horizontal lines (one on the top and one on the bottom of the unit cell assembly 1400) first, followed by sealing on each vertical line. In some embodiments, the above order can be reversed, i.e., vertical sealing first, followed by horizontal sealing. In some embodiments, both vertical sealing and horizontal sealing can be performed simultaneously along predetermined sealing lines 20.

Figure 15B:
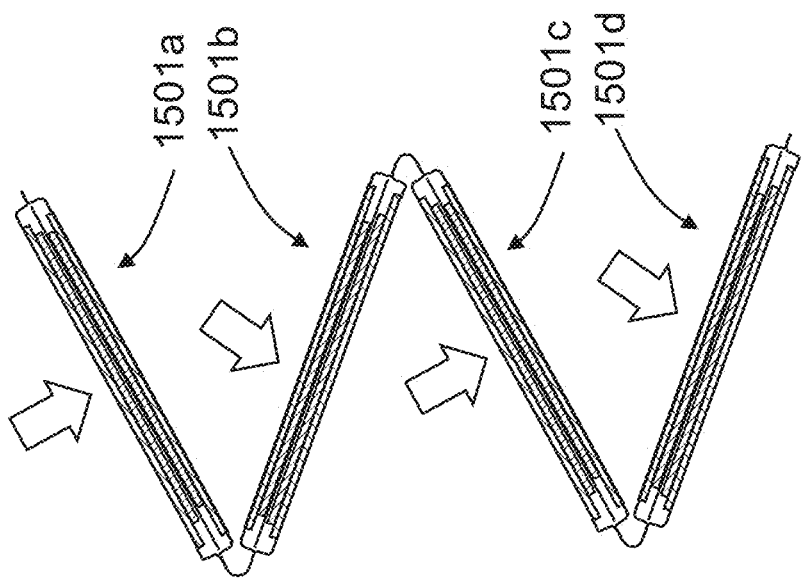
FIGS. 15A-15B illustrate a method of preparing unit a cell stack, according to some embodiments.
Figure 15A:
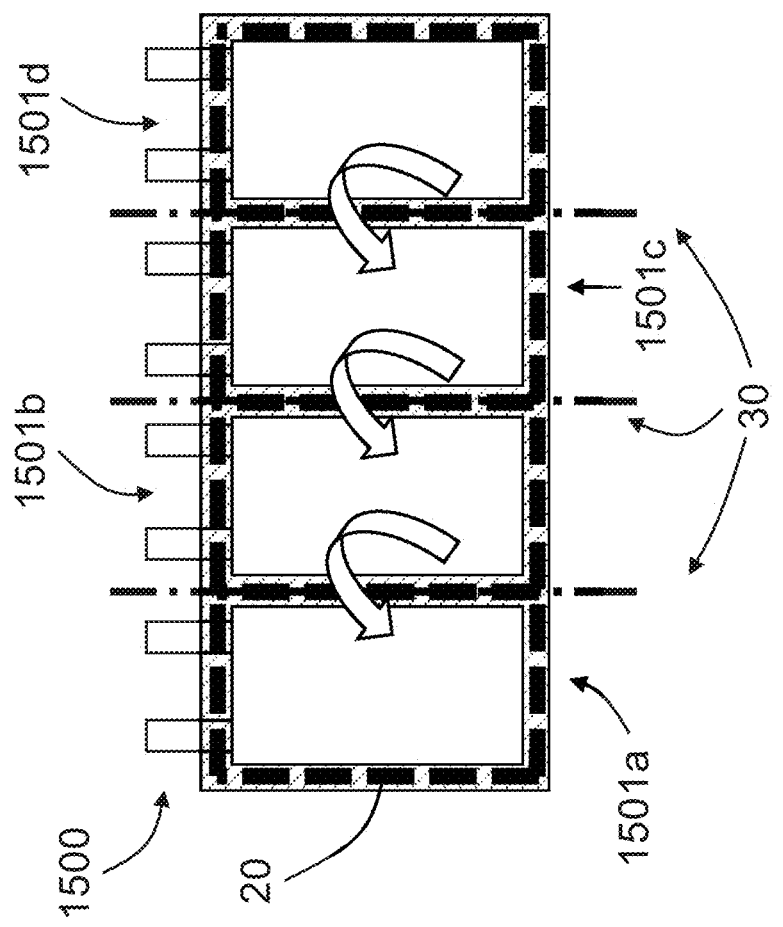

FIGS. 15A-15B illustrate a procedure to stack unit cells after each unit cell is sealed in a pouch, according to some embodiments. FIG. 15A shows a unit cell assembly 1500 that is substantially similar to the sealed unit cell assembly 1400 shown in FIG. 14. The unit cell assembly 1400 includes a plurality of unit cells 1501a to 1501d. The sealing is along the dashed line 20. The vertical dash-dot lines 30 indicate locations of lines along which the unit cell assembly 1500 is folded so as to form a unit cell stack. After folding, the anode tabs are on one edge of the resulting stack and the cathode tabs are on the other edge of the resulting stack such that the anode tabs are electrically insulated from the cathode tabs.

In some embodiments, the plurality of unit cells 1501a to 1501d is folded in a rolling manner. For example, the unit cell 1501d can be folded over the unit cell 1501c along a counterclockwise direction, and the resulting stack of 1501c and 1501d can then be folded over the unit cell 1501b also along the counterclockwise direction. This rolling process can continue until the last unit cell in the assembly (or first unit cell, depending on the starting unit cell).

In some embodiments, as shown in FIG. 15B, the plurality of unit cells 1501a to 1501d is folded in a zigzag manner. For example, the unit cell 1501a and 1501b can be folded along a counterclockwise direction. The unit cell 1501c and 1501d can be folded, however, along a clockwise direction. The stack of 1501a and 1501b can be folded with the stack of 1501c and 1501d along either a counterclockwise or a clockwise direction. In other words, the folding direction can be different for different unit cells in the unit cell assembly 1500.

In some embodiments, the folding of the plurality of unit cells 1501a to 1501d can be performed simultaneously. For example, a force can be applied from both the left side and the right side of the unit cell assembly so as to push the unit cells to be stacked together, similar to a side panel of a window air conditioner.

In some embodiments, the folding of the plurality of unit cells 1501a to 1501d can be kept for a prolonged period of time by application of heat or any other suitable methods to prevent from losing its fold. In some embodiments, the application of heat or any other suitable methods to prolong the folds can be performed after folding in a counterclockwise folding direction, after folding in a clockwise folding direction, after folding in a zig-zag folding direction, or any combination of folding directions thereof. In some embodiments, the folds of the plurality of unit cells 1501a to 1501d can be kept for a prolonged period of time by application of heat or any other suitable methods prior to folding of the plurality of cells. In some embodiments, the folding of the plurality of unit cells 1501a to 1501d can be kept for a prolonged period of time by application of heat or any other suitable methods after each folding of the plurality of cells takes place. In some embodiments, the folding of the plurality of unit cells 1501a to 1501d can be kept for a prolonged period of time by application of heat or any other suitable methods after all the folding of the plurality of cells have taken place.

FIG. 16A shows a top view and FIG. 16B shows a cross sectional view (taken along the 16B-16B line shown in FIG. 16A) of a unit cell stack prepared from the methods shown in FIGS. 15A-15B. The unit cell stack 1600 includes a plurality of unit cells 1601a-1601d (collectively referred to as unit cells 1601). Each unit cell is sealed in a pouch 1640. The cathode tabs 1621 are aligned on the left edge of the unit cell stack 1600 and the anode tabs 1622 are aligned on the right edge of the unit cell stack 1600. Both the cathode tabs 1621 and anode tabs 1622 stick out of the pouch 1640 so as to allow for electrical coupling with other components in a system, such as other cell stacks, utilities, or connectors.

Figure 17A:
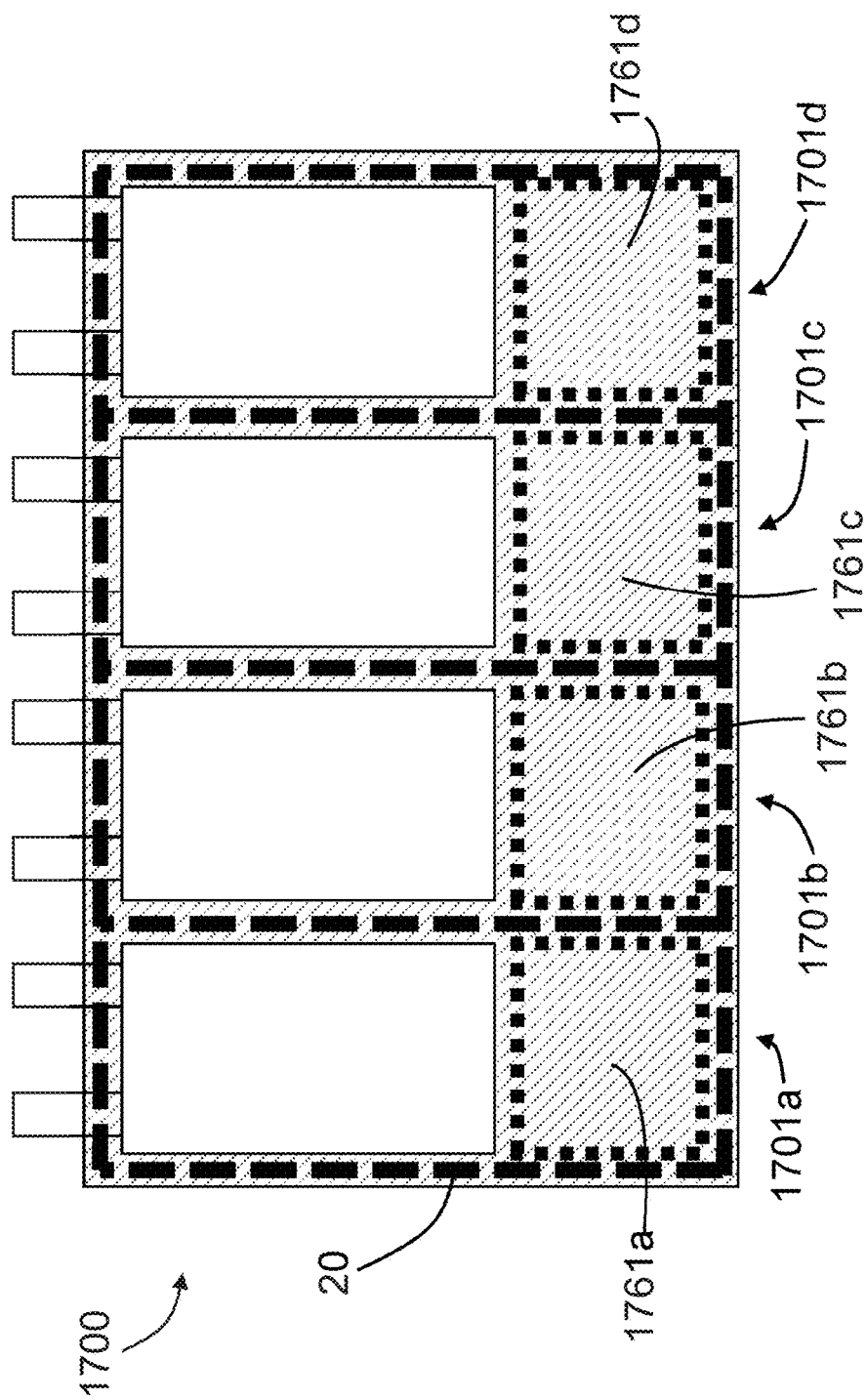
FIGS. 17A-17B show pouch cells with extra portions for degassing, resealing, and removing during the manufacturing of single pouch battery cells, according to some embodiments.
Figure 17B:
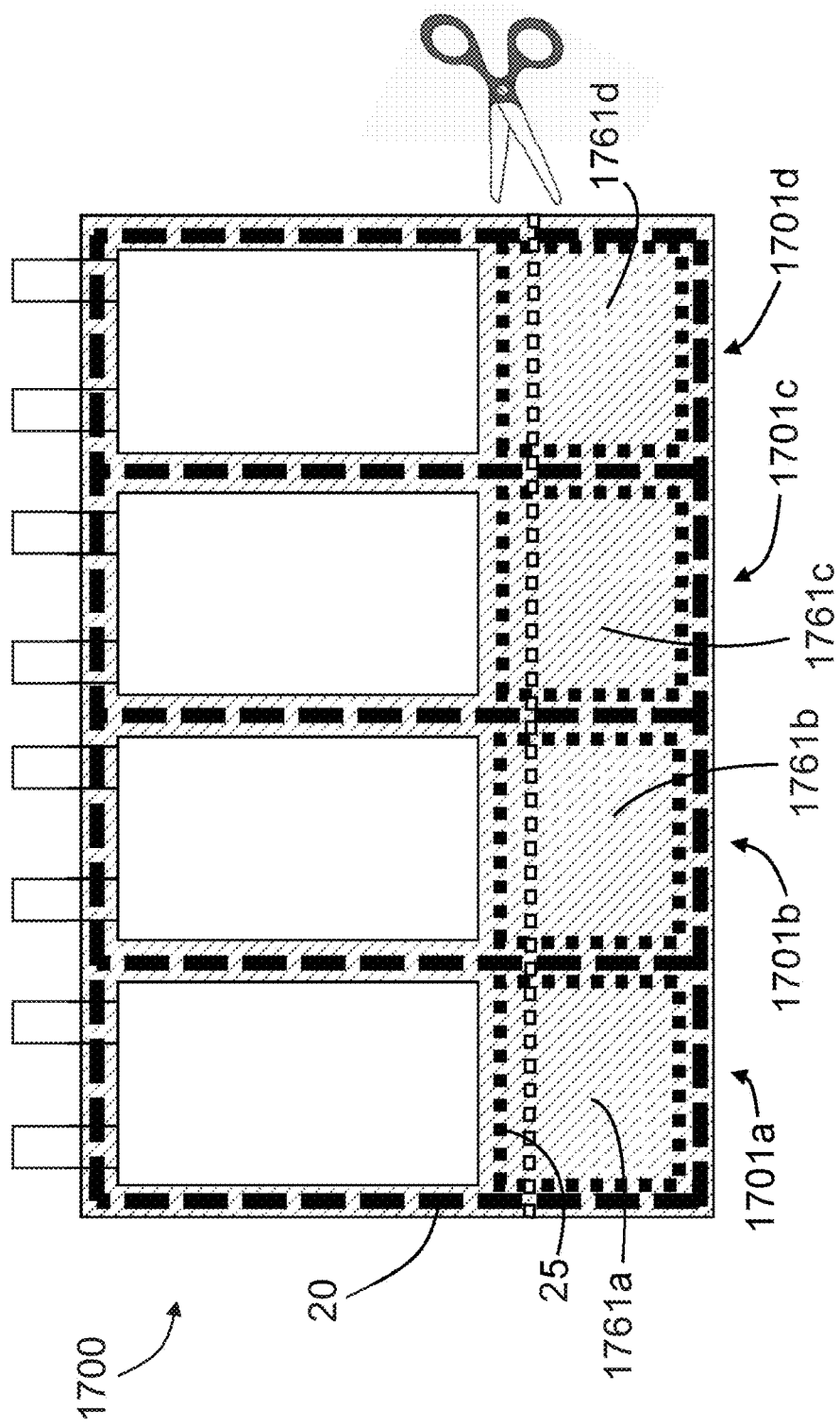

FIGS. 17A-17B shows pouch cells with extra portions to accommodate gas generation and resealing to illustrate exemplary methods of performing degassing steps during the manufacturing of single pouch battery cells, according to some embodiments. FIG. 17A shows a top view of a unit cell assembly 1700 including a plurality of unit cells 1701a, 1701b, 1701c, and 1701d, which are sealed in each respective pouch along the sealing line 20. Each unit cell 1701a to 1701d further includes a portion to accommodate gas generated in the formation of cells, also referred to herein as degassing portion 1761a to 1761d, respectively. The degassing portions 1761a to 1761d extend from the electrode portions of the unit cells and include empty pouch space. Gases generated during degassing steps can be contained in these degassing portions 1761a to 1761d. After the completion of the degassing steps, the degassing portions 1761a to 1761d can be cut open along the white dotted line shown in FIG. 17B so as to release the contained gases and removed from the unit cell assembly 1700. The degassed unit cell assembly 1700 can then be resealed along a new sealing line 25 so as to form a resealed unit cell assembly for further processing (e.g., unit cell stacking as shown in FIG. 15A-15B). In some embodiments, degassing steps also can be done after the stacking of the unit cells by sealing a couple of stacked pouch material at once. This approach can make production more effective.

In some embodiments, the unit cell assembly 1700 including degassing portions in each unit cell can be prepared by substantially similar methods described above in relation to FIG. 12, except that pouch films of larger size are used here. More specifically, the area on both sides of the middle line 10 in FIG. 12 can be extended so as to allow the formation of the degassing portions when the electrode assembly is folded along the middle line 10.

In some embodiments, the cathode assembly and the anode assembly can be prepared on separate pouch films, with extra films at the bottom of teach assembly. Then the two assemblies can be stacked together and sealed along the dashed line 20 as shown in FIG. 17A so as to form the unit cell assembly 1700.

Figure 18:
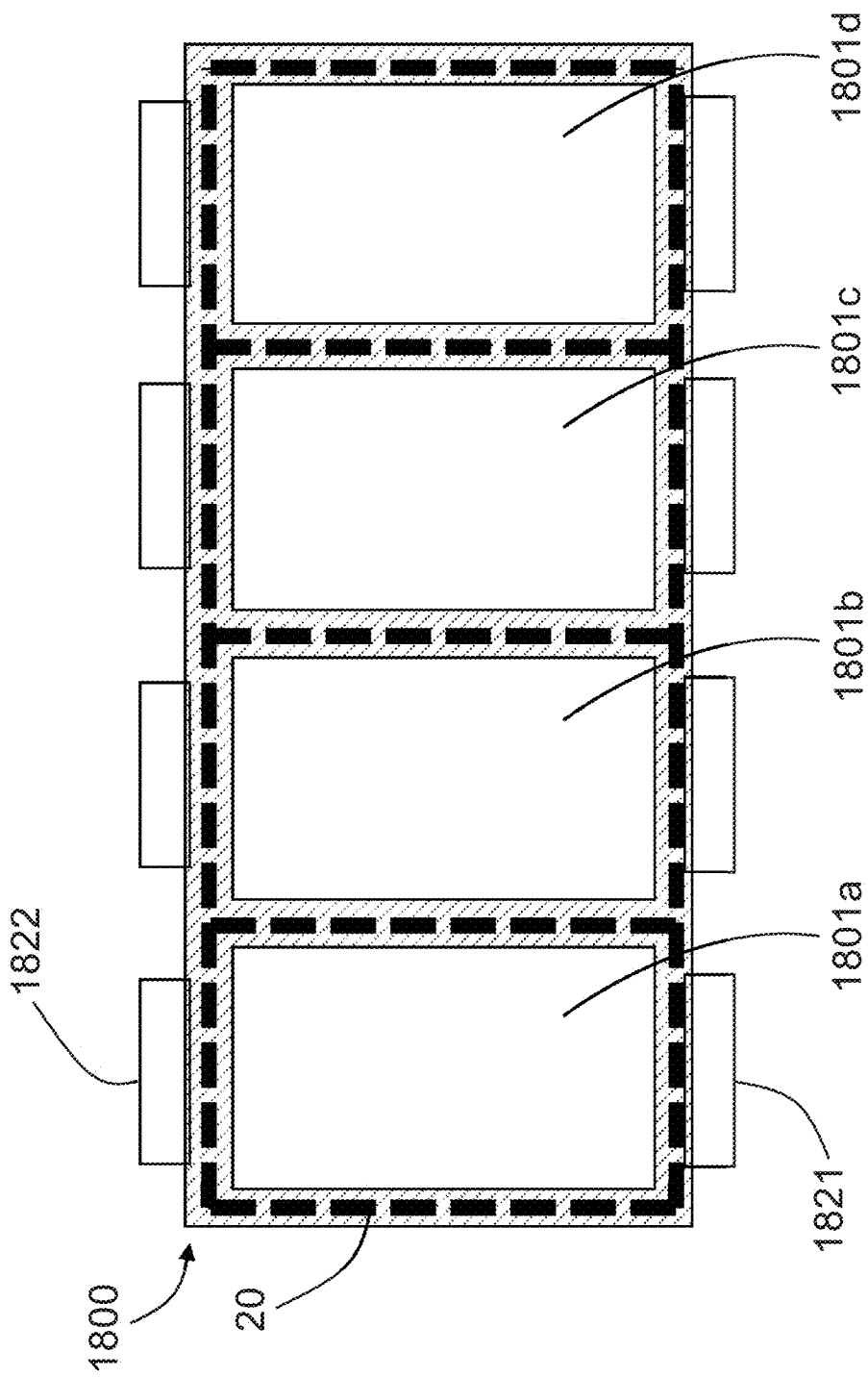
FIG. 18 shows an exemplary tab configuration for single pouch battery cells, according to some embodiments.

FIG. 10A to FIG. 17B illustrate methods to prepare unit cell assemblies which have both anode tabs and cathode tabs on the same side of the resulting unit cell assemblies. In some embodiments, as shown in FIG. 18, the anode tabs 1821 and the cathode tabs 1822 are on opposite sides of the unit cell assembly 1800. In this example, the anode tabs 1821 and the cathodes tabs 1822 of the unit cells 1801a to 1801d can take advantage of a larger available width of the current collectors, i.e., the tabs can be wider. The larger width of the tabs may reduce the electrical resistance of the tabs, thereby improving the performance of the resulting battery. In larger width may also improve the mechanical and electrical stability of the resulting battery since it is more difficult for a tab of a larger width to be corroded, fatigued, or otherwise compromised due to physical and/or chemical reasons.

The unit cell assembly 1800 can be prepared by stacking an anode assembly (e.g., 1000 shown in FIG. 10A, with widened tabs) over a cathode assembly (e.g., 1100 shown in FIG. 11A, with widened tabs) that is upside down so as to configure the cathode tabs and anode tabs on opposite sides of the resulting unit cell assembly. The resulting unit cell assembly 1800 can then be sealed along the sealing lines 20 to form individually packaged single pouch battery cells.

Figure 19A:
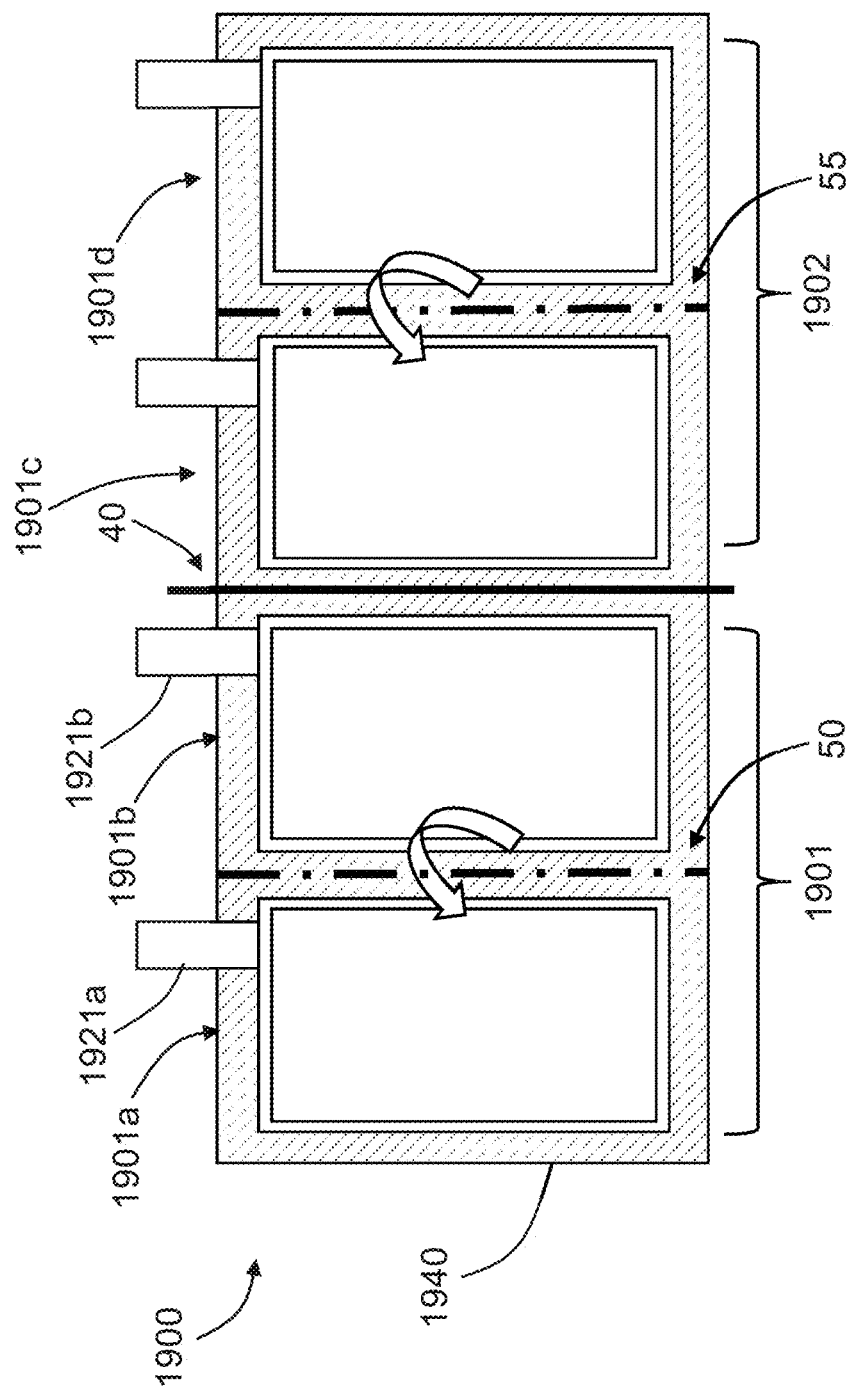
FIGS. 19A-19B show an exemplary manufacturing method for preparing single pouch battery cells, according to some embodiments.
Figure 19B:
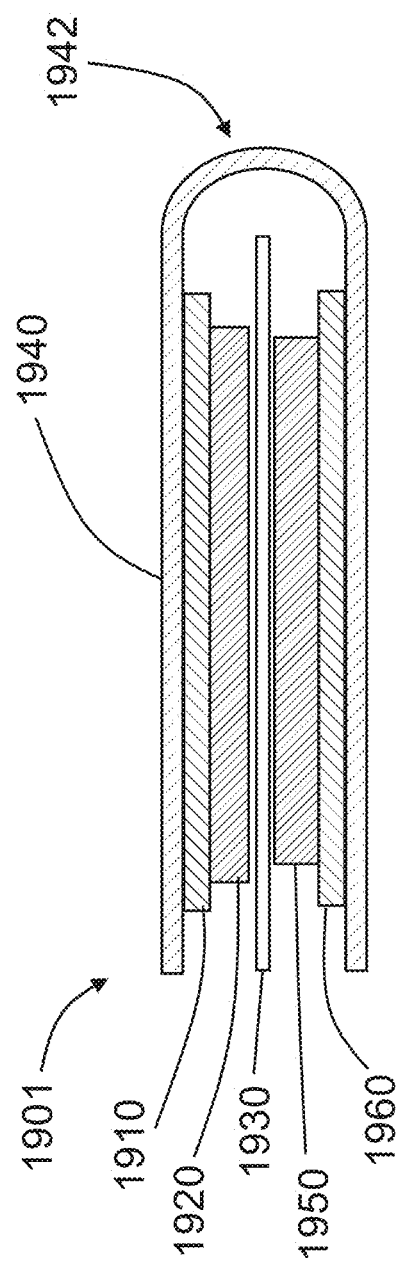

FIGS. 19A-19B show an exemplary manufacturing method for preparing single pouch battery cells, in which electrode assemblies include both anodes and cathodes in the same row. For illustrating purposes only, FIG. 19A shows an electrode assembly 1900 including two anodes (1901a and 1901c) and two cathodes (1901b and 1901d) that are disposed on a same pouch film 1940 and are arrayed in an alternating manner in a same sequence. The first anode 1901a and the first cathode 1901b form a first unit cell 1901 when folded along a first dash-dot line 50. The second anode 1901c and the second cathode 1901d form a second unit cell 1902 when folded along a second dash-dot line 55. In some embodiments, the two unit cells 1901 and 1902 are further folded along the solid line 40 so as to form a simple unit cell stack. In some embodiments, the folding along the solid line 40 of the plurality of the unit cells 1901 and 1902 can be kept for a prolonged period of time by application of heat or any other suitable methods to prevent from losing its fold. In some embodiments, the two unit cells 1901 and 1902 are cut along the solid line so as to form two individual and independent unit cells for further processing (e.g., stacking, sealing, etc.).

FIG. 19B shows a cross sectional view of the folded region in the first unit cell 1901, which includes a pouch film 1904 that substantially contain, from three directions (bottom, top, and right side), a cathode material 1902 disposed on a cathode current collector 1910, an anode material 1950 disposed on an anode current collector 1960, and a separator 1930 disposed between the anode material 1950 and the cathode material 1920. In some embodiments, longer pouch films can be used in a connecting portion 1942 of the pouch film 1940 so as to form a degassing portion.

Figure 19C:
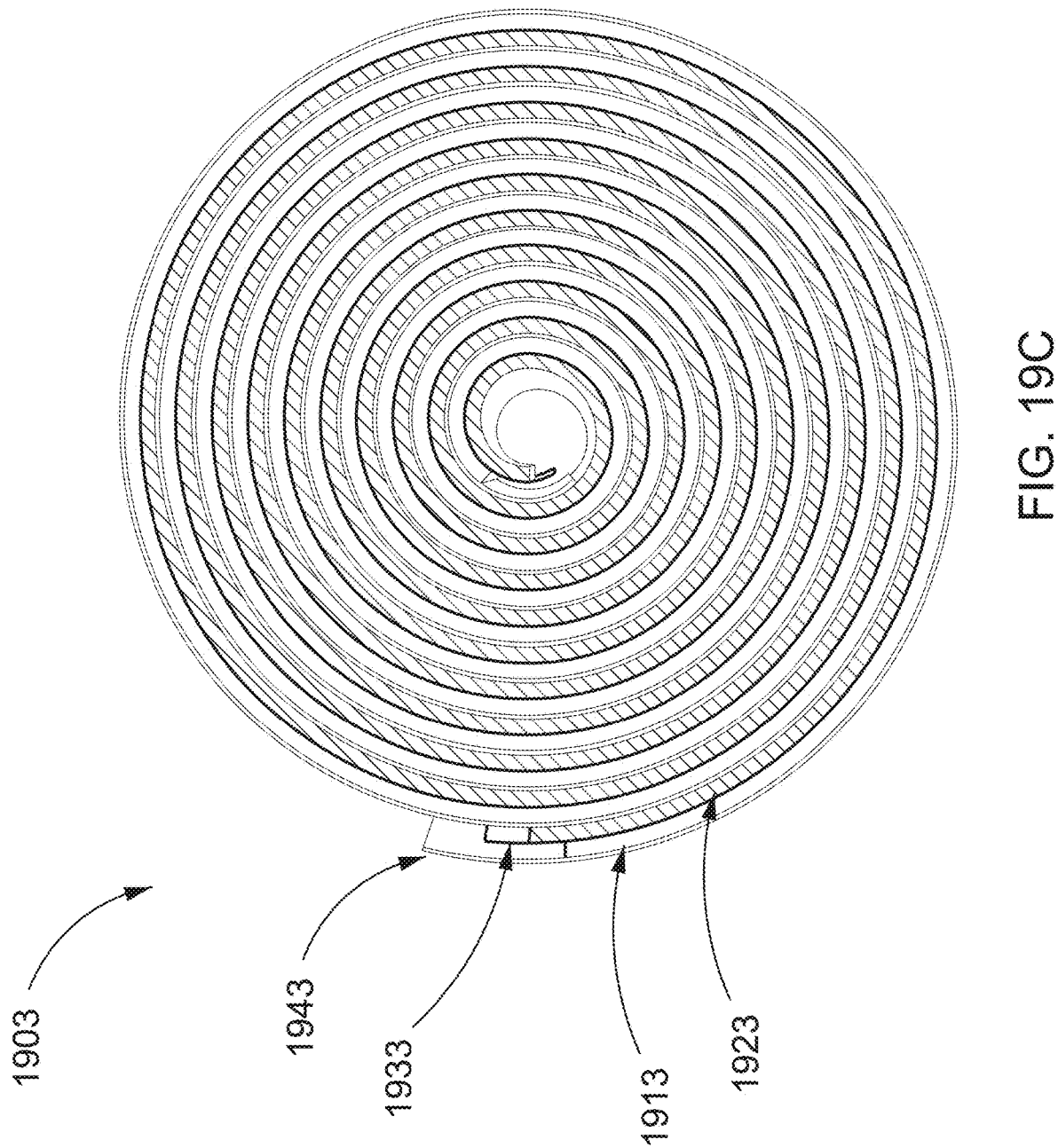
FIGS. 19C-19D show an exemplary manufacturing method for preparing battery cells in cylindrical configurations, according to some embodiments.
Figure 19D:
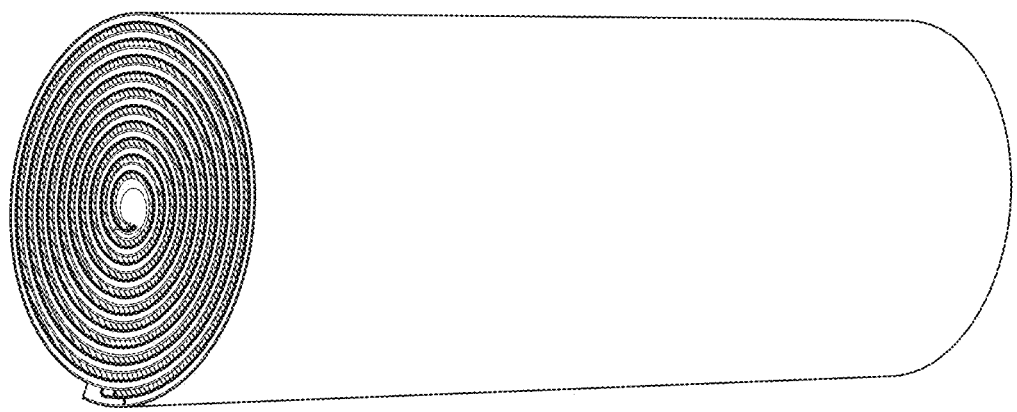

FIGS. 19C-19D show an exemplary manufacturing method for preparing battery cells in cylindrical configurations, according to some embodiments. FIG. 19C shows a top view of a cylindrical battery cell 1903 including multiple electrode stacks. Each electrode stack further includes a cathode 1913, an anode 1923, a separator 1933 disposed between the cathode 1913 and the anode 1923. Adjacent electrode stacks are separated by a pouch layer 1943. FIG. 19D shows a schematic view of the cylindrical battery cell 1903.

Figure 19E:
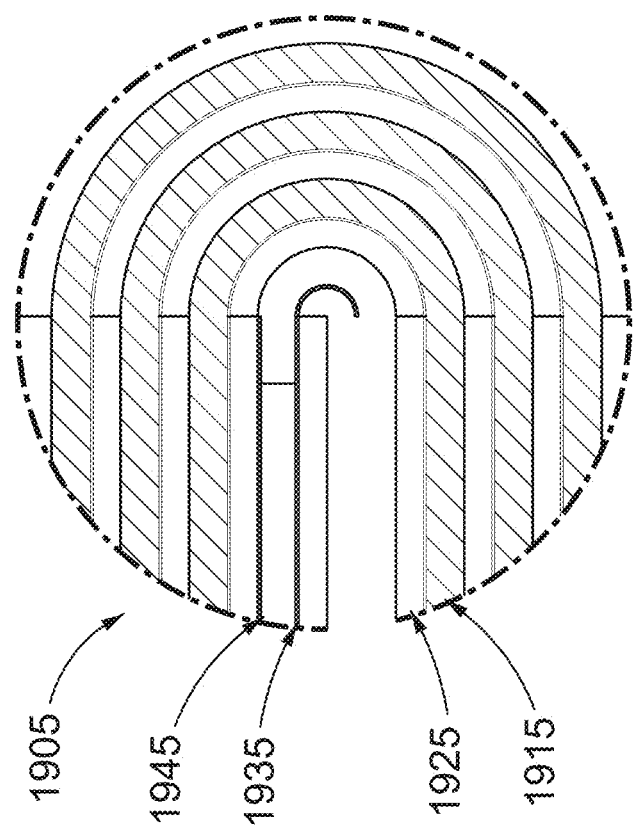
FIGS. 19E-19G show an exemplary manufacturing method for preparing battery cells in prismatic configurations, according to some embodiments.
Figure 19F:
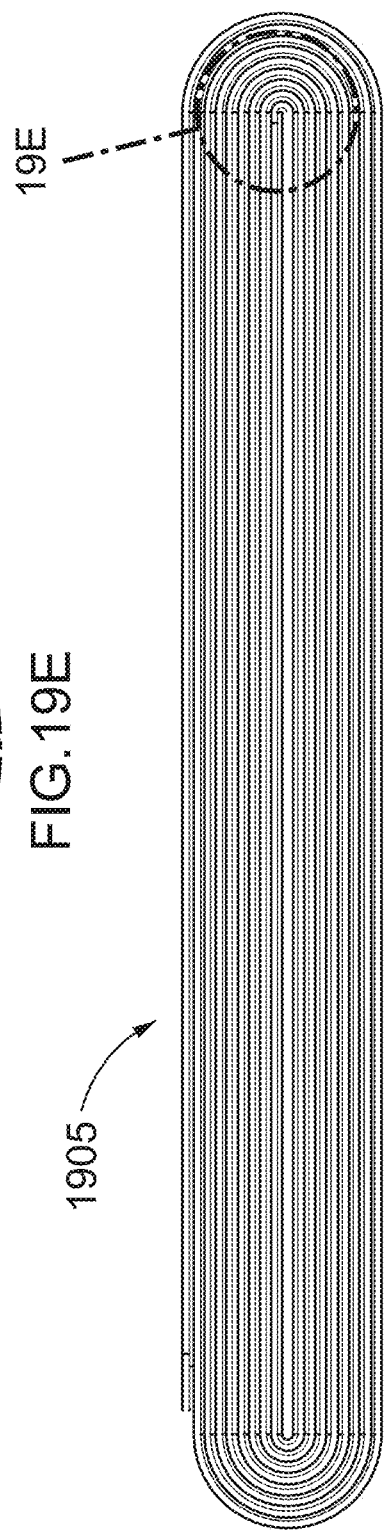
Figure 19G:
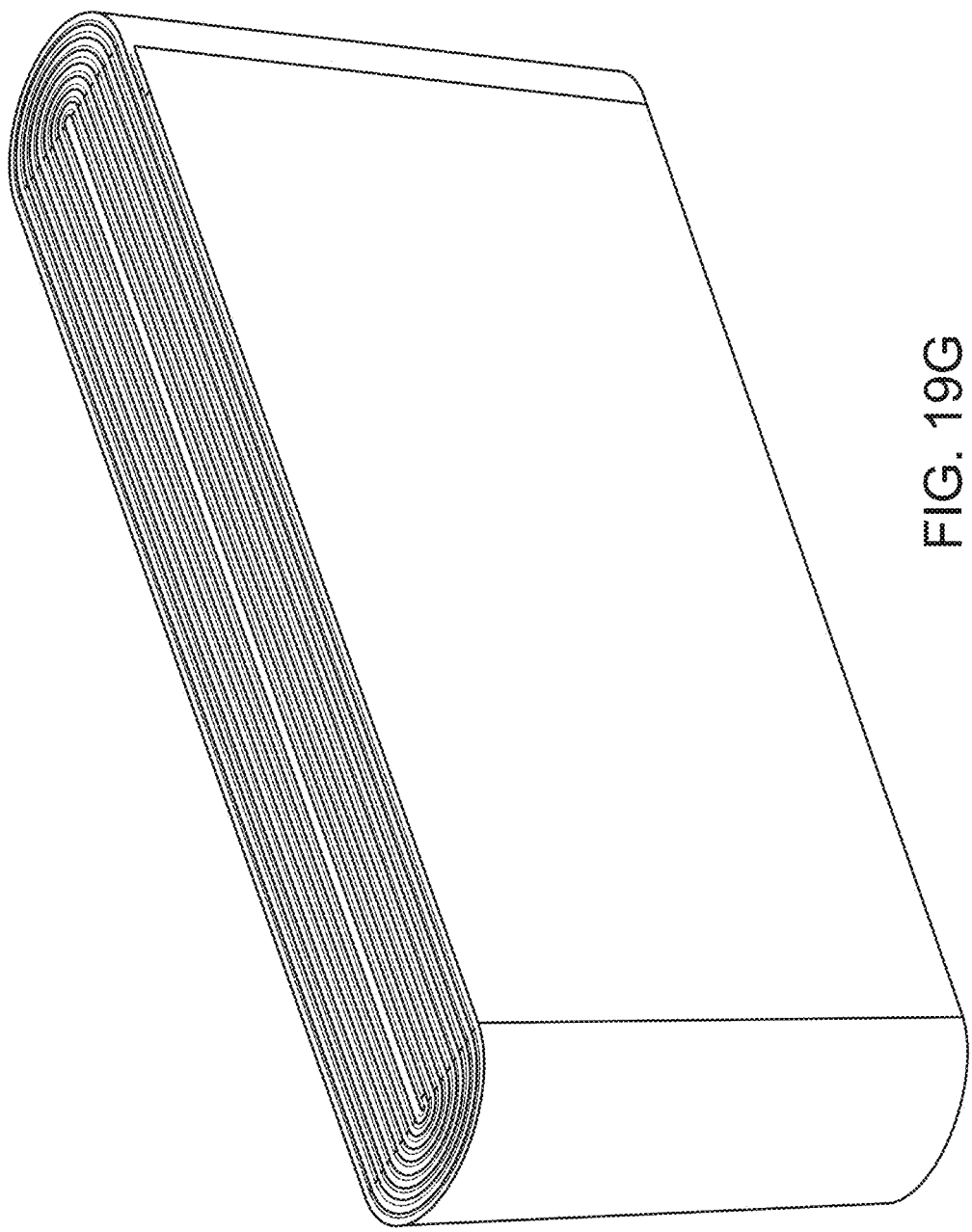

FIGS. 19E-19G show an exemplary manufacturing method for preparing battery cells in prismatic configurations, according to some embodiments. FIG. 19E shows a partial top view of a prismatic battery cell 1905 illustrating detailed structures in the portion circled in FIG. 19F, which shows a complete top view of the prismatic battery cell 1095. The prismatic battery cell 1905 includes multiple electrode stacks, each of which further includes a cathode 1915, an anode 1925, a separator 1935 disposed between the cathode 1915 and the anode 1925. Adjacent electrode stacks are separated by a pouch layer 1945. FIG. 19G shows a schematic view of the prismatic battery cell 1905.

Both the cylindrical battery cell 1903 and the prismatic battery cell 1905 can be prepared by methods set forth below. In some embodiments, the cathode (1913 or 1915) and the anode (1923 or 1925) can be prepared separately. For example, the cathode can be prepared by disposing a cathode material on a cathode current collector, and the anode can be prepared by disposing an anode material on an anode current collector. A separator then can be disposed on either the anode material or the cathode material. The prepared cathode and the anode can then be stacked together to form an electrode stack, followed by disposing a pouch layer on one side of the electrode stack (either anode side or the cathode side). Then the electrode stack together with the pouch layer can be rolled into a cylindrical battery cell or a prismatic battery cell. In some embodiments, the pouch layer can be disposed on one of the electrodes before the two electrodes are stacked together so as to facilitate the preparation of the electrode.

In some embodiments, the electrode stack (including the pouch layer) can be prepared in a layer-by-layer manner. For example, the manufacturing can start from disposing an anode current collector on a pouch layer, followed by disposing an anode material on the anode current collector. A separator can then be disposed on the anode material, on which a cathode material is disposed, followed by the cathode current collector. After this layer-wise procedure, the resulting electrode stack can then be rolled into a battery cell in either a cylindrical configuration or a prismatic configuration. In some embodiments, the pouch layer can be disposed after the formation of the electrode stack.

In some embodiments, before rolling the electrode stack into a battery cell, a slitting step can be performed so as to achieve desired form factors for the resulting battery cell after rolling.

In some embodiments, the battery cells shown in FIGS. 19C-19F can be further sealed into an external pouch or package. The external pouch or package can be used for mitigating corrosion induced by, for example, moisture or chemicals from surrounding environment.

Although FIGS. 19C-19F show only one pouch layer in an individual battery cell 1903 or 1905, in practice more than one pouch layers may be used. In some embodiments, two pouch layers can be used. One pouch layer can be disposed on the anode current collector and the other pouch layer can be disposed on the cathode current collector so as to facilitate the preparation of the electrodes (e.g., avoiding spill-over or deformation of the electrode material).

Figure 20:
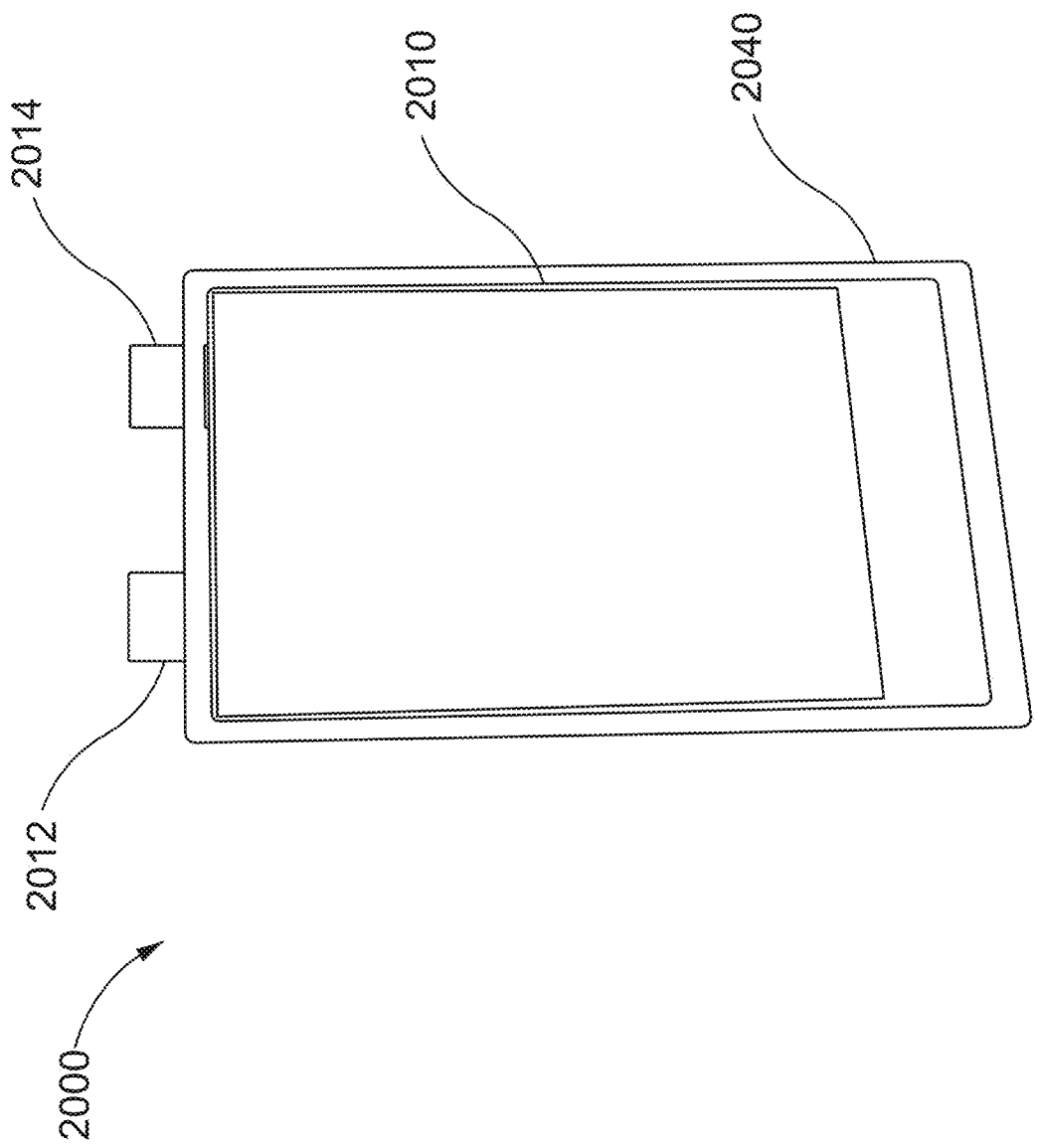
FIG. 20 is an illustration of a single pouch battery cell, according to some embodiments.

FIG. 20 is an illustration of a single pouch battery cell manufactured according to the methods described above. The battery cell 2000 includes a pouch 2040 that contains an anode 2010, a cathode, and a separator. The cathode and the separator are behind the anode 2010 and are not labelled.

The battery cell also includes an anode tab 2010 made of copper and a cathode tab 2014 made of aluminum. As can be seen in FIG. 20, the pouch 2040 substantially contains the electrode portions whereas the tabs 2012 and 2014 are extending out of the pouch for external connections.

Figure 21:
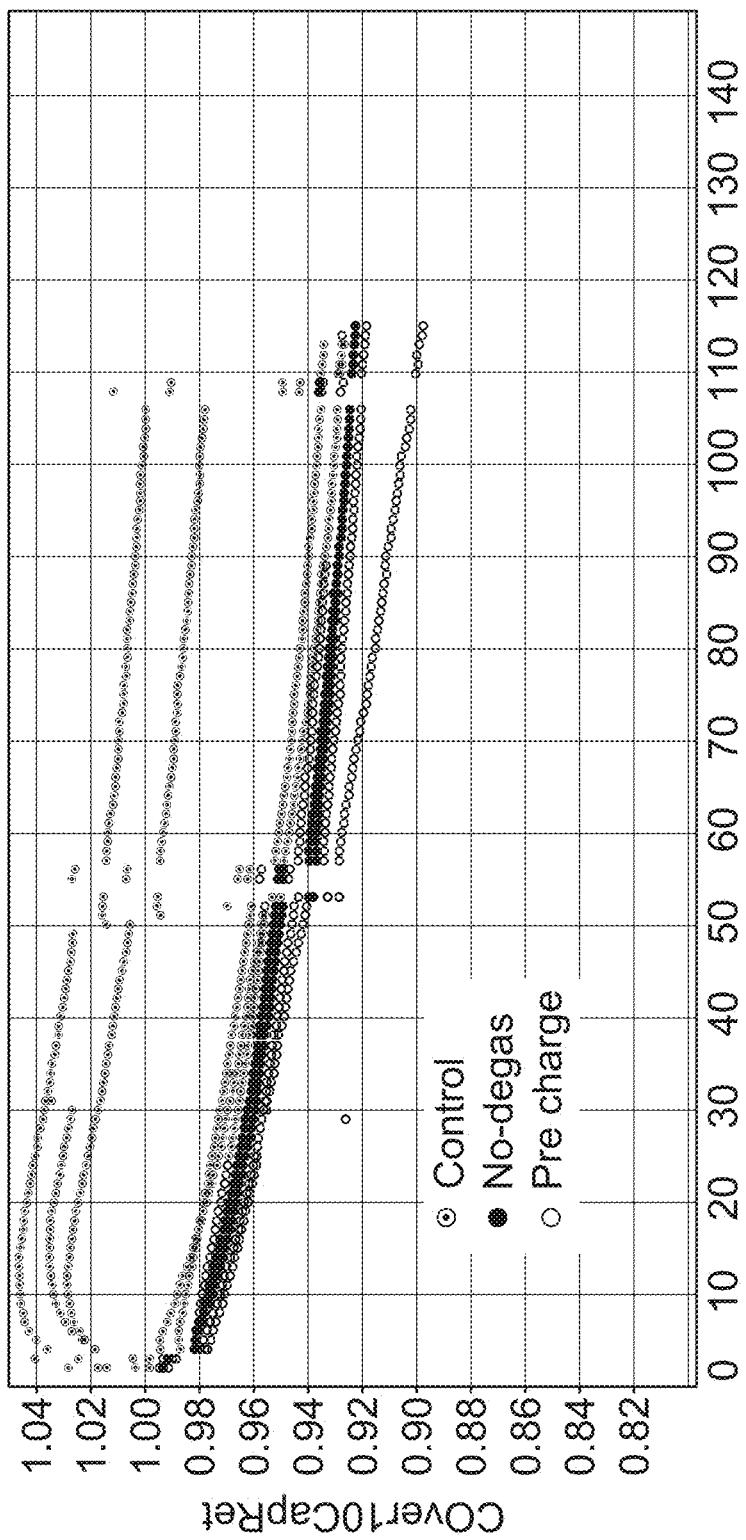
FIG. 21 shows capacity retention curves of battery cells manufactured using the methods described above.

FIG. 21 shows capacity retention curves of three groups of single pouch battery cells. The first group, also referred to as the control group, include single pouch battery cells that have been subject to a degassing step before testing the capacity retention. The second group, also referred to as the "no-degas" group, includes single pouch battery cells without any degassing performed before testing. Single pouch battery cells in the third group, also referred to as "pre-charge" group, are subject to a pre-charge step before the sealing of the pouch. The pre-charge is performed with C/10 rate for about 1 hour. No degassing step is performed for batteries in the third group.

Battery cells in all through groups have cathode slurry comprising 50% by volume of lithium iron phosphate (LFP) and 0.936% by volume of carbon additive, which are mixed in a speed mixer. In some embodiments, the protocol for mixing the cathode slurry includes two repeats of 3 minutes mixing at 650 RPM, followed by 1 minute of mixing at 1250 RPM. The anode used in the battery cells include 50% by volume of graphite powder and 2% by volume of carbon additive, which are also mixed in a mixer. In some embodiments, the protocol for mixing the anode slurry includes 6 minutes of mixing at 650 RPM. The anode has a thickness of about 265 µm. The electrolyte used in these battery cells include a solvent of 50/50 ethylene carbonate (EC)/γ-butyrolactone (GBL), 1M LiTFSI dissolved in the solvent. The electrolyte further includes additives such as 2% of vinylene carbonate (VC). The total thickness of the battery cells is about 900 µm.

As seen in FIG. 21, battery cells in the pre-charge group show substantially the same capacity retention compared to battery cells in the control group. In addition, battery cells in the no-degas group show an increased capacity for the first 15-20 cycles, indicating that full capacity of the battery cells in the no-degas group may not be obtained during those cycles. The comparison of capacity retention shows that a pre-charge process can be performed for single pouch cells to eliminate the need of degassing steps and to further eliminate the reseal step in conventional battery manufacturing.

Figure 22:
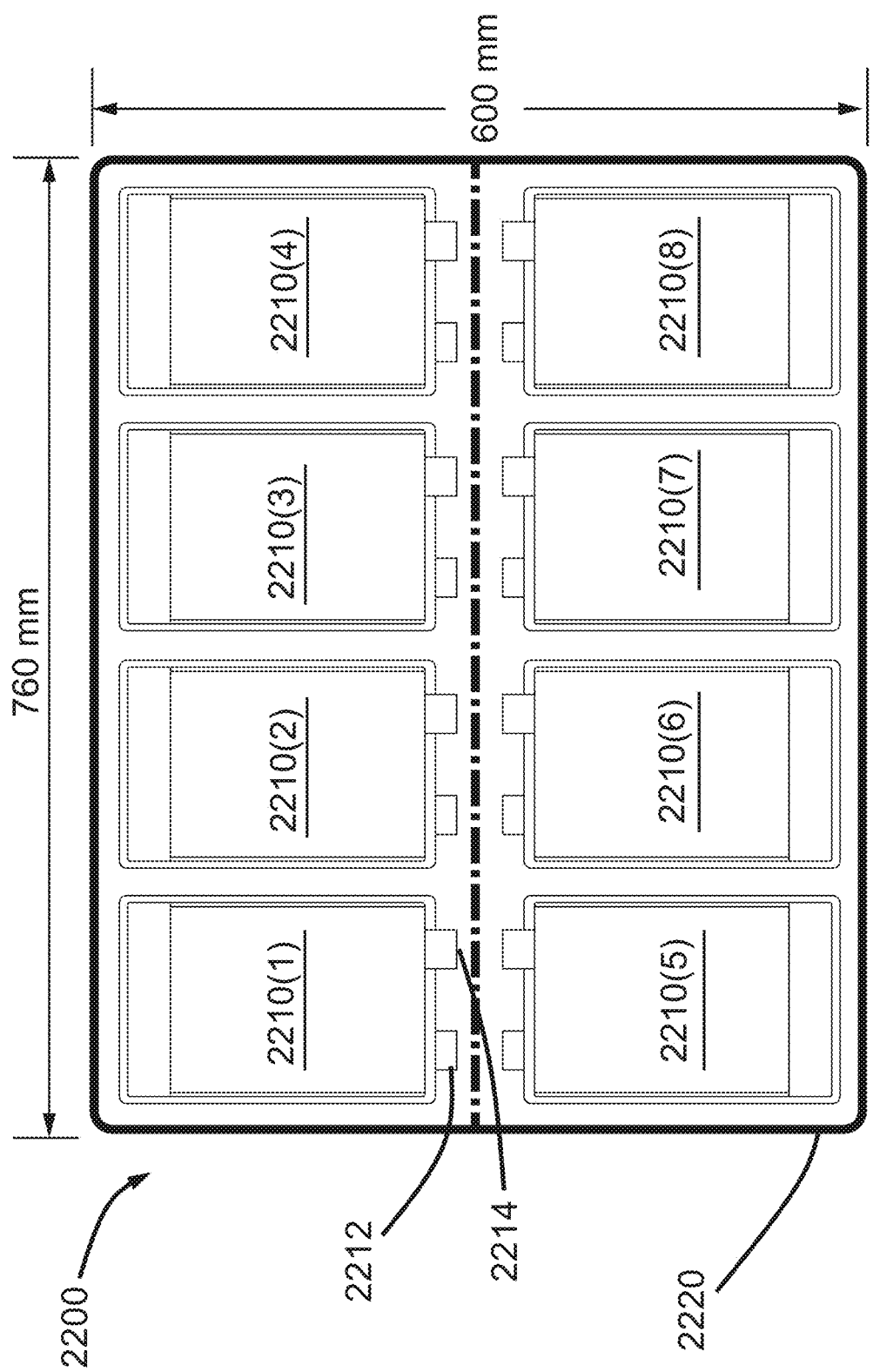
FIG. 22 is a schematic view of a battery module including an array of single pouch battery cells, according to some embodiments.

Exemplary Battery Modules and Battery Packs Including Single Pouch Battery Cells FIG. 22 shows a top view of a battery module 2200 including an array of single pouch battery cells 2210(1) to 2210(8) (collectively referred to as battery cell 2210), which is enclosed in a case 2220. Each battery cell 2210 includes an anode tab 2212 and a cathode tab 2214, which can be used to couple the battery cell to other battery cells. The battery module 2200 shown in FIG. 22 includes 8 single pouch battery cells for illustrative purposes only. In practice, the number of single pouch battery cells in a battery module can be more than 8 or less than 8, depending on, for example, desired battery specifications.

Moreover, the plurality of battery cells 2210 is disposed in a two-dimensional array also for illustrative purposes only. In some embodiments, the plurality of battery cells 2210 is disposed in a sequence (i.e., one-dimensional array). In some embodiments, the plurality of battery cells 2210 is disposed radially toward a common center point such that the battery module 2200 can have a cylinder configuration.

Furthermore, FIG. 22 shows only one-layer of battery module for illustrative purposes only. In practice, one or more battery modules like the battery module 2200 can be coupled together to achieve desired output specification such as capacity, voltage, or current.

FIGS. 23A-23B show an exploded view and a collapsed view, respectively, of a battery module including a plurality of single pouch battery modules enclosed in a metal case. As shown in FIG. 23A, the battery module 2300 includes a top cover 2310, a top foam 2320, a cell stack 2330, and an integrated case 2340 to contain the cell stack.

The cell stack 2330 further includes an anode tab 2334 and a cathode tab 2332. The anode tab 2334 is in electrical communication with each anode of the battery cells in the cell stack 2330, and the cathode tab 2332 is in electrical communication with each cathode of the battery cells in the cell stack 2330. The integrated case 2340 further includes an anode connector 2344 and a cathode connector 2342. When the cell stack 2330 is properly placed in the integrated case 2340, the anode tab 2334 is electrically coupled to the anode connector 2344, and the cathode tab 2332 is electrically coupled to the cathode connector 2342, such that the battery module 2300 can either provide power (during discharging) or receive power (during charging) through the anode connector 2344 and cathode connector 2342.

In some embodiments, the top cover 2310 includes the same metal material (e.g., stainless steel, aluminum, copper, etc.) as used in the integrated case 2340. In some embodiments, the top cover 2310 includes a light material (e.g., polymer, plastic, light metal, etc.) so as to facilitate easy removal and reinstallation of the top cover 2310.

In some embodiments, the top foam 2320 is soft (e.g., a cushion foam) so as to reduce potential damage to the cell stack 2330 upon impact. In some embodiments, the top foam 2320 includes fire retardant foam such as synthetic foams, aqueous film forming foams, alcohol-resistant foams, and protein foams, among others.

FIGS. 24A-24B show an exploded view and a collapsed view, respectively, of a battery module including a plurality of single pouch battery modules enclosed in a plastic case. As shown in FIG. 24A, the battery module 2400 includes a top cover 2410, a top foam 2420, a cell stack 2430, an inner liner 2450, and an integrated case 2440 to contain the cell stack. The top cover 2410, the top foam 2420, and the cell stack 2430 can be substantially the same as the top cover 2310, the top foam 2320, and the cell stack 2330 shown in FIG. 23A and described above. The integrated case 2440 includes a plastic material so as to, for example, reduce the weight of the battery module 2400.

In some embodiments, the inner liner 2450 includes a soft material (e.g., plastic, polymer, rubber, etc.) so as to reduce potential damage to the cell stack 2430 upon impact. In some embodiments, the inner liner 2450 includes a fire-retardant material to reduce fire hazard. In some embodiments, the inner liner 2450 includes an anti-static material such as materials based on long-chain aliphatic amines (optionally ethoxylated) and amides, quaternary ammonium salts (e.g., behentrimonium chloride or cocamidopropyl betaine), esters of phosphoric acid, polyethylene glycol esters, or polyols. In some embodiments, the inner line 2450 includes an anti-moisture material so as to prevent short circuit in the cell stack 2430 induced by moistures. In some embodiments, the inner liner 2450 includes a composite material. For example, the inner line 2450 can include a soft material for cushioning purposes coated with a fire-retardant material to reduce fire hazard.

The battery modules 2300 shown in FIGS. 23A-23B and the battery modules 2400 shown in FIGS. 24A-24B, generally referred to as battery modules, can have several features that can facilitate practical applications. In some embodiments, the battery modules can allow module-to-module interlocking so as to allow convenience construction of battery packs with certain desired specification (e.g., voltage, current, capacity, etc.). In some embodiments, the battery modules include a modular design such that each battery module can either function independently as a power supply or cooperate with other components in a specific application.

In some embodiments, the battery modules can have the following specifications: output voltage at 3.2 V, cell capacity of 280 Ah, cell weight of 4.5 kg, total energy of 0.896 kWh, cell volume of 4.14 L, volumetric energy density of 216 Wh/L, and specific energy density of 200 Wh/kg. This specification is for illustrative purposes only. In practice, different specifications can be employed to satisfy different practical requirements in applications.

Figure 25:
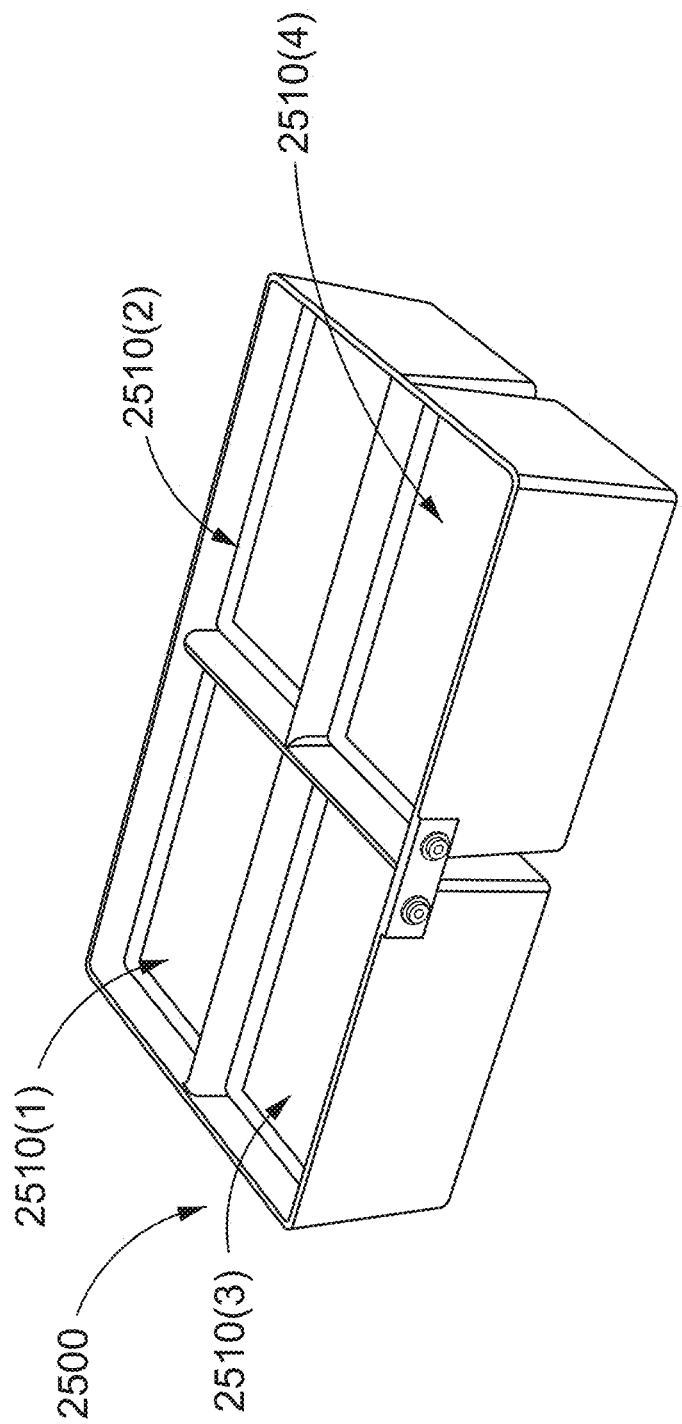
FIG. 25 shows a battery pack including a two-dimensional array of battery modules, according to some embodiments.
Figure 26:
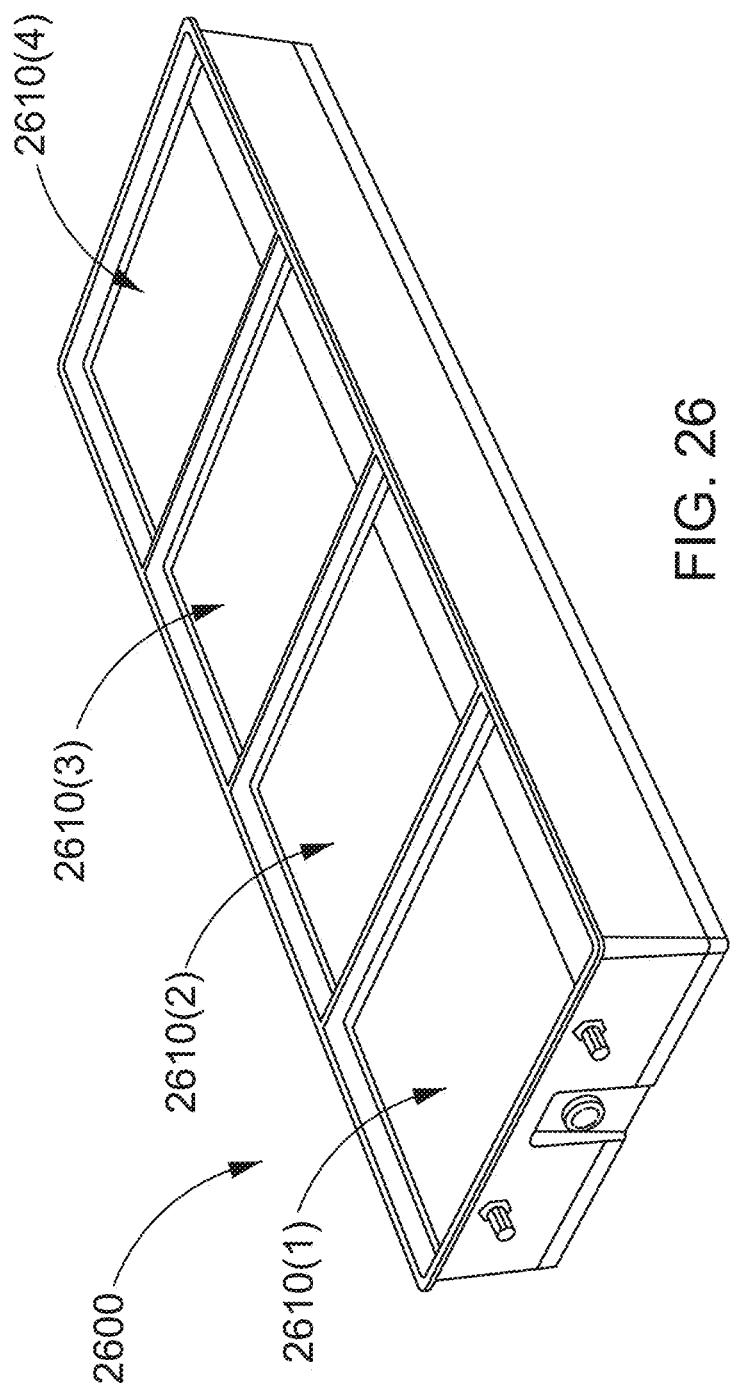
FIG. 26 shows a battery pack including a one-dimensional array of battery modules, according to some embodiments.

FIG. 25 shows a schematic view of a battery pack 2500 including a plurality of battery modules 2510(1) to 2510(4), collectively referred to as battery module 2510. The battery module 2510 can be substantially the same as the battery module 2300 shown in FIGS. 23A-23B or the battery module 1400 shown in FIGS. 24A-24B. The battery pack 2500 shown in FIG. 25 includes four battery modules 2510 disposed in a two-dimensional array for illustrative purposes only. In practice, the number of battery modules within a battery pack can vary, depending on, for example, the desired specifications. The array configuration can also vary. For example, FIG. 26 shows a battery module 2600 including an array of four battery modules 2610(1) to 2610(4) disposed in a one-dimensional sequence so as to, for example, fit certain space requirement.

Figure 27A:
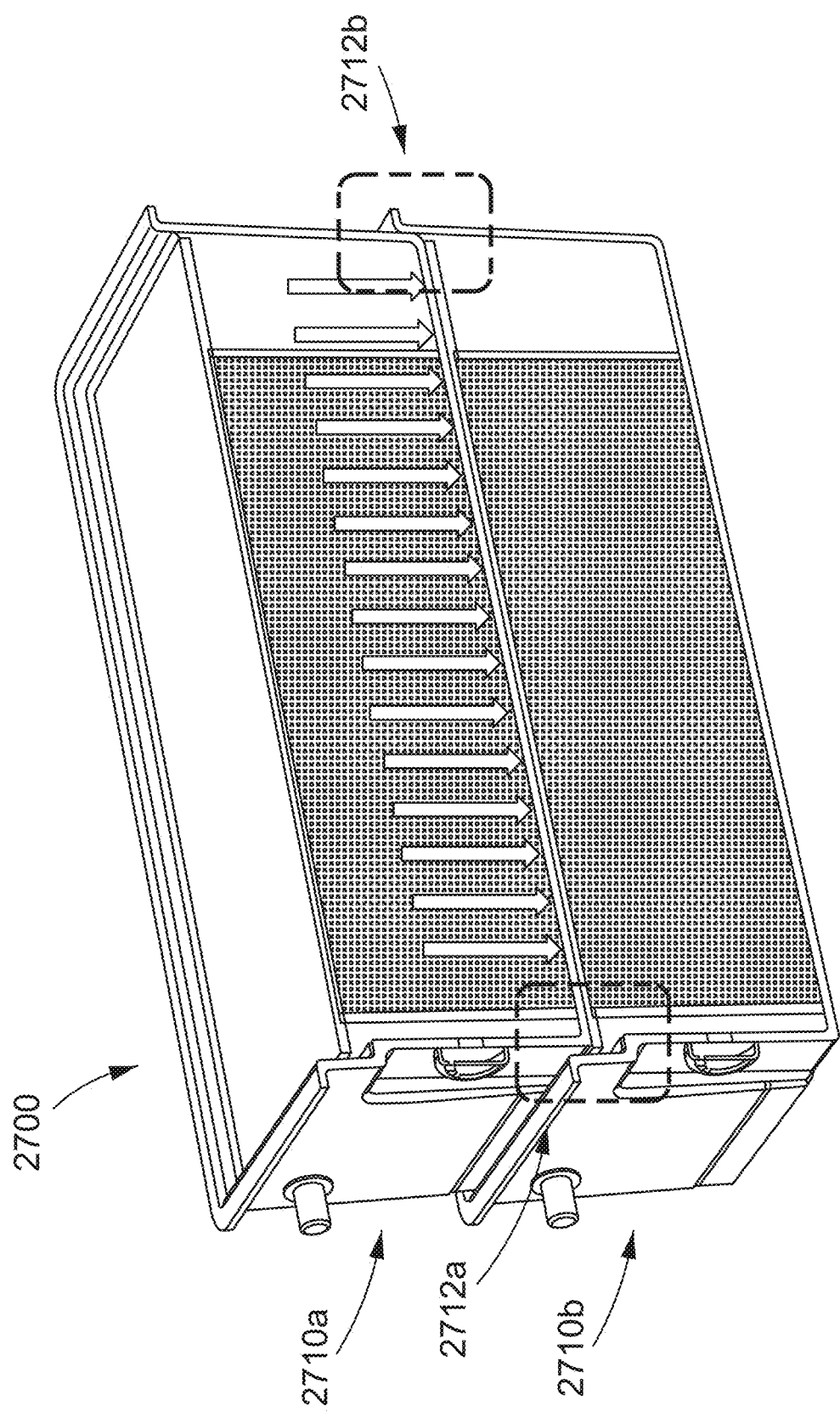
FIGS. 27A-27C show schematics of a battery pack illustrating stacking and interlocking features of battery modules, according to some embodiments.
Figure 27C:
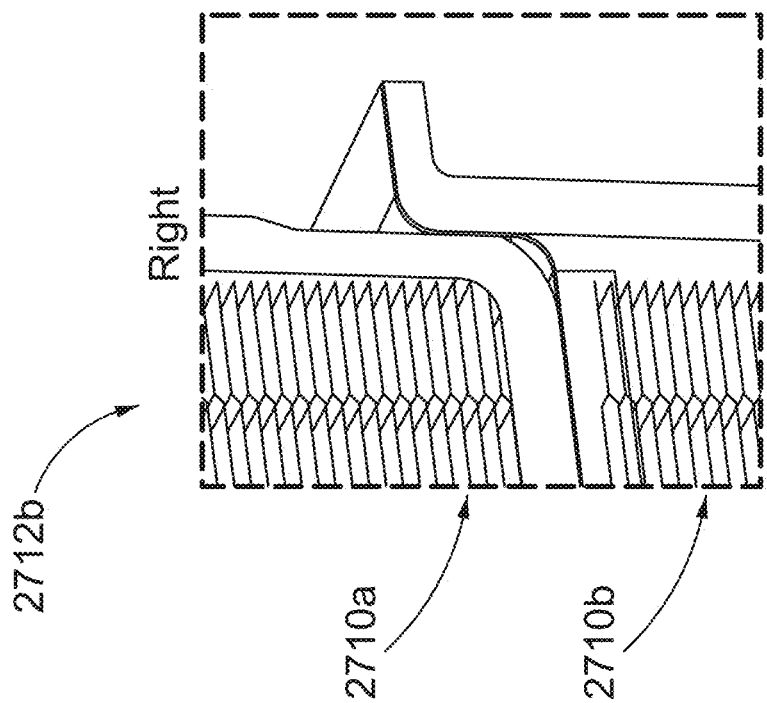
Figure 27B:
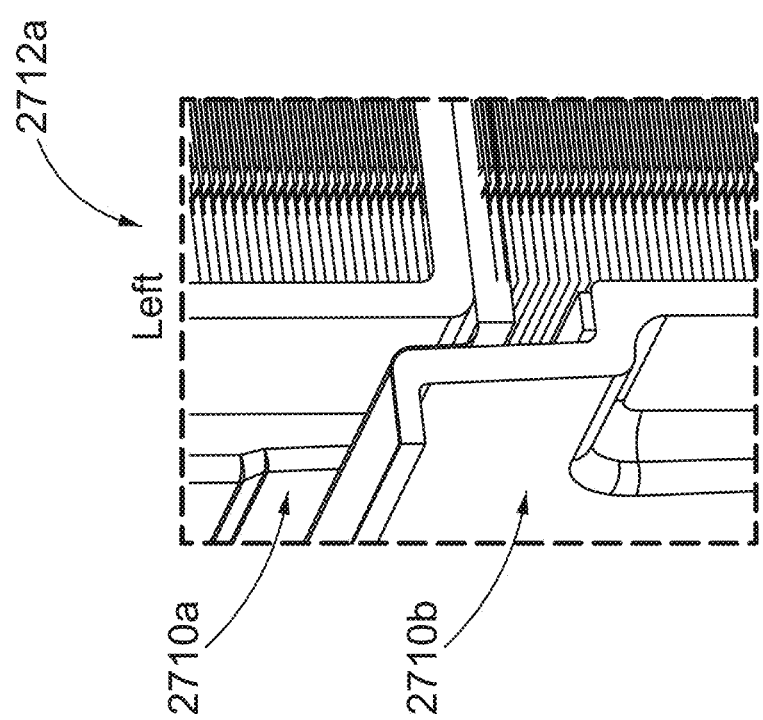

FIGS. 27A-27C show schematics of a battery pack including vertically stacked battery modules and magnified portion of the stacked module to illustrate interlocking features of the battery pack. The battery pack 2700 shown in FIG. 27A includes a first battery module 2710a and a second battery module 2710b, which are stacked vertically together. A stack pressure can be applied by the weight of the first battery module 2710a to the second battery module 2710b. In some embodiments, if 28 modules are stacked one after another, the pressure difference between the top battery module and the bottom battery module can be about 5 PSI.

The battery pack 2700 includes a left contact portion 2712a and a right contact portion 2712b between the two battery modules. The two contact portions 2712a and 2712b are shown in FIG. 27B and FIG. 27C, respectively. FIGS. 27B and 27C show that the top portion of the bottom battery module 2710b can be configured to receive the bottom portion of the top battery module 2710a. With this configuration, multiple battery modules can be conveniently coupled with each other and form a battery pack of desired specifications.

Figure 28A:
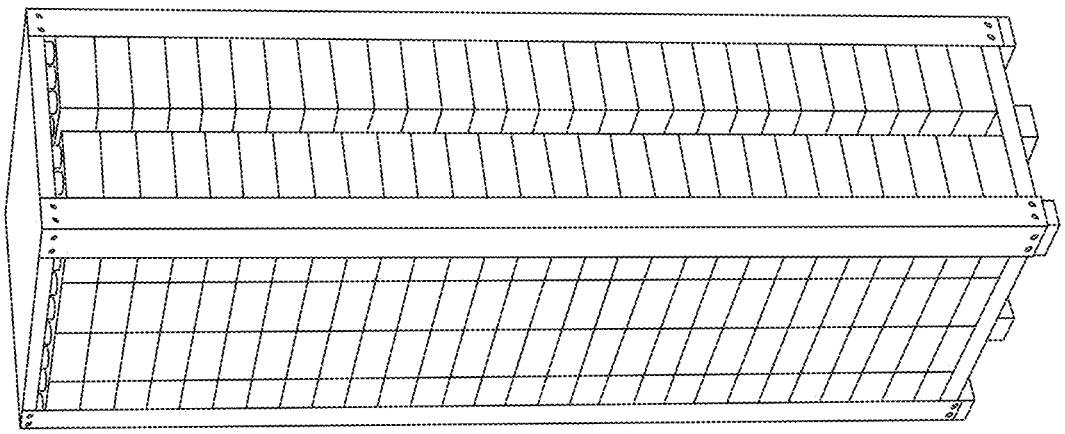
FIGS. 28A-28B are a collapsed view and an exploded view of a battery rack including a plurality of single pouch battery modules disposed in a rack configuration, according to some embodiments.
Figure 28B:
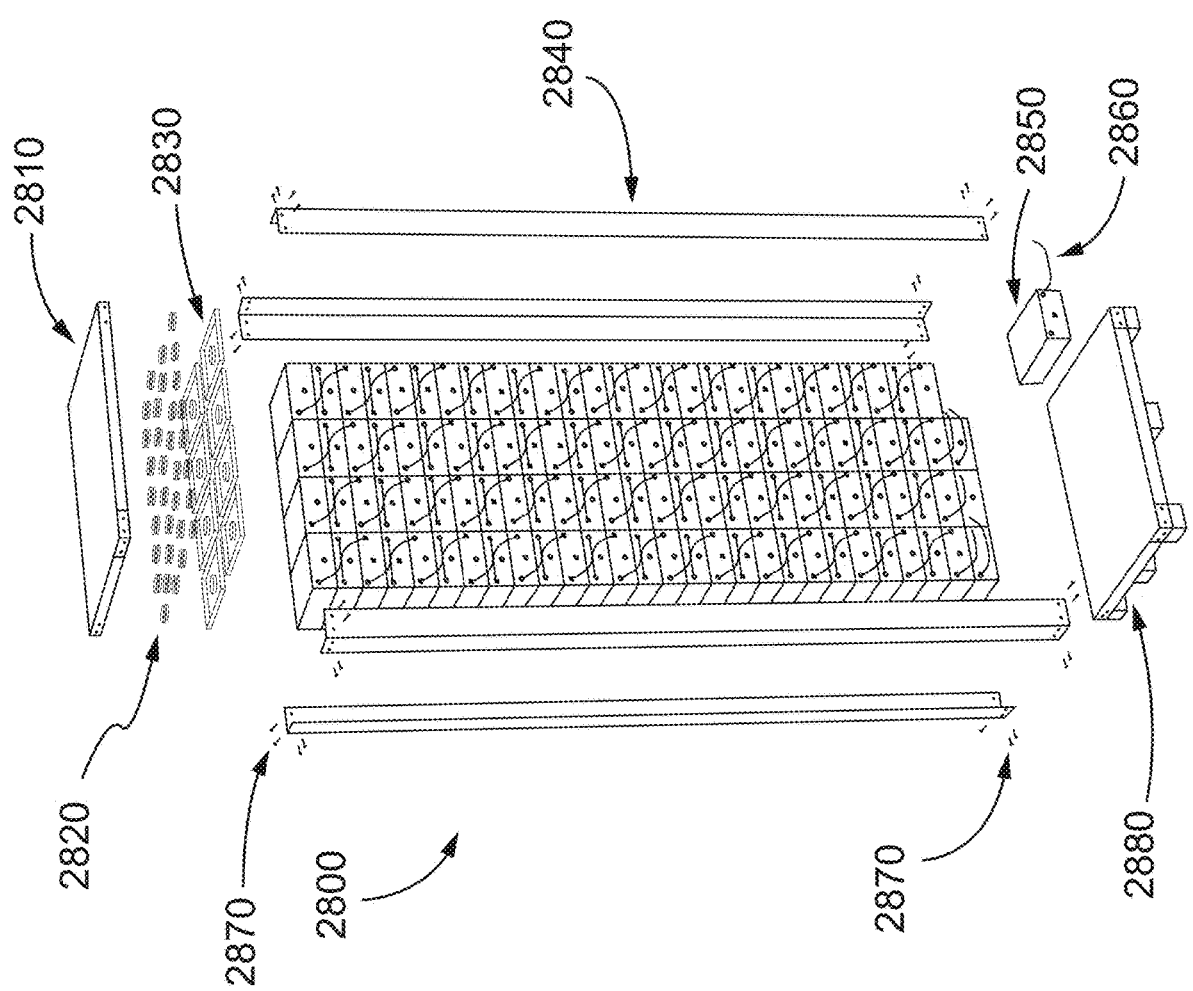

FIGS. 28A-28B show a collapsed view and an exploded view of a battery rack 2800 including a plurality of battery modules 2850 (e.g., the battery modules 2300 and/or 2400) disposed in a rack configuration (i.e., two-dimensional vertical array). A plurality of support frames 2840 is disposed on the four edges of the plurality of battery modules 2850 so as to hold the battery modules 2850 together. The support frames 2840 are mechanically coupled to the battery modules 2850 via a plurality of bolts 2870. A top end plate 2810 and a bottom end plate 2880 are enclosing the plurality of battery modules 2850 from the top and the bottom, respectively. A plurality of compression plates 2830 with a plurality of compression springs 2820 disposed thereon can be placed between the top end plate 2810 and the plurality of battery modules 2850 for impact cushioning. Each battery module includes a battery cable 2860 so as to facilitate electrical coupling of the battery module with other battery modules. A collapsed view of the resulting battery rack 2800 is shown in FIG. 28A.

One exemplary specification of the battery rack 2800 can be: output voltage at 716 V, cell capacity of 280 Ah, cell weight of 1150 kg, total energy of 200 kWh, rack dimension of 600 mm×760 mm×2100 mm, volumetric energy density of 210 Wh/L, and specific energy density of 175 Wh/kg. This specification is for illustrative purposes only. In practice, different specifications can be employed to satisfy different practical requirements in applications.

While various embodiments have been described above, it should be understood that they have been presented by way of example only, and not limitation. For example, while the embodiments herein describe electrochemical devices such as, for example, lithium ion batteries, the systems, methods and principles described herein are applicable to all devices containing electrochemically active media. Said another way, any electrodes and/or devices including at least an active material (source or sink of charge carriers), an electrically conducting additive, and an ionically conducting media (electrolyte) such as, for example, batteries, capacitors, electric double-layer capacitors (e.g., ultra-capacitors), lithium-ion capacitors (hybrid capacitors), pseudo-capacitors, etc., are within the scope of this disclosure. Furthermore, the embodiments can be used with non-aqueous and/or aqueous electrolyte battery chemistries.

Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. Additionally, certain steps may be partially completed and/or omitted before proceeding to subsequent steps.

While various embodiments have been particularly shown and described, various changes in form and details may be made. For example, although various embodiments have been described as having particular features and/or combinations of components, other embodiments are possible having any combination or sub-combination of any features and/or components from any of the embodiments described herein. The specific configurations of the various components can also be varied.

The invention claimed is:

1. An individual electrochemical cell, comprising:
a first current collector coupled to a first portion of a pouch, the first current collector having a first electrode material disposed thereon;
a second current collector coupled to a second portion of the pouch, the second current collector having a second electrode material disposed thereon; and
a separator disposed between the first electrode material and the second electrode material, the separator having a cross sectional area larger than a cross sectional area of the first electrode material and the second electrode material,
wherein the first portion of the pouch is coupled to the second portion of the pouch to form the individual electrochemical cell by forming a sealing region, the separator extending partway into the sealing region and sealed between the first portion and the second portion such that the sealing region extends beyond peripheral edges of the separator, and wherein at least one of the first electrode material and the second electrode material includes a mixture of a solid phase and a liquid phase, the solid phase including an active material and a conductive material and the liquid phase including a non-aqueous liquid electrolyte.

2. The electrochemical cell of claim 1, wherein the pouch is folded along a fold line between the first portion of the pouch and the second portion of the pouch such that the separator is disposed between the first electrode material and the second electrode material.

3. The electrochemical cell of claim 1, wherein at least one of the first electrode material and the second electrode material has a thickness in a range of about 250 μm to about 2,000 μm.

4. The electrochemical cell of claim 3, wherein at least one of the first electrode material and the second electrode material has a thickness in a range of about 250 μm to about 500 μm.

5. The electrochemical cell of claim 1, wherein at least one of the first current collector and the second current collector has a thickness less than about 20 μm.

6. The electrochemical cell of claim 5, wherein at least one of the first current collector and the second current collector has a thickness less than about 12 μm.

7. The electrochemical cell of claim 1, wherein at least one of the first current collector and the second current collector has a thickness less than about 5 μm.

8. The electrochemical cell of claim 1, wherein the electrochemical cell has an energy capacity of about 0.1 Ah to about 40 Ah.

9. An individual electrochemical cell, comprising:
a first electrode coupled to a first portion of a pouch;
a second electrode coupled to a second portion of the pouch; and
a separator disposed between the first electrode and the second electrode, the separator having a cross sectional area larger than a cross sectional area of the first electrode and the second electrode,
wherein the separator is sealed between the first portion and the second portion of the pouch to form a sealing region enclosing the individual electrochemical cell, the separator extending partway into the sealing region such that the sealing region extends beyond peripheral edges of the separator, and
wherein at least one of the first electrode and the second electrode includes a mixture of a solid phase and a liquid phase, the solid phase including an active material and a conductive material and the liquid phase including in a non-aqueous liquid electrolyte.

10. The electrochemical cell of claim 9, wherein the pouch is folded along a fold line between the first portion of the pouch and the second portion of the pouch such that the separator is disposed between the first electrode and the second electrode.

11. The electrochemical cell of claim 9, wherein at least one of the first electrode or the second electrode has a thickness in a range of about 250 μm to about 2,000 μm.

12. The electrochemical cell of claim 11, wherein at least one of the first electrode material and the second electrode material has a thickness in a range of about 250 μm to about 500 μm.

13. The electrochemical cell of claim 9, wherein the electrochemical cell has an energy capacity of about 0.1 Ah to about 40 Ah.

14. An individual electrochemical cell, comprising:
an anode current collector coupled to a first portion of a pouch, the anode current collector having an anode material disposed thereon;
a cathode current collector coupled to a second portion of the pouch, the cathode current collector having a cathode material disposed thereon; and
a separator disposed between the anode material and the cathode material, the separator having a cross sectional area larger than a cross sectional area of the anode material and the cathode material,
wherein the first portion of the pouch is coupled to the second portion of the pouch to form the individual electrochemical cell by forming a sealing region, the separator extending partway into the sealing region and sealed between the first portion and the second portion such that the sealing region extends beyond peripheral edges of the separator, and
wherein at least one of the anode material or the cathode material includes a mixture of a solid phase and a liquid phase, the solid phase including an active material and a conductive material and the liquid phase including a non-aqueous liquid electrolyte.

15. The electrochemical cell of claim 14, wherein a ratio of the thickness of the anode material to the thickness of the anode current collector is at least about 12:1.

16. The electrochemical cell of claim 15, wherein the ratio of the thickness of the anode material to the thickness of the anode current collector is at least about 20:1.

17. The electrochemical cell of claim 14, wherein a ratio of the thickness of the cathode material to the thickness of the cathode current collector is at least about 12:1.

18. The electrochemical cell of claim 17, wherein the ratio of the thickness of the cathode material to the thickness of the cathode current collector is at least about 20:1.

* * * * *